United States Patent
Tanaka et al.

(10) Patent No.: US 10,402,361 B2
(45) Date of Patent: Sep. 3, 2019

(54) STORAGE SYSTEM

(71) Applicant: Hitachi, Ltd., Tokyo (JP)

(72) Inventors: Katsuya Tanaka, Tokyo (JP); Kentaro Shimada, Tokyo (JP); Akira Yamamoto, Tokyo (JP); Sadahiro Sugimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/959,675

(22) Filed: Apr. 23, 2018

(65) Prior Publication Data

US 2018/0314666 A1     Nov. 1, 2018

Related U.S. Application Data

(63) Continuation-in-part of application No. PCT/JP2017/016951, filed on Apr. 28, 2017.

(30) Foreign Application Priority Data

Sep. 5, 2017   (JP) ................. 2017-170379

(51) Int. Cl.
*G06F 13/42* (2006.01)
*G06F 13/40* (2006.01)
*G06F 13/16* (2006.01)

(52) U.S. Cl.
CPC ...... *G06F 13/4221* (2013.01); *G06F 13/1668* (2013.01); *G06F 13/404* (2013.01); *G06F 13/4022* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,702,823 B2* | 4/2010 | Hosoya | ............... | G06F 11/0727 710/15 |
| 7,873,866 B2* | 1/2011 | Nonaka | ............... | G06F 11/1662 714/6.32 |
| 8,706,986 B2* | 4/2014 | Nagata | ................... | G06F 3/061 709/217 |
| 8,725,923 B1* | 5/2014 | Frangioso | ........... | G06F 11/3034 710/306 |
| 8,938,569 B1* | 1/2015 | Frangioso | ........... | G06F 13/4022 370/381 |
| 2008/0147934 A1 | 6/2008 | Nonaka et al. | | |
| 2008/0301385 A1* | 12/2008 | Nagata | ................... | G06F 3/061 711/162 |

(Continued)

*Primary Examiner* — Michael Sun
(74) *Attorney, Agent, or Firm* — Mattingly & Malur, PC

(57) ABSTRACT

Efficient communication between storage controllers can be performed. A storage system includes one or more backend switches that connect a first processor, a second processor, and one or more storage devices to each other. Each backend switch identifies a destination of a frame by referring to the frame received from the first processor. In a case where the destination of the frame is the second processor, each backend switch translates a first address, included in the frame, for specifying a location on the second memory in an address space of the first processor, into a second address for specifying the location on the second memory in an address space of the second processor, and transfers the frame including the second address to the second storage controller.

13 Claims, 60 Drawing Sheets

(56) References Cited

U.S. PATENT DOCUMENTS

2009/0157984 A1* 6/2009 Hara .................. G06F 3/061
                                              711/154
2009/0204743 A1  8/2009 Inoue et al.
2013/0254487 A1* 9/2013 Tanaka ............... H04L 49/552
                                              711/123

* cited by examiner

Fig. 3A

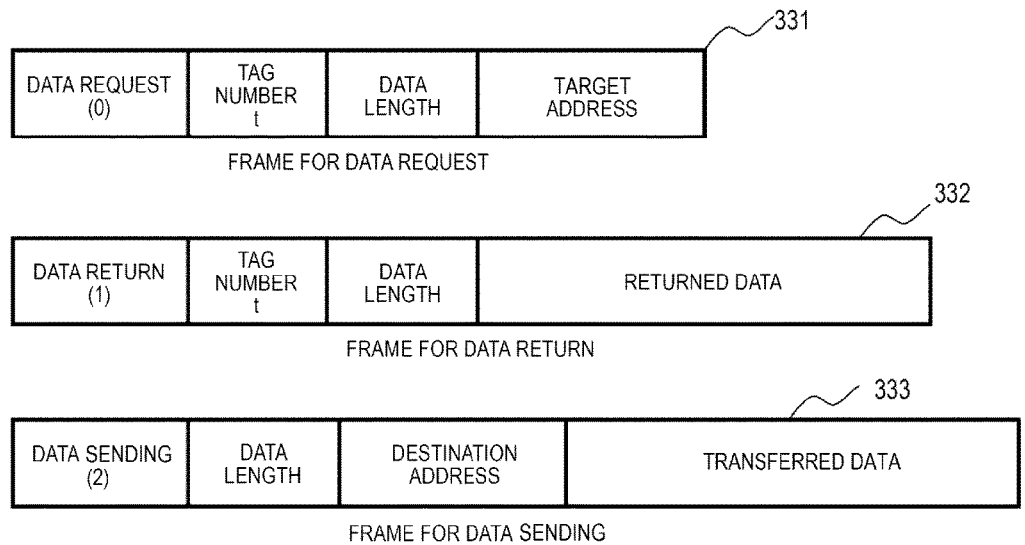

FRAME FOR DATA REQUEST

FRAME FOR DATA RETURN

FRAME FOR DATA SENDING

Fig. 3B

| ADDRESS A | DESTINATION | ADDRESS B |
|---|---|---|
| 0000~00ff | PROCESSOR 101A (MEMORY 102A) | NO TRANSLATION |
| 0100~01ff | PROCESSOR 101B (MEMORY 102B) | 0000~00ff |
| 0200~020f | STORAGE DEVICE 105A | NO TRANSLATION |
| 0210~021f | STORAGE DEVICE 105B | NO TRANSLATION |
| 0220~022f | STORAGE DEVICE 105C | NO TRANSLATION |
| 0230~023f | STORAGE DEVICE 105D | NO TRANSLATION |
| 0240~024f | STORAGE DEVICE 105E | NO TRANSLATION |
| 0250~025f | STORAGE DEVICE 105F | NO TRANSLATION |

SWITCHING INFORMATION TABLE

SWITCHING INFORMATION TABLE

Fig. 37

| Device Port | Storage Device | Port Group | PCIe SW | Root Port | CPU | Queue MEM |
|---|---|---|---|---|---|---|
| 3097A | 3097 | Gr11 | 3042 (VS11) | 3007 (RP11) | 3003 (CPU1) | 3002 (MEM1) |
| 3096A | 3096 | | | | | |
| 3095A | 3095 | | | | | |
| 3094A | 3094 | | | | | |
| 3093B | 3093 | Gr12 | 3063 (VS12) | 3006 (RP12) | 3003 (CPU1) | 3002 (MEM1) |
| 3092B | 3092 | | | | | |
| 3091B | 3091 | | | | | |
| 3090B | 3090 | | | | | |
| 3090A | 3090 | Gr21 | 3043 (VS21) | 3026 (RP21) | 3023 (CPU2) | 3022 (MEM2) |
| 3091A | 3091 | | | | | |
| 3092A | 3092 | | | | | |
| 3093A | 3093 | | | | | |
| 3094B | 3094 | Gr22 | 3062 (VS22) | 3027 (RP22) | 3023 (CPU2) | 3022 (MEM2) |
| 3095B | 3095 | | | | | |
| 3096B | 3096 | | | | | |
| 3097B | 3097 | | | | | |

| MAINTENANCE OR REPLACEMENT TARGET SWITCH (4001) | STORAGE CONTROLLER RECEIVING REQUEST (4002) | ACCESS DESTINATION PORT GROUP (4003) | ALTERNATIVE PROCESS STORAGE CONTROLLER (4004) | ALTERNATIVE ACCESS DESTINATION PORT GROUP (4005) | AVAILABLE DATA TRANSFER PATH BETWEEN STORAGE CONTROLLERS (4006) |
|---|---|---|---|---|---|
| 3041 | 3001 | Gr11 | 3021 | Gr22 | 3502 (Path2) |
| | | Gr12 | UNNECESSARY | UNNECESSARY | |
| | 3021 | Gr21 | 3001 | Gr12 | |
| | | Gr22 | UNNECESSARY | UNNECESSARY | |
| 3061 | 3001 | Gr11 | UNNECESSARY | UNNECESSARY | 3401 (Path1) |
| | | Gr12 | 3021 | Gr21 | |
| | 3021 | Gr21 | UNNECESSARY | UNNECESSARY | |
| | | Gr22 | 3001 | Gr11 | |

STORAGE SYSTEM

CROSS-REFERENCE TO RELATED APPLICATIONS

The present application is a continuation-in-part application of International Application No. PCT/JP2017/016951, filed on Apr. 28, 2017, the contents of which are herein incorporated by reference in their entirety. The present application also claims priority to Japanese Patent Application No. 2017-170379, filed on Sep. 5, 2017, the contents of which are herein incorporated by reference in their entirety.

TECHNICAL FIELD

The present invention relates to a storage system.

BACKGROUND ART

A storage system generally includes a storage controller and a plurality of nonvolatile storage devices which can be accessed randomly. The nonvolatile storage device is, for example, a hard disk drive (HDD) or a solid state drive (SSD). Both of the drives may be used together.

Since the storage system includes a plurality of storage devices, for example, the plurality of storage devices are integrally connected to a backend switch so as to be connected to the storage controller and be controlled. For example, PTL 1 discloses a storage system including a backend switch.

The storage system includes, for example, two storage controllers, and, thus, even if an operation of one thereof is stopped, the other storage controller continuously performs an operation as the storage system, and thus availability is maintained. The two storage controllers are connected to each other via a special communication path which is different from that of the backend switch, and exchange various pieces of control information with each other. PTL 1 discloses a configuration in which the storage system includes the two storage controllers and a bus which is different from that of the backend switch.

A communication protocol for easy direct connection to processors of the storage controllers is used for the communication path between the two storage controllers in order to suppress overhead related to communication. An example of the communication protocol for easy direct connection to the processors is PCI Express which is a communication protocol between the processors and an input/output device.

In contrast, as a communication protocol between the storage controllers and storage devices connected to the backend switch, generally, Small Computer System Interface (SCSI), Fibre Channel, or Serial Attached SCSI (SAS) is used.

A communication path with such a communication protocol between a storage controller and a storage device cannot be directly connected to a processor of the storage controller, and requires a dedicated interface so as to be used for communication between storage controllers.

For example, PTL 2 discloses a technique in which communication between different storage controllers is performed via a backend switch. In the technique disclosed in PTL 2, communication between different storage controllers can be performed via a shared storage area included in the backend switch. PTL 3 discloses a technique in which a shared memory is provided between two storage controllers, and a special communication path for duplication is provided therebetween.

As a communication protocol between a storage controller and a storage device, in recent years, NVM Express compatible with PCI Express has been newly used.

CITATION LIST

Patent Literature

PTL 1: US-A-2009/0204743
PTL 2: US-A-2008/0147934
PTL 3: US-A-2013/0254487

SUMMARY OF INVENTION

Technical Problem

As described above, in the storage system configured by using the related art, a communication protocol for easy connection to processors of storage controllers, such as PCI Express, is used for communication between two storage controllers. Thus, in the storage system of the related art, a special communication path is exclusively necessary between the storage controllers.

PCI Express is a communication protocol between a processor and an input/output device, and does not define any communication between two processors of two storage controllers. Therefore, even if a physical communication path can be directly connected to processors, communication procedures between two processors are not defined, and thus communication between the two processors cannot be performed, by using PCI Express only.

On the other hand, a communication protocol between a storage controller and storage devices connected to a backend switch is not compatible with a communication protocol between storage controllers. It is hard to perform communication between the storage controllers via the backend switch. For example, in the technique disclosed in PTL 2, it is necessary to perform polling check on the shared storage area of the backend switch, and a shared region for detecting communication in the storage controllers. As mentioned above, communication between the storage controllers using the backend switch requires special means, and thus performance overhead occurs.

NVM Express compatible with PCI Express is a communication protocol between a single storage controller and a storage device, and does not define any communication between two storage controllers. Thus, communication between two storage controllers cannot be performed by using NVM Express.

Therefore, a technique is desirable in which efficient communication between storage controllers can be performed via a backend switch which connects a storage controller to a storage device without the need of a special dedicated communication path between two storage controllers. Particularly, a technique is desirable in which communication procedures enabling communication between processors of two storage controllers to be performed via a backend switch are defined.

Solution to Problem

According to an example of the present invention, there is provided a storage system including a first storage controller that includes a first processor and a first memory; a second storage controller that includes a second processor and a second memory; one or more storage devices; and one or more backend switches that connect the first processor, the second processor, and the one or more storage devices to each other, in which each of the one or more backend switches identifies a destination of a frame by referring to the frame received from the first processor, translates a first address, included in the frame, for specifying a location on the second memory in an address space of the first processor, into a second address for specifying the location on the second memory in an address space of the second processor, in a case where the destination of the frame is the second processor, transfers the frame including the second address to the second storage controller, and transfers the frame to a first storage device of the one or more storage devices without translating a third address, included in the frame, for specifying the first storage device in the address space of the first processor, in a case where the destination of the frame is the first storage device.

According to another example of the present invention, there is provided a storage system including a first storage controller that includes a first processor and a first memory; a second storage controller that includes a second processor and a second memory; one or more storage devices; and one or more backend switches that connect the first processor, the second processor, and the one or more storage devices to each other, in which each of the one or more backend switches receives a data transfer command including a fourth address for specifying a first location on the first memory in an address space of the first processor, a fifth address for specifying a location on the second memory in the address space of the first processor, and a length of data to be transferred, from the first processor, translates the fifth address into a sixth address for specifying the second location on the second memory in an address space of the second processor, and transfers first data with the data length between the first location on the first memory and the second location on the second memory.

Advantageous Effects of Invention

According to an aspect of the present invention, it is possible to perform efficient communication between storage controllers via a backend switch which connects a storage controller to a storage device.

BRIEF DESCRIPTION OF DRAWINGS

FIG. 3A illustrates examples of frames for data request, data return, and data sending performed through communication between storage controllers.

FIG. 3B illustrates an example of a switching information table for determining a switching operation with respect to an address assigned to a frame transferred from a processor in a backend switch.

FIG. 37 is a diagram illustrating an example of a relationship among the PCIe tree, the storage device, and the processor.

FIG. 40 is a diagram illustrating examples of necessity and unnecessity of an alternative process or an alternative path during maintenance or replacement of the backend switch.

DESCRIPTION OF EMBODIMENTS

Hereinafter, some Examples of the present invention will be described with reference to the drawings. In the Examples, a description will be made of data communication control between storage controllers for ensuring redundancy of a storage system.

Example 1

Figure 1:
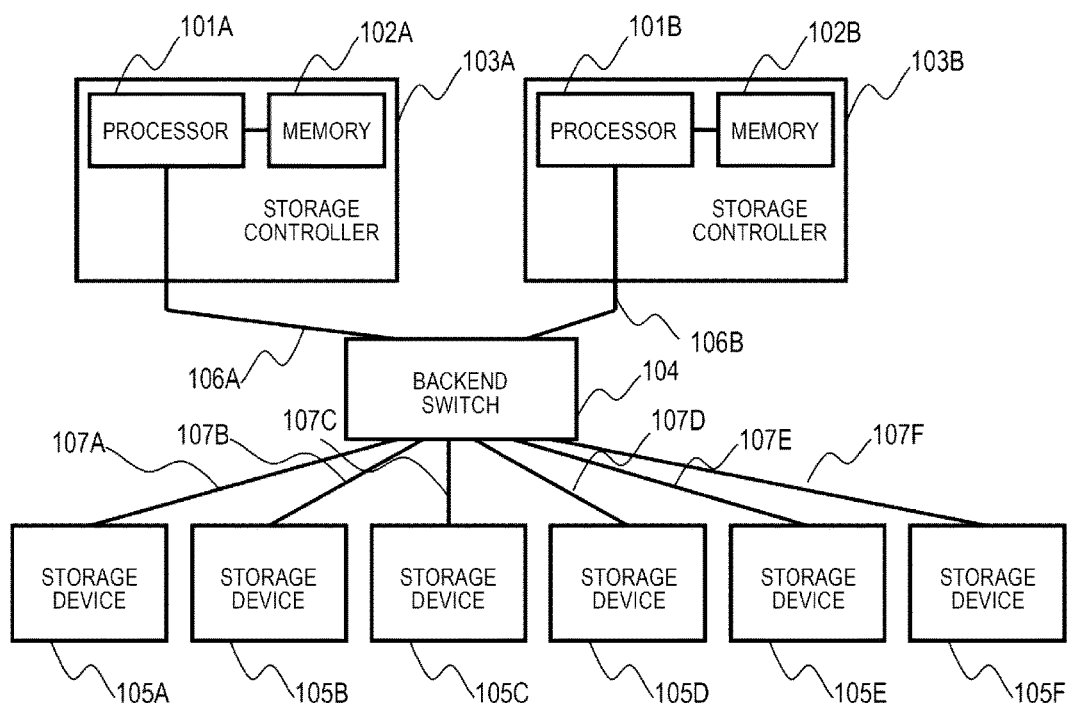
FIG. 1 illustrates a configuration example of a storage system.

With reference to FIG. 1 and FIGS. 3A to 7B, Example 1 will be described. FIG. 1 illustrates a configuration example of a storage system according to Example 1. In FIG. 1, the storage system includes two storage controllers 103A and 103B. The storage controller 103A is configured to include a processor 101A and a memory 102A, and the storage controller 103B is configured to include a processor 101B and a memory 102B. The processors 101A and 101B are connected to a backend switch 104 via paths 106A and 106B, respectively.

The storage system according to Example 1 includes storage devices 105A to 105F, and the storage devices 105A to 105F are connected to the backend switch 104 via paths 107A to 107F, respectively. FIG. 1 illustrates six storage devices 105A to 105F, but any number of storage devices may be used.

Some functions or all functions of the backend switch 104 may be realized in hardware, for example, by designing an integrated circuit, or may be realized in software by a processor interpreting and executing a program for realizing each function.

FIG. 3A illustrates examples of frames for data request, data return, and data sending performed through communication between the storage controllers. Each frame may be transferred as a single unit, and may be divided into packets so as to be transferred. FIG. 3A illustrates examples of frame formats, and other formats, for example, a packet format used in PCI Express may be used.

In a frame 331 for data request, a first field represents a number indicating a data request ("0" in the example illustrated in FIG. 3A). The next field represents a tag number (t) for differentiating a plurality of data request frames from each other. Generally, a tag number allows the next data request to be transferred before data is returned with respect to one data request.

The next field represents a data length. The data length is expressed in, for example, the byte unit or the number of data blocks with a predetermined size. The next field represents a target address. The target address indicates an address of an address space used by a processor of a target storage controller. The target address is translated into an address of an address space used by a processor of a target storage controller from an address of an address space used by a processor of an initiating storage controller by the backend switch 104.

In a frame 332 for data return, a first field represents a number ("1" in the example illustrated in FIG. 3A) indicating data return. The next field represents a tag number assigned to the frame for data return, and is used to specify data return corresponding to a data request. The next field represents a data length. Returned data is stored in the last field.

In a frame 333 for data sending, the first field represents a number ("2" in the example illustrated in FIG. 3B) indicating data sending. The next field represents a data length. The next field represents a destination address. The destination address indicates an address of an address space used by a processor of a destination storage controller. The destination address is translated into an address of an address space used by a processor of a destination storage controller from an address of an address space used by a processor of a source storage controller by the backend switch 104. Transferred data is stored in the last field.

FIG. 3B illustrates an example of a switching information table 350 for determining a switching operation for an address assigned to a frame transferred from the processor 101A in the backend switch 104. In FIG. 3B, the address is expressed in a hexadecimal number.

In an address space used by the processor 101A, different address ranges are allocated to different devices (memories, processors (memories) and storage devices). In the example illustrated in FIG. 3B, addresses "0000" to "00ff" are addresses allocated to the memory 102A by the processor 101A. A frame with an address in this address range is not transferred to the backend switch 104 from the processor 101A. The processor 101A directly accesses the memory 102A.

Frames assigned with addresses after the address "0100" reach the backend switch 104 from the processor 101A. For example, a destination of the address "0180" is the processor 101B (memory 102B), and a frame with the address is transferred to the path 106B. As will be described later, the backend switch 104 translates a destination address of a frame to the processor 101B (memory 102B). In the example illustrated in FIG. 3B, the address "0180" of the processor 101A is translated into the address "0080" of the processor 101B.

If an address assigned to a frame transferred from the processor 101A is 0220, a destination is determined as being the storage device 105C, and the frame is transferred toward the path 107c connected to the storage device 105c. As will be described later, a frame toward the storage device does not undergo address translation in the backend switch 104.

Switching between frames received from the processor 101B is performed by referring to a switching information table having the same configuration. A frame of which a destination is the processor 101A (memory 102A) undergoes the address translation, and a frame toward the storage device does not undergo the address translation. In a configuration in which the backend switch 104 which will be described later receives a data transfer command from the processor 101A or the processor 101B, and performs address translation, a switching information table in which address translation information and destination information having the same configuration are held is also used.

Figure 3C:
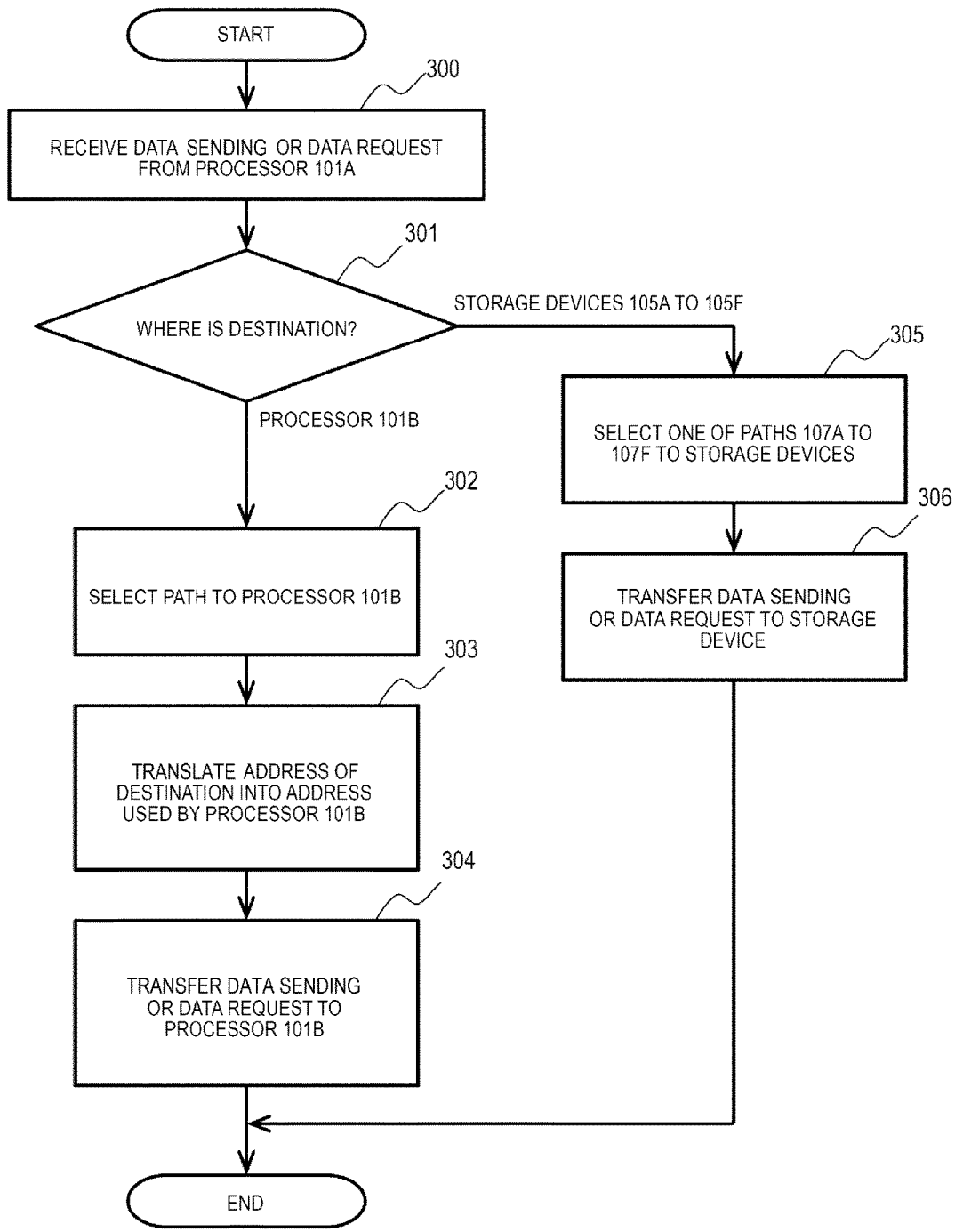
FIG. 3C is a flowchart illustrating examples of process procedures in a case where the backend switch receives data sending or a data request from the processor.

FIG. 3C is a flowchart illustrating examples of process procedures in a case where the backend switch 104 receives data sending or a data request from the processor 101A. This is also the same for process procedures in a case where the backend switch 104 receives data sending or a data request from the processor 101B. In this case, the processor 101A in FIG. 3C is replaced with the processor 101B.

In step 300, the backend switch 104 receives data sending or a data request from the processor 101A. In step 301, the backend switch 104 determines a destination of the data sending or the data request by referring to a destination address or a target address (destination address) and the switching information table 350. In a case where the destination is the processor 101B (301: processor 101B), the backend switch 104 proceeds to step 302. In step 302, the backend switch 104 selects a path toward the processor 101B. This path corresponds to the path 106B in FIG. 1.

In step 303, the backend switch 104 translates the destination address of the received data sending or data request by referring to the switching information table 350. An address before being translated is an address in an address space used by the processor 101A, and an address after being translated is an address in an address space used by the processor 101B.

The processor 101A and the processor 101B are independent from each other, and the address spaces used thereby and addresses for specifying locations in the memories are defined separately from each other. Thus, mutual addresses are translated according to a predetermined rule defined in the switching information table 350, and thus data transfer between the processors (memories) can be performed.

Next, in step 304, the backend switch 104 transfers the data or the data request to the processor 101B, and finishes the process.

In step 301, if a destination is any one of the storage devices 105A to 105F (301: storage devices 105A to 105F), the backend switch 104 proceeds to step 305. In step 305, the backend switch 104 selects one of the paths 107A to 107F to the storage devices 105A to 105F. Next, in step 306, the backend switch 104 transfers the data sending or the data request to the storage device, and finishes the process.

Next, a description will be made of a process in a case where the backend switch 104 receives data sending or a data request from the storage devices 105A to 105F. The storage devices 105A to 105F receives a frame from the processor 101A or 101B, and writes or reads designated data. The storage devices 105A to 105F receive a special data pattern in which a command code for giving an instruction for a specific operation is encoded, and perform the operation for which the instruction is given.

The storage devices 105A to 105F transfer frames to the backend switch 104. For example, a destination of the frames received from the storage devices 105A to 105F are defined in advance for the storage devices 105A to 105F in the backend switch 104. The destination is, for example, the processor 101A or the processor 101B.

The backend switch 104 performs switching according to predefined setting such that the data frames received from the storage devices 105A to 105F are transferred toward the path 106A to the processor 101A or the path 106B to the processor 101B.

Instead thereof, the backend switch 104 may perform a switching operation on the basis of addresses assigned to data frames received from the storage devices 105A to 105F by using the switching information table.

Figures 4A, 4B:
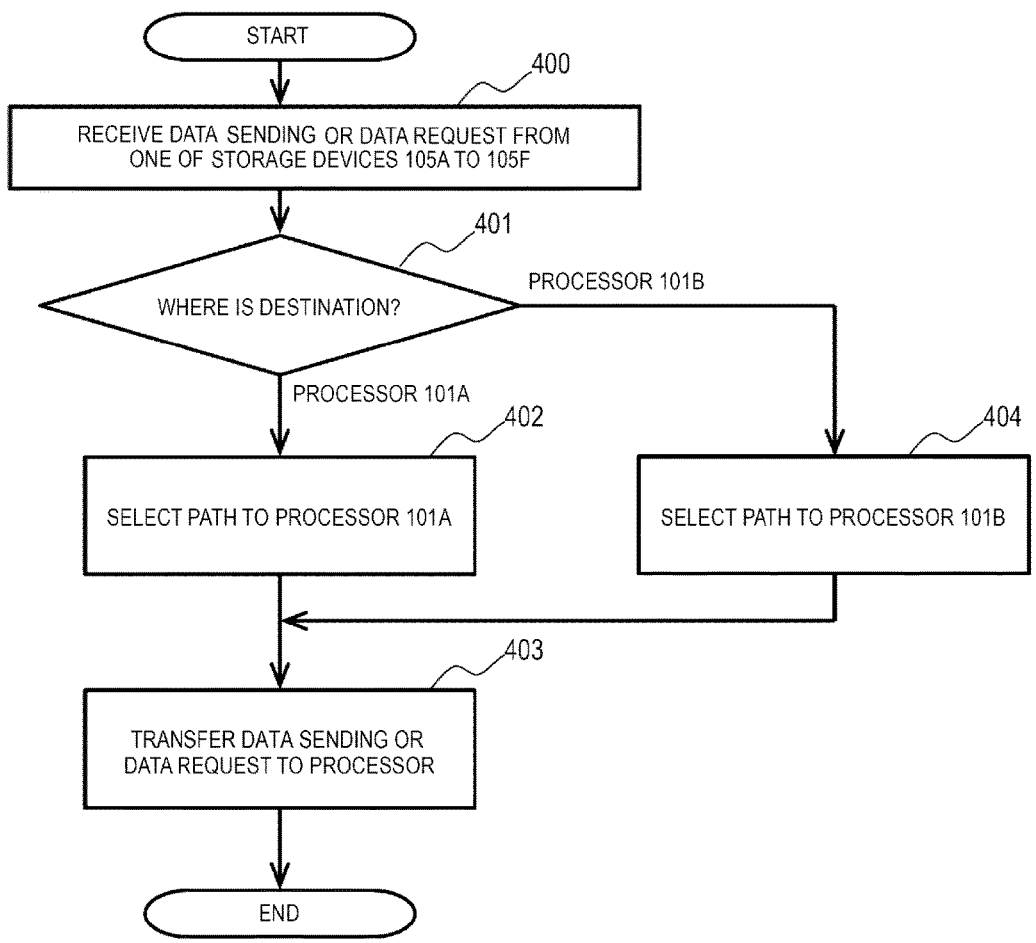
FIG. 4A illustrates an example of a switching information table.
FIG. 4B is a flowchart illustrating examples of process procedures in a case where the backend switch receives data sending or a data request from a storage device.

FIG. 4A illustrates an example of a switching information table 450. The switching information table 450 is used to define a relationship between an address range and a destination in an address space of the storage device and an address range in an address space of the processor.

The backend switch 104 receives a data frame assigned with, for example, an address "0440" from a storage device. The backend switch 104 performs switching so as to transfer the data frame toward the path 106A. The backend switch 104 translates the address "0440" into an address "0040" used for the processor 101A to access the memory 102A. Consequently, the processor 101A can correctly access the memory 102A.

If a data frame assigned with, for example, an address "0560" is received from a storage device, the backend switch 104 performs switching so as to transfer the data frame toward the path 106B. The backend switch 104 translates the address "0560" into an address "0060".

FIG. 4B is a flowchart illustrating examples of process procedures in a case where the backend switch 104 receives data sending and data request from the storage devices 105A to 105F. In step 400, the backend switch receives data sending or a data request from one of the storage devices 105A to 105F.

In step 401, the backend switch 104 determines a destination of the data sending or the data request. A determination method is as described above. In a case where a destination is the processor 101A (401: processor 101A), the backend switch proceeds to step 402. In step 402, the backend switch 104 selects a path to the processor 101A. The path corresponds to the path 106A in FIG. 1. The backend switch 104 transfers the data sending or the data request to the processor 101A or the processor 101B along with designation of a location on the memory 102A or the memory 102B. In this example, the designated memory is the memory 102A.

Next, the backend switch 104 proceeds to step 403, transfers the data sending or the data request to the processor 101A by using the selected path, and finishes the process.

In step 401, in a case where a destination is the processor 101B (401: processor 101B), the backend switch 104 proceeds to step 404. In step 404, the backend switch 104 selects a path to the processor 101B. The path corresponds to the path 106B in FIG. 1. The backend switch 104 transfers the data sending or the data request to the processor 101A or the processor 101B along with designation of a location on the memory 102A or the memory 102B. In this example, the designated memory is the memory 102B. Next, the backend switch 104 proceeds to step 403, transfers the data sending or the data request to the processor 101B by using the selected path, and finishes the process.

Figure 5A:
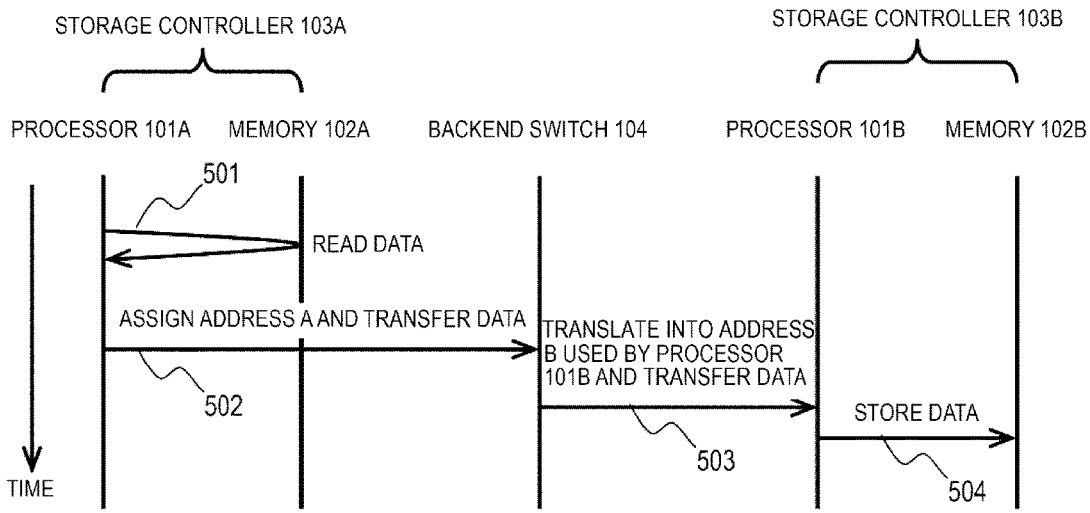
FIG. 5A is a diagram illustrating an example of a sequence of a process in which a first storage controller transfers data to a second storage controller.
Figure 5B:
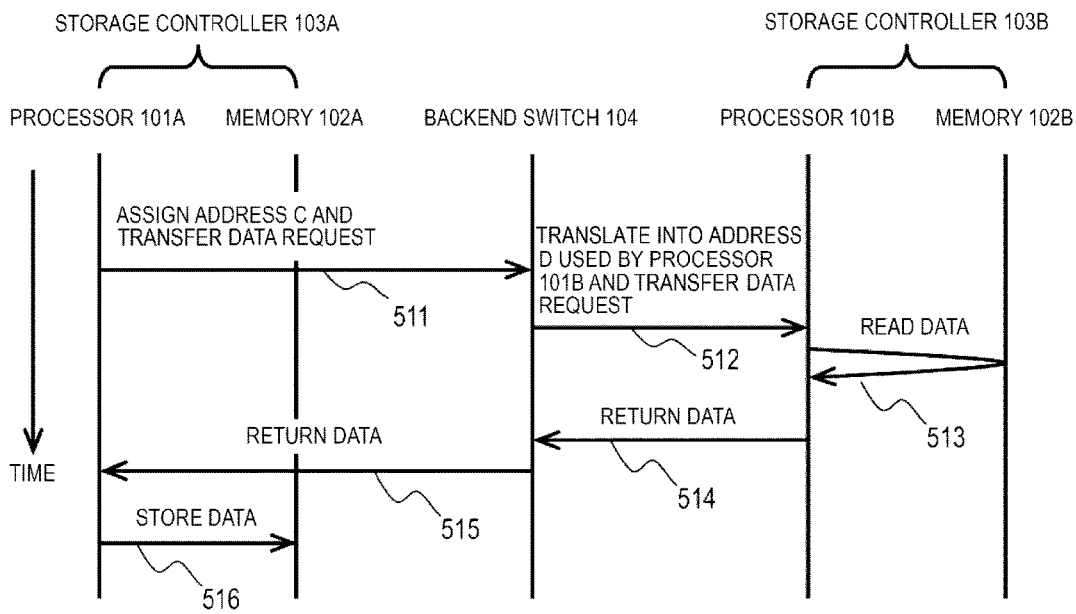
FIG. 5B is a diagram illustrating an example of a sequence of a process in which the first storage controller reads data from the second storage controller.

FIGS. 5A and 5B respectively illustrate examples of sequences of processes in which the storage controller 103A transfers data to the storage controller 103B, and the storage controller 103A reads data from the storage controller 103B. This is also the same for a sequence in which the storage controller 103B transfers data to the storage controller 103A, or reads data from the storage controller 103A. In this case, in FIGS. 5A and 5B, the storage controller 103A and the storage controller 103B are replaced with each other, the processor 101A and the processor 101B are replaced with each other, and the memory 102A and the memory 102B are replaced with each other.

In FIG. 5A, in step 501, the processor 101A reads data from the memory 102A. Next, in step 502, the processor 101A assigns an address A for the processor 101A identifying a location on the memory 102B to the read data, and transfers the data to the backend switch 104. The address A is used to identify a specific location on the memory 102B in the address space of the processor 101A.

Steps 501 and 502 may be executed by software operating on the processor 101A, and all or some thereof may be executed by functional hardware (circuit) which is operated according to an instruction from the software and is implemented in the processor 101A.

For example, the software designates an address for identifying a location of data on the memory 102A, the address A for identifying a location on the memory 102B, and a length of the data to be transferred. The functional hardware reads the data with the designated length from the designated address on the memory 102A, generates a frame including the data and a designated destination address, and transfers the frame to the backend switch 104.

In step 503, the backend switch 104 translates the address A into an address B used for the processor 101B to identify a location on the memory 102B by referring to the switching information table 350, and transfers the frame to the processor 101B. The reason why the address A is translated into the address B is as described in step 303 in FIG. 3C.

The processor 101B receives the frame assigned with the address B from the backend switch 104. In step 504, the processor 101B stores the data in the memory 102B according to the address B. Step 504 may be executed by software operating on the processor 101B. If the data assigned with the address B is received from the backend switch 104, functional hardware (circuit) implemented in the processor 101B may automatically store the data in the memory 102B according to the address B.

With reference to FIG. 5B, in step 511, the processor 101A assigns an address C for identifying a location on the memory 102B in the address space of the processor 101A to a data request, and transfers the data request to the backend switch 104. Step 511 may be executed by software operating on the processor 101A, and may be executed by functional hardware (circuit) implemented in the processor 101A.

For example, the software operating on the processor 101A designates the address C for identifying a location on the memory 102B, a location on the memory 102A in which data to be read is stored, and a length of the data to be read. The functional hardware generates and transfers the data request including the designated information.

The backend switch 104 receives the data request assigned with the address C from the processor 101A. In step 512, the backend switch 104 translates the address C into an address D used for the processor 101B to identify a location on the memory 102B, and transfers the address D to the processor 101B. The reason why the address C is translated into the data request is as described in step 303 in FIG. 3C.

The processor 101B receives the frame assigned with the address D from the backend switch 104. In step 513, the processor 101B reads the data in the memory 102B according to the address D. In step 514, the processor 101B returns the data read from the memory 102B to the backend switch 104.

Steps 513 and 514 may be executed by software operating on the processor 101B, and may be executed by functional hardware (circuit) implemented in the processor 101B. If the data request assigned with the address D is received from the backend switch 104, the functional hardware reads the data from the memory 102B, for example, automatically, and returns the data to the backend switch 104.

The backend switch 104 receives the data which is returned in response to the data request transferred in step 512, from the processor 101B. In step 515, the backend switch 104 further returns the returned data to the processor 101A.

The processor 101A receives the data returned in response to the data request transferred in step 511 from the backend switch 104. In step 516, the processor 101A stores the returned data in the memory 102A. Step 516 may be executed by software operating on the processor 101A, and may be executed by functional hardware (circuit) implemented in the processor 101A. For example, if the returned data is received from the backend switch 104, the functional hardware automatically stores the data in the memory 102A.

Figure 6A:
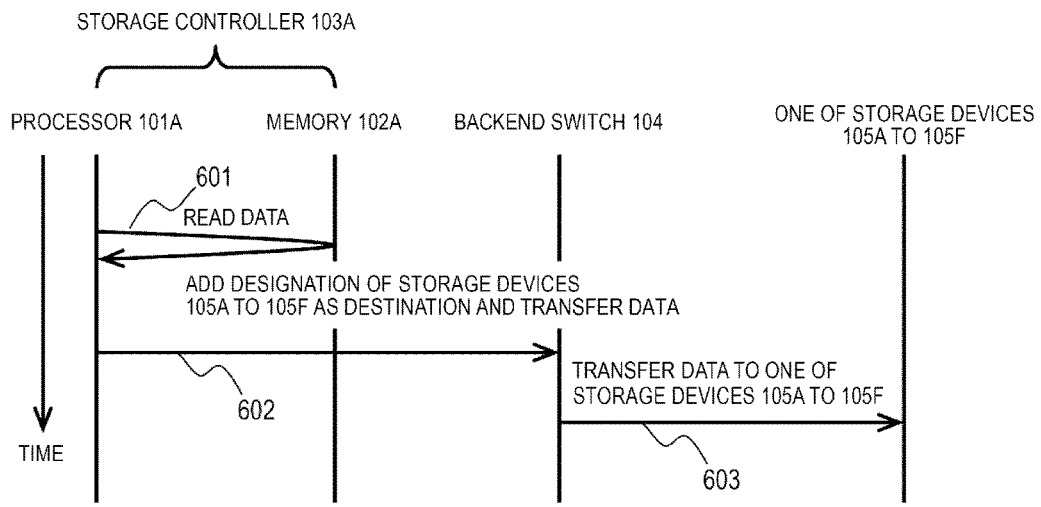
FIG. 6A is a diagram illustrating an example of a sequence of a process in which the storage controller transfers data to a storage device.

FIG. 6A illustrates an example of a sequence of a process in which the storage controller 103A transfers data to the storage devices 105A to 105F. The following description may also be applied to the storage controller 103B. In this case, the storage controller 103A, the processor 101A, and the memory 102A are respectively replaced with the storage controller 103B, the processor 101B, and the memory 102B. This is also the same for a description of FIG. 6B.

In step 601, the processor 101A reads data from the memory 102A. Next, in step 602, the processor 101A adds, to the data, a designation regarding to which one of the storage devices 105A to 105F the read data is to be transferred, and transfers the data to the backend switch 104.

Steps 601 and 602 may be executed by software operating on the processor 101A, and all or some thereof may be executed by functional hardware (circuit) implemented in the processor 101A. For example, the software designates a location to read data on the memory 102A, a destination storage device, and a length of the data to be transferred, and the functional hardware operates according to the designated information.

The backend switch 104 receives the data to be transferred to the storage device, from the processor 101A. In step 603, the backend switch 104 transfers the data to one of the storage devices 105A to 105F according to the designation of a destination storage device added to the received data.

Figure 6B:
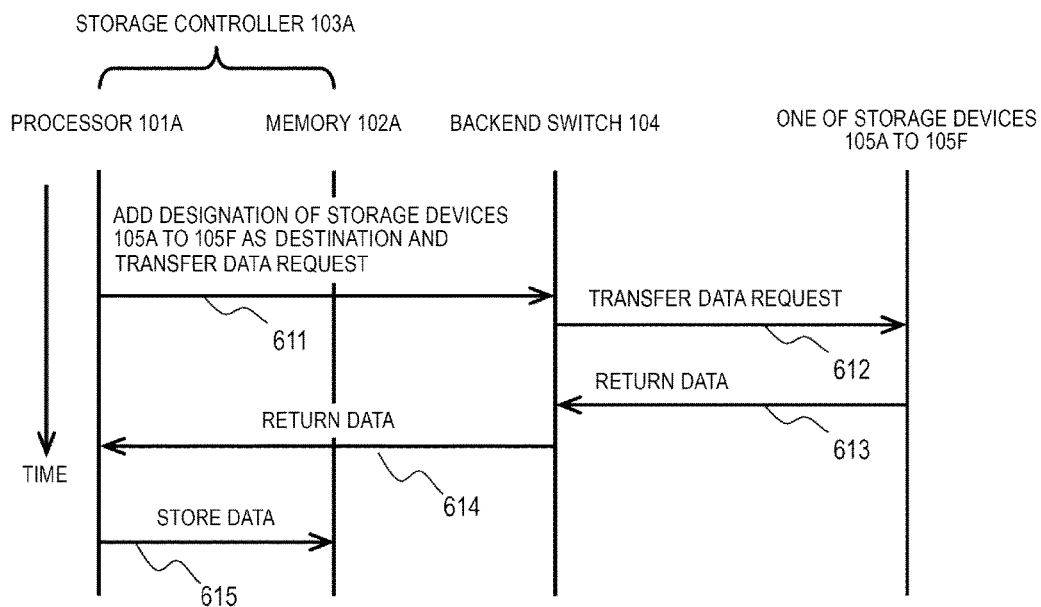
FIG. 6B is a diagram illustrating an example of a sequence of a process in which the storage controller reads data from the storage device.

FIG. 6B illustrates an example of a sequence of a process in which the storage controller 103A reads data from the storage devices 105A to 105F. In step 611, the processor 101A adds, to a data request, a designation regarding from which one of the storage devices 105A to 105F data is to be read, and transfers the data request to the backend switch 104. Step 611 may be executed by software operating on the processor 101A, and may be executed by functional hardware (circuit) implemented in the processor 101A. For example, the software designates a location to read data in a corresponding storage device, a location on the memory 102A in which data to be read is stored, and a length of the data to be read. The functional hardware operates according to the designated information.

The backend switch 104 receives the data request added with the designation regarding the location to read data in the corresponding storage device, from the processor 101A. In step 612, the backend switch 104 transfers the data request to the storage device designated by the data request.

If the data request is received from the backend switch 104, the storage device returns the requested data to the backend switch 104 in step 613.

The data is returned to the backend switch 104 from the storage device in response to the data request transferred in step 612. In step 614, the backend switch 104 further returns the returned data to the processor 101A which is a data request transfer source.

If the data is returned in response to the data request transferred to the backend switch 104 in step 611, in step 615, the processor 101A stores the returned data in the memory 102A. Step 615 may be executed by software operating on the processor 101A, and may be executed by functional hardware (circuit) implemented in the processor 101A. If the data returned from the backend switch 104 is received, the functional hardware automatically stores the data in the memory 102A.

Figure 7A:
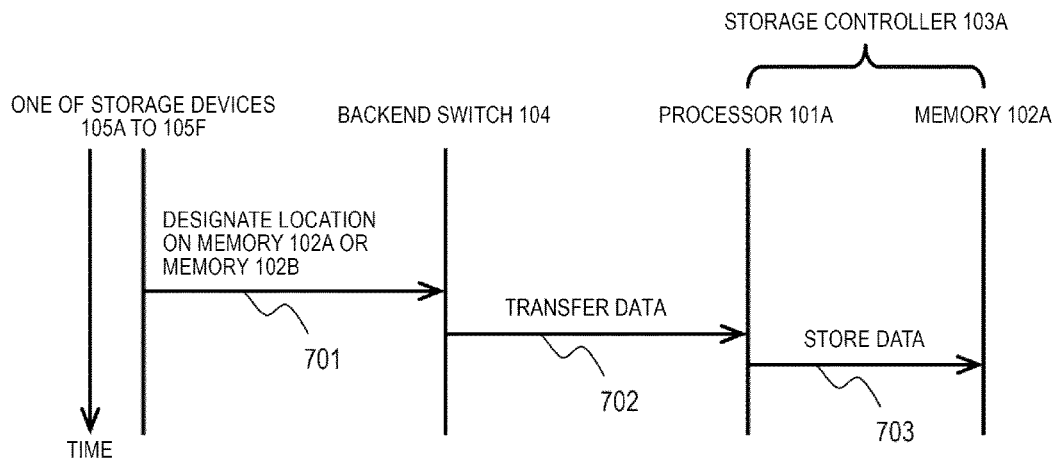
FIG. 7A is a diagram illustrating an example of a sequence of a process in which the storage device transfers data to the storage controller.

FIG. 7A illustrates an example of a sequence of a process in which one of the storage devices 105A to 105F transfers data to the memory 102A. The following description may also be applied to the memory 102B. In this case, the processor 101A and the memory 102A are respectively replaced with the processor 101B and the memory 102B. This is also the same for a description of FIG. 7B.

In FIG. 7A, in step 701, one of the storage devices 105A to 105F designates a location on the memory 102A, and transfers data to the backend switch 104. The data is transferred by using, for example, the frame 333 for data sending illustrated in FIG. 3A.

If the data is received from one of the storage devices 105A to 105F, in step 702, the backend switch 104 designates a location on the memory 102A or 102B depending on whether the designated memory is the memory 102A or the memory 102B, and also transfers the received data to the processor 101A or 101B. In this example, the designated memory is the memory 102A.

Whether a designated memory is the memory 102A or the memory 102B may be predefined for each of the storage devices 105A to 105F as described above. The backend switch 104 may determine a memory on the basis of an address assigned to a data frame received from each of the storage devices 105A to 105F by using the switching information table 450 illustrated in FIG. 4A. In this case, as illustrated in FIG. 4A, the backend switch 104 translates a destination address included in the frame for data sending received from each of the storage devices 105A to 105F into an address in the address space used by the processor 101A by using the switching information table 450.

If the data is received from the backend switch 104, in step 703, the processor 101A stores the received data in the designated location on the memory 102A. Step 703 may be executed by software operating on the processor 101A such that the process therein is performed, and a function of hardware in which, if data is received from the backend switch 104, the data is automatically stored in the memory 102A or the 102B, may be implemented in the processor 101A or 101B.

Figure 7B:
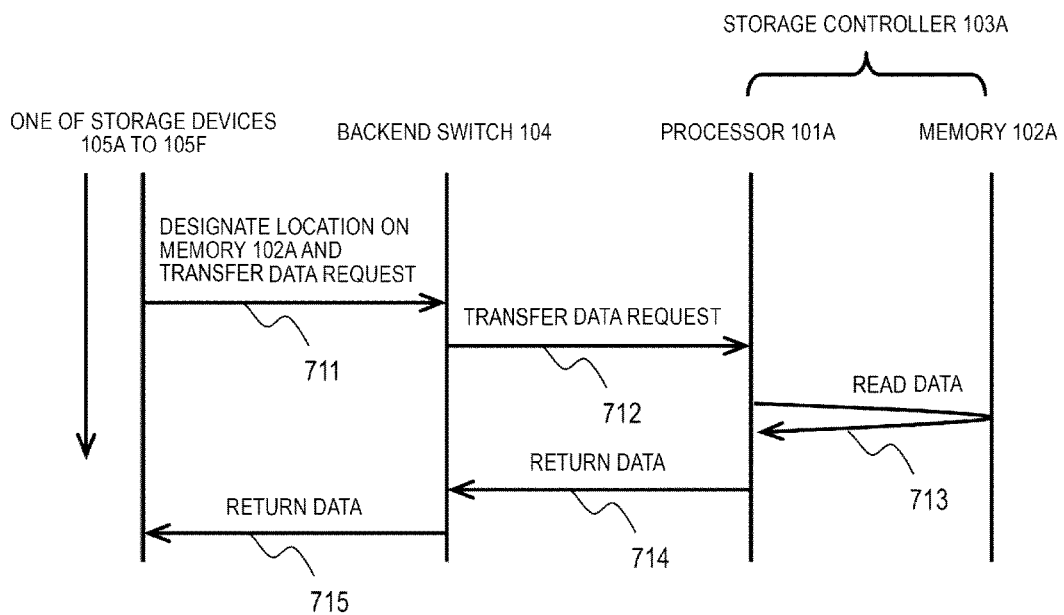
FIG. 7B is a diagram illustrating an example of a sequence of a process in which the storage device reads data from the storage controller.

FIG. 7B illustrates an example of a sequence of a process in which one of the storage devices 105A to 105F reads data from the memory 102A. In step 711, one of the storage devices 105A to 105F designates a location on the memory 102A from which data is read, and transfers a data request to the backend switch 104. The data request is transferred by using, for example, the frame 331 for data request illustrated in FIG. 3A.

In step 712, the backend switch 104 designates a location on the memory 102A or 102B depending on whether the designated memory is the memory 102A or the memory 102B, and also transfers the received data request to the processor 101A or 101B. In this example, the designated memory is the memory 102A.

Whether a designated memory is the memory 102A or the memory 102B may be predefined for each of the storage devices 105A to 105F as described in step 702. The backend switch 104 may determine a memory on the basis of an address assigned to a data frame received from each of the storage devices 105A to 105F by using the switching information table 450 illustrated in FIG. 4A. In this case, as illustrated in FIG. 4A, the backend switch 104 translates an address included in the frame for data sending received from each of the storage devices 105A to 105F into an address in the address space used by the processor 101A by using the switching information table 450.

If the data request is received from the backend switch 104, in step 713, the processor 101A reads the data from the designated location on the memory 102A. In step 714, the processor 101A returns the data read from the memory 102A to the backend switch 104.

Steps 713 and 714 may be executed by software operating on the processor 101A, and may be executed by functional hardware (circuit) implemented in the processor 101A. If the data request is received from the backend switch 104, the functional hardware automatically reads the data from the memory 102A according to the designated location on the memory 102A, and returns the data to the backend switch 104.

If the data is returned from the processor 101A in response to the data request transferred in step 712, in step 715, the backend switch 104 returns the data to one of the storage devices 105A to 105F which transferred the data request in step 711.

As described above, in Example 1, the compatible communication protocol is applied to communication between the storage controllers and communication between the storage controller and the storage device. According to Example 1, the storage controllers 103A and 103B can perform communication with each other by using the backend switch 104.

For example, in a case where data to be written to the storage devices 105A to 105F is received from a host computer not illustrated in FIG. 1, the storage controllers 103A and 103B may duplicate the data via the backend switch 104. Since sufficient reliability and availability can be ensured even if writing to the storage devices 105A to 105F is not completed, the host computer can be notified of write completion before the data is written to the storage devices 105A to 105F. A shared storage area is not required to be provided in the backend switch 104.

Example 2

Figure 2:
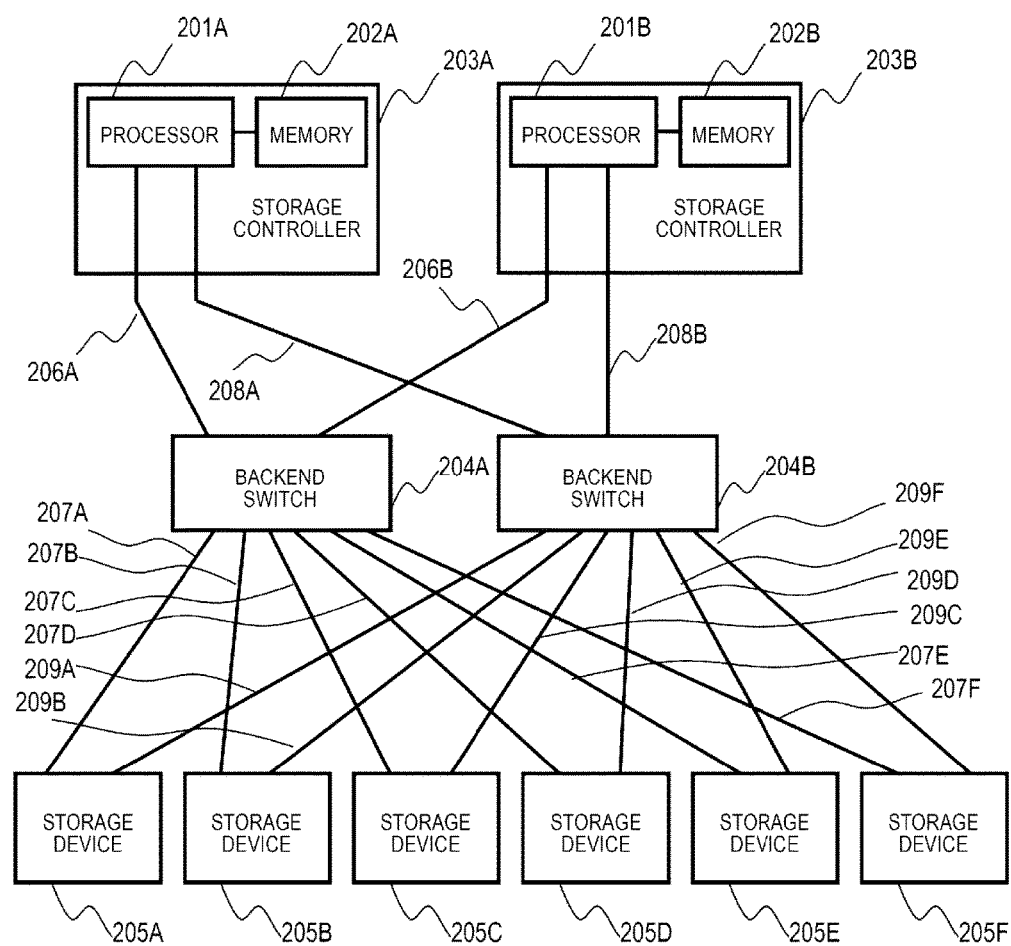
FIG. 2 illustrates another configuration example of the storage system.

Next, Example 2 of the present invention will be described with reference to FIGS. 2 to 7B. FIG. 2 illustrates a configuration example of a storage system according to Example 2. In FIG. 2, the storage system includes two storage controllers 203A and 203B. The storage controller 203A is configured to include a processor 201A and a memory 202A.

The storage controller 203B is configured to include a processor 201B and a memory 202B.

The storage system according to Example 2 includes backend switches 204A and 204B which are independent from each other. The processor 201A is connected to the backend switches 204A and 204B via paths 206A and 208A, respectively. The processor 201B is connected to the backend switches 204A and 204B via paths 206B and 208B, respectively.

The storage system according to Example 2 includes storage devices 205A to 205F. The storage devices 205A to 205F are connected to the backend switch 204A via paths 207A to 207F, respectively. The storage devices 205A to 205F are connected to the backend switch 204B via paths 209A to 209F, respectively.

The processors 201A and 201B are connected to all of the storage devices 205A to 205F and one of the processors 201B and 201A even if only one of the backend switches 204A and 204B is used.

With this configuration, even if an operation of one of the backend switches 204A and 204B is stopped, or one of the paths to the backend switches 204A and 204B is disconnected, both of communication between the processors 201A and 201B and communication between the processor 201A or 201B and the storage devices 205A to 205F can be continuously performed. Consequently, it is possible to increase the availability of the system.

FIG. 2 illustrates six storage devices 205A to 205F, but any number of storage devices may be used.

The descriptions of FIGS. 3A to 7B in Example 1 can be applied to the storage system according to Example 2. In Example 2, the storage controllers 103A and 103B, the processors 101A and 101B, and the memories 102A and 102B may be replaced with the storage controllers 203A and 203B, the processors 201A and 201B, and the memories 202A and 202B. The backend switch 104 is replaced with the backend switch 204A or 204B, and the storage devices 105A to 105F are replaced with the storage devices 205A to 205F.

Therefore, in the same manner as in Example 1, the storage controllers 203A and 203B can perform communication with each other by using the backend switch 204A or 204B. For example, in a case where data to be written to the storage devices 205A to 205F is received from a host computer not illustrated in FIG. 2, the storage controllers 203A and 203B may duplicate the data via the backend switch 204A or 204B.

As mentioned above, since sufficient reliability and availability can be ensured even if writing to the storage devices 205A to 205F is not completed, the host computer can be notified of write completion before the data is written to the storage devices 205A to 205F. A shared storage area is not required to be provided in the backend switch 204A or 204B.

Example 3

Example 3 will be described with reference to FIGS. 1, 4A, 4B, 6A to 9B and 27. In Example 3, descriptions of FIGS. 1, 4A, 4B, 6A to 7B are the same as in Example 1.

Figure 27:
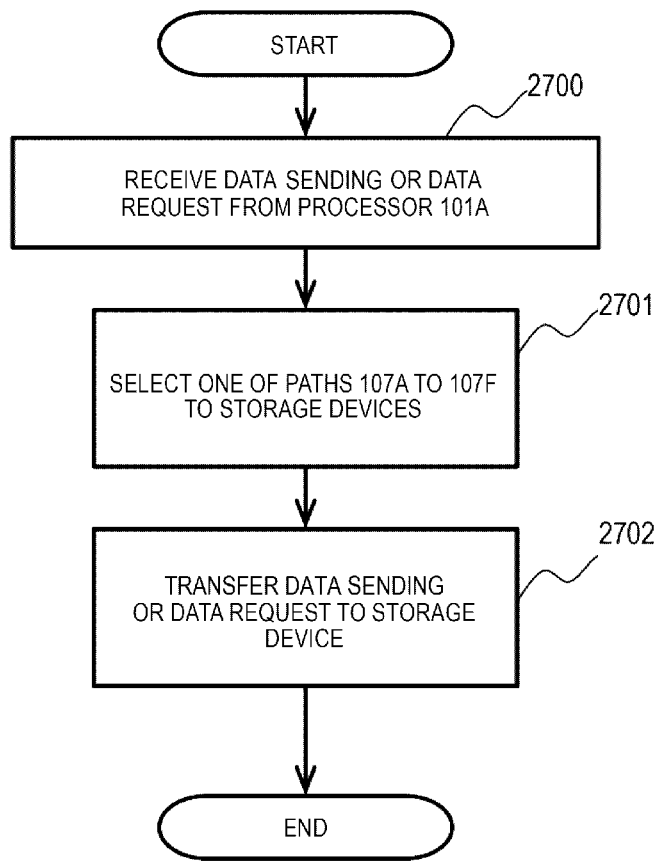
FIG. 27 is a flowchart illustrating still other examples of process procedures in a case where the backend switch receives data sending or a data request from the processor.

FIG. 27 is a flowchart illustrating examples of process procedures in a case where the backend switch 104 receives data sending or a data request from the processor 101A. This is also the same for process procedures in a case where the backend switch 104 receives data sending or a data request from the processor 101B. In this case, the processor 101A in FIG. 27 is replaced with the processor 101B.

In step 2700, the backend switch 104 receives data or a data request from the processor 101A. In step 2701, the backend switch 104 selects a target one of the paths 107A to 107F to the storage devices 105A to 105F. Next, in step 2702, the backend switch 104 transfers the data sending or the data request to the storage device, and finishes the process.

Figure 8A:
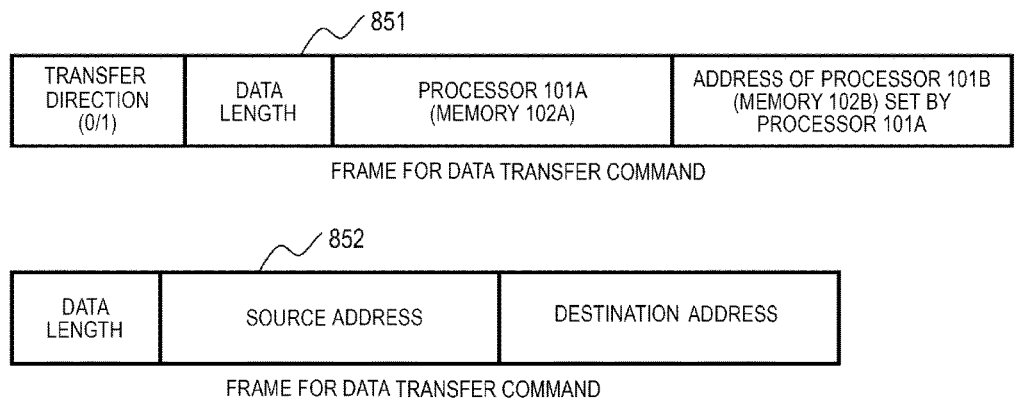
FIG. 8A illustrates a frame format example related to a data transfer command, which can be used in the storage system.

FIG. 8A illustrates a frame format example for a data transfer command which can be used in the storage system according to Example 3. A data transfer command 851 with a first format is an instruction for transferring data from the processor 101A to the backend switch 104. The data transfer command 851 designates a data transfer direction. The first field designates a transfer direction. The transfer direction is expressed in, for example, 0 or 1. For example, 0 indicates that data is transferred from the processor 101A to the processor 101B. 1 indicates that data is transferred from the processor 101B to the processor 101A.

The next field represents a length of data to be transferred. The next field represents an address on the memory 102A in the address space of the processor 101A. The last field represents an address on the memory 102B of the processor 101B, set in the address space of the processor 101A.

Information for designating a data transfer direction is required to be provided in the data transfer command 851, but, for example, an address on the memory 102 of the processor 101B set by the processor 101A in the last field undergoes address translation at all times, and thus an address translation function can be easily provided in the backend switch 104.

A data transfer command 852 with a second format indicates a transfer direction by designating a source address and a destination address. A field for a transfer direction is not necessary. The first field represents a data length. The next field represents a source address. The last field represents a destination address.

Figure 8B:
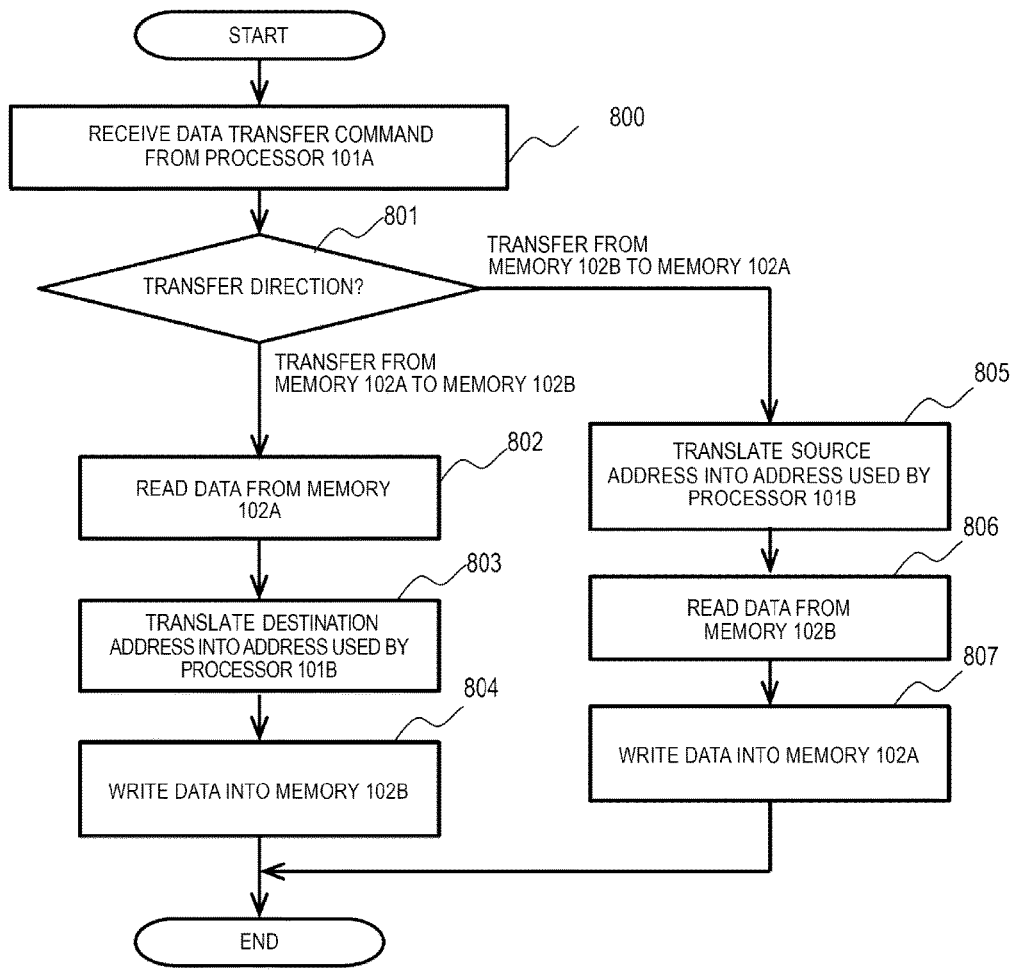
FIG. 8B is a flowchart illustrating examples of process procedures in a case where the backend switch receives the data transfer command from the storage controller.

FIG. 8B is a flowchart illustrating examples of process procedures in a case where the backend switch 104 receives a data transfer command from the processor 101A. This is also the same for process procedures in a case where the backend switch 104 receives a data transfer command from the processor 101B. In this case, in the following description, the processor 101A and the processor 101B are replaced with each other, and the memory 102A and the memory 102B may be replaced with each other.

With reference to FIG. 8B, in step 800, the backend switch 104 receives a data transfer command from the processor 101A. Next, in step 801, the backend switch 104 determines a transfer direction in the received data transfer command. If the transfer direction is transfer from the memory 102A to the memory 102B (801: transfer from the memory 102A to the memory 102B), the process proceeds to step 802.

In step 802, the backend switch 104 reads data transferred from the memory 102A. Next, in step 803, the backend switch 104 translates a destination address designated in the data transfer command by the processor 101A into an address used by the processor 101B. The switching information table 350 is referred to. The processor 101A and the processor 101B are processors which are independent from each other, and addresses for specifying locations on the memories used thereby are defined independently. Thus, also in the present example, mutual addresses are translated into each other according to a predetermined rule.

Finally, in step 804, the backend switch 104 writes the data read from the memory 102A into the memory 102B according to the address obtained through the translation, and finishes the process.

In step 801, if the transfer direction is transfer from the memory 102B to the memory 102A (801: transfer from the memory 102B to the memory 102A), the process proceeds to step 805.

In step 805, in the same manner as in step 803, the backend switch 104 translates a source address designated by the processor 101A into an address used by the processor 101B. Next, in step 806, the backend switch 104 reads data from the memory 102B according to the address obtained through the translation. Finally, in step 807, the backend switch 104 writes the data read from the memory 102B into the memory 102A, and finishes the process.

Figure 9A:
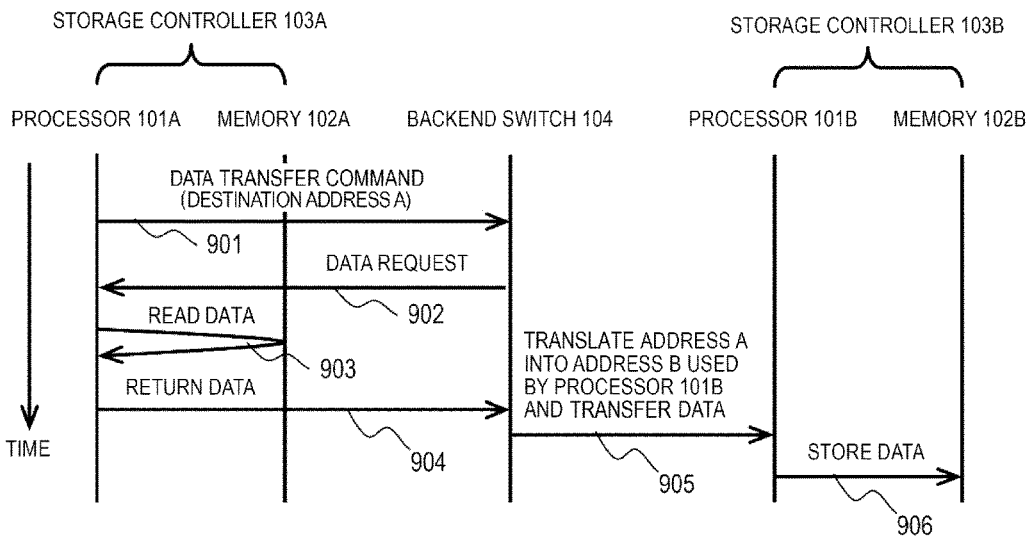
FIG. 9A is a diagram illustrating another example of a sequence of a process in which the first storage controller transfers data to the second storage controller.
Figure 9B:
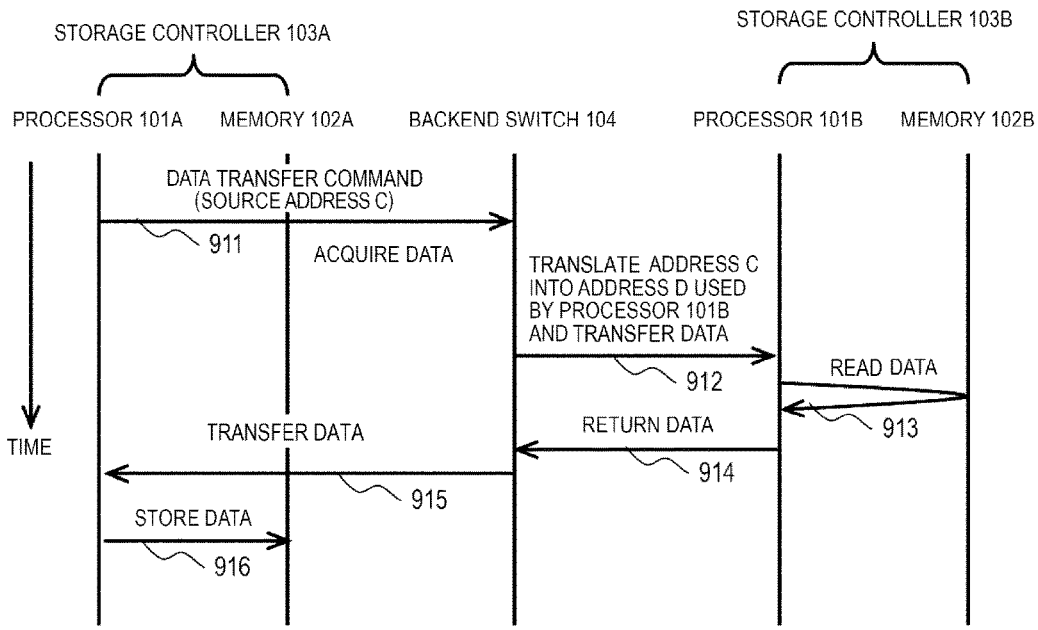
FIG. 9B is a diagram illustrating another example of a sequence of a process in which the first storage controller reads data from the second storage controller.

FIG. 9A illustrates an example of a sequence of a process in which the storage controller 103A transfers data to the storage controller 103B according to the process procedures illustrated in the flowchart of FIG. 8B. FIG. 9B illustrates an example of a sequence of a process in which the storage controller 103A reads data from the storage controller 103B.

This is also the same for a sequence of a process in which the storage controller 103B transfers data to the storage controller 103A or reads data from the storage controller 103A. In this case, in FIGS. 9A and 9B, the storage controller 103A, the processor 101A, and the memory 102A are respectively replaced with the storage controller 103B, the processor 101B, and the memory 102B.

With reference to FIG. 9A, in step 901, the processor 101A transfers a data transfer command including the address A for specifying a location on the memory 102B which is a destination, an address for specifying a location on the memory 102A which is a transfer source, and a length of data to be transferred, to the backend switch 104. The two designated addresses are addresses in the address space of the processor 101A.

In step 902, the backend switch 104 transfers a request for reading transfer source data from the designated data transfer source address of the memory 102A, to the processor 101A.

In step 903, the processor 101A reads data from the requested address on the memory 102A. Next, in step 904, the processor 101A returns the data read from the memory 102A to the backend switch 104. Steps 903 and 904 may be executed by software operating on the processor 101A, and may be executed by functional hardware (circuit) implemented in the processor 101A. If a data request is received from the backend switch 104, the functional hardware automatically reads data from the memory 102A according to a designated address, and returns the data to the backend switch 104.

The backend switch 104 receives the transfer source data from the processor 101A. In step 905, the backend switch 104 translates the address A used for the processor 101A to identify a location on the memory 102B which is a destination and included in the data transfer command transferred from the processor 101A, into the address B on the memory 102B used by the processor 101B. The switching information table 350 is referred to.

The backend switch 104 assigns the address B to the data returned from the processor 101A, and transfers the data to the processor 101B. The reason why the address A is translated into the address B is as described in step 803 in FIG. 8B.

The processor 101B receives the data assigned with the address B from the backend switch 104. In step 906, the processor 101B stores the transferred data in the memory 102B according to the address B. Step 906 may be executed by software operating on the processor 101B, and may be executed by functional hardware (circuit) implemented in the processor 101B. If the data assigned with the address B is received from the backend switch 104, the functional hardware automatically stores the data in the memory 102B according to the address B.

With reference to FIG. 9B, in step 911, the processor 101A transfers a data transfer command to the backend switch 104. The data transfer command includes the address C used for the processor 101A to identify a location on the memory 102B which is a transfer source, an address for identifying a location on the memory 102A which is a destination, and a length of data to be transferred.

In step 912, the backend switch 104 translates the address C included in the data transfer command transferred from the processor 101A, into the address D for the processor 101B to identify a location on the memory 102B. The switching information table 350 is referred to. The backend switch 104 assigns the address D to a data read request, and transfers the request to the processor 101B. The reason why the address C is translated into the address D is as described in step 803 in FIG. 8B.

The processor 101B receives the data request assigned with the address D from the backend switch 104. In step 913, the processor 101B reads data from the memory 102B according to the address D. Next, in step 914, the processor 101B returns the data read from the memory 102B to the backend switch 104.

Steps 913 and 914 may be executed by software operating on the processor 101B, and may be executed by functional hardware (circuit) implemented in the processor 101B. If the data request assigned with the address D is received from the backend switch 104, the functional hardware automatically reads data from the memory 102B according to the address D, and returns the data to the backend switch 104.

In step 912, the backend switch 104 receives the data which is read from the memory 102B in response to the data request transferred to the processor 101B, from the processor 101B. In step 915, the backend switch 104 assigns the address on the memory 102A which is a destination, included in the transfer command, to the received data, and transfers the data to the processor 101A.

If the data assigned with the address on the memory 102A is received from the backend switch 104, in step 916, the processor 101A stores the data in the memory 102A according to the assigned address. Step 916 may be executed by software operating on the processor 101A, and may be executed by functional hardware (circuit) implemented in the processor 101A. If the data assigned with the address on the memory 102A is received from the backend switch 104, the functional hardware automatically stores the data in the memory 102A according to the assigned address.

According to Example 3 described above, in the same manner as in Example 1, the storage controllers 103A and 103B can perform communication with each other by using the backend switch 104. For example, in a case where data to be written to the storage devices 105A to 105F is received from a host computer not illustrated in FIG. 1, the storage controllers 103A and 103B may duplicate the data via the backend switch 104.

As mentioned above, since sufficient reliability and availability can be ensured even if writing to the storage devices 105A to 105F is not completed, the host computer can be notified of write completion before the data is written to the storage devices 105A to 105F. A shared storage area is not required to be provided in the backend switch 104. In the present example, the backend switch and the functional hardware of the processor perform data transfer between a source address and a destination address, and thus it is possible to reduce a processing time in the processor.

The configuration of the storage system illustrated in FIG. 2 may be used instead of the configuration of the storage system illustrated in FIG. 1. In a case of using the configuration of the storage system illustrated in FIG. 2, in the above description, the storage controller 103A is replaced with the storage controller 203A, and the storage controller 103B is replaced with the storage controller 203B.

The processor 101A is replaced with the processor 201A, the processor 101B is replaced with the processor 201B, the memory 102A is replaced with the memory 202A, and the memory 102B is replaced with the memory 202B. The backend switch 104 is replaced with the backend switch 204A or 204B, and the storage devices 105A to 105F are replaced with the storage devices 205A to 205F.

Example 4

Next, Example 4 will be described with reference to FIG. 1 or 2, and FIGS. 4A, 4B, 6A to 7B, 10 and 11. In a case where the configuration illustrated in FIG. 1 is used as a configuration of a storage system of the present example, descriptions of FIGS. 1, 4A, 4B, and 6A to 7B are the same as in Example 1.

Figure 10:
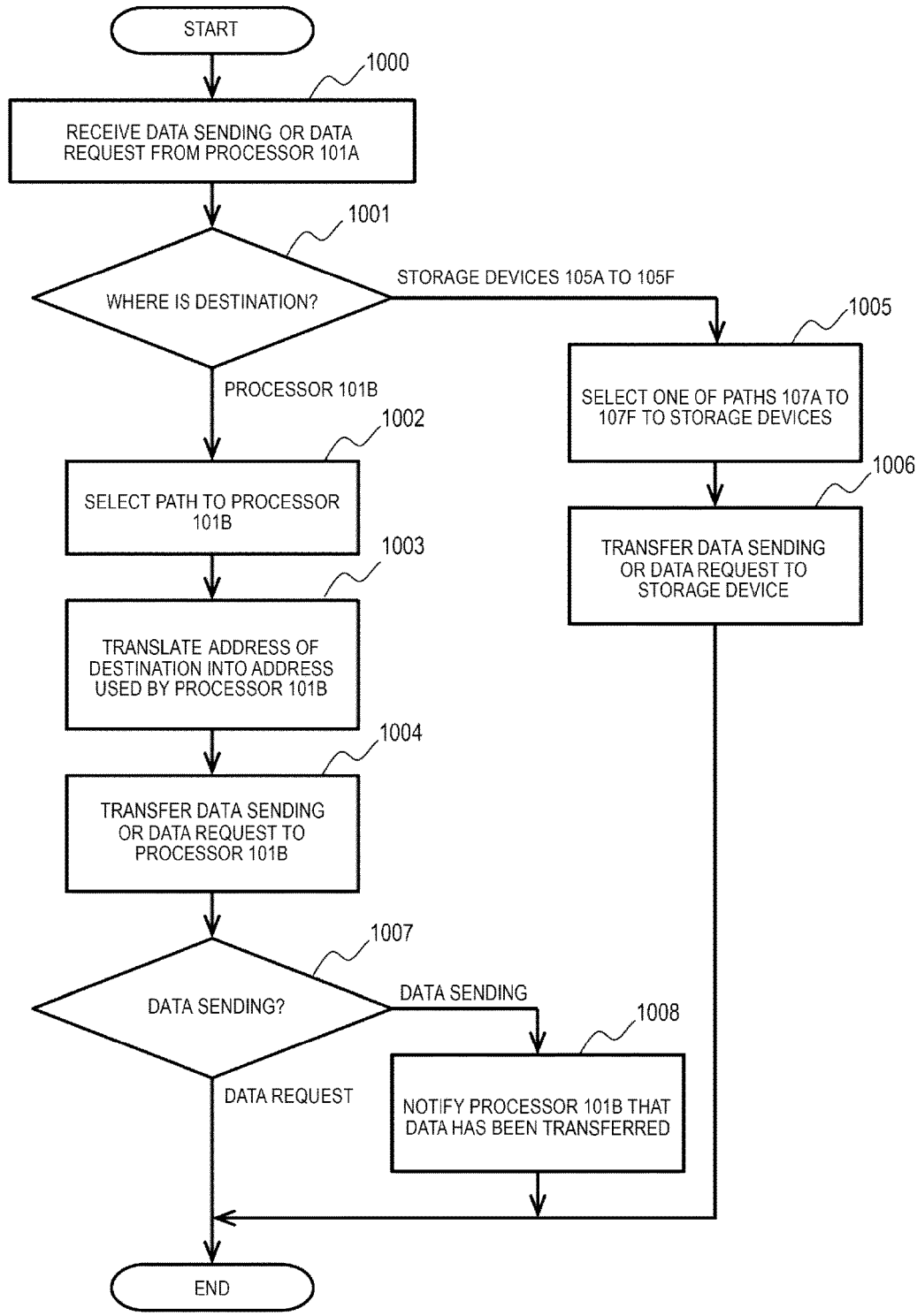
FIG. 10 is a flowchart illustrating other examples of process procedures in a case where the backend switch receives data sending or a data request from the processor.

FIG. 10 is a flowchart illustrating examples of process procedures in a case where the backend switch 104 receives data sending or a data request from the processor 101A in the present example. This is also the same for process procedures in a case where the backend switch 104 receives data sending or a data request from the processor 101B. In this case, the processor 101A in FIG. 10 is replaced with the processor 101B.

In FIG. 10, the descriptions of step 300 to step 306 in FIG. 3C in Example 1 may be applied to processes from step 1000 to step 1006.

In step 1007, the backend switch 104 determines whether the frame transferred from the processor 101A corresponds to transfer of a data to be stored in the memory 102B or a request for reading data from the memory 102B. If a determination result is data sending for storing in the memory 102B (1007: data sending), the backend switch 104 proceeds to step 1008.

In step 1008, the backend switch 104 notifies the processor 101B that data is transferred to be stored in the memory 102B. The processor 101B is notified, for example, by a predefined specific signal to the processor 101B from the backend switch 104. The notification is performed by transferring predefined specific data to a specific address of the processor 101B. An interrupt signal may be sent from the backend switch 104 to the processor 101B.

In step 1007, if a determination result is a request for reading data from the memory 102B (1007: data request), the backend switch 104 finishes the process.

Figure 11:
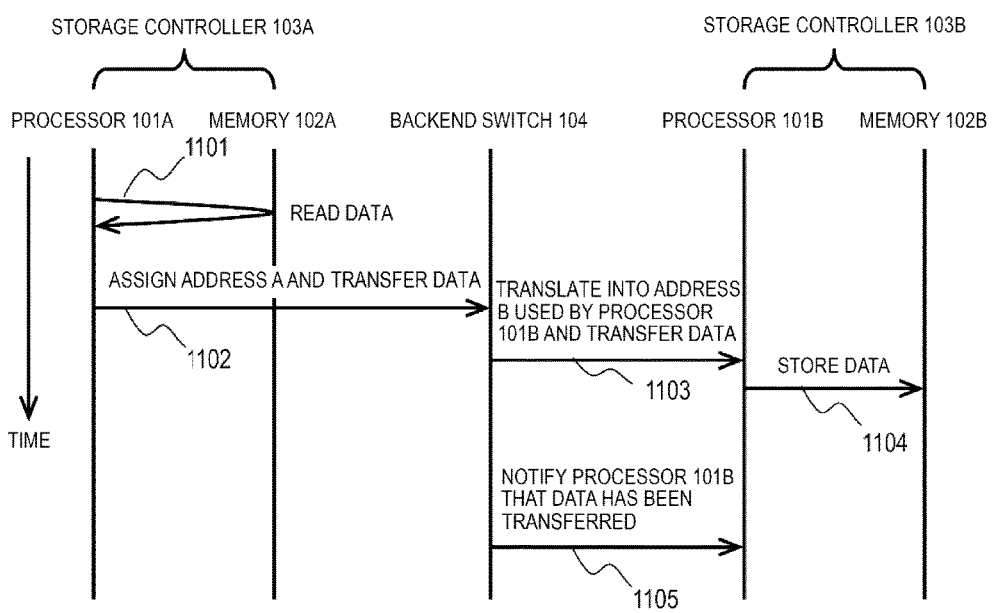
FIG. 11 is a diagram illustrating an example of a sequence of a process in which a first storage controller transfers data to a second storage controller.

FIG. 11 illustrates an example of a sequence of a process in which data is transferred from the storage controller 103A to the storage controller 103B in a case where the backend switch 104 performs a process according to the process procedures illustrated in FIG. 10.

This is also the same for a sequence of a process in which the storage controller 103B transfers data to the storage controller 103A. In this case, in FIG. 11, the storage controller 103A and the storage controller 103B are replaced with each other, the processor 101A and the processor 101B are replaced with each other, and the memory 102A and the memory 102B are replaced with each other.

In FIG. 11, the descriptions of step 501 to step 504 in FIG. 5A in Example 1 may be applied to processes from step 1101 to step 1104. After step 1103, in step 1105, the backend switch 104 notifies the processor 101B that the data has been transferred. A notification method is the same as described in step 1008 in FIG. 10.

As mentioned above, in the present example, a notification of data transfer is sent from the backend switch to the processor. According to the present example, in addition to the effect described in Example 1, it is possible to recognize that data has been transferred from the processor 101A even if the processor 101B does not polling check the content of the memory 102B. Since the content of the memory 102B is not required to be polling checked, performance overhead can be reduced, and thus it is possible to improve the efficiency of the processor 101B.

As a configuration of the storage system of the present example, the configuration illustrated in FIG. 2 may be used instead of the configuration illustrated in FIG. 1. In this case, descriptions of FIGS. 2, 4A, 4B, and 6A to 7B are the same as in Example 2. In descriptions of FIGS. 10 and 11, the storage controller 103A is replaced with the storage controller 203A, and the storage controller 103B is replaced with the storage controller 203B.

The processor 101A is replaced with the processor 201A, the processor 101B is replaced with the processor 201B, the memory 102A is replaced with the memory 202A, and the memory 102B is replaced with the memory 202B. The backend switch 104 is replaced with the backend switch 204A or 204B, and the storage devices 105A to 105F are replaced with the storage devices 205A to 205F.

Example 5

Next, Example 5 will be described with reference to FIG. 1 or 2, and FIGS. 4A, 4B, 6A to 7B, 12, 13A, 13B and 27. In the present example, descriptions of FIGS. 1, 2, 4A, 4B, 6A to 7B, and 27 are the same as in Example 3.

Figure 12:
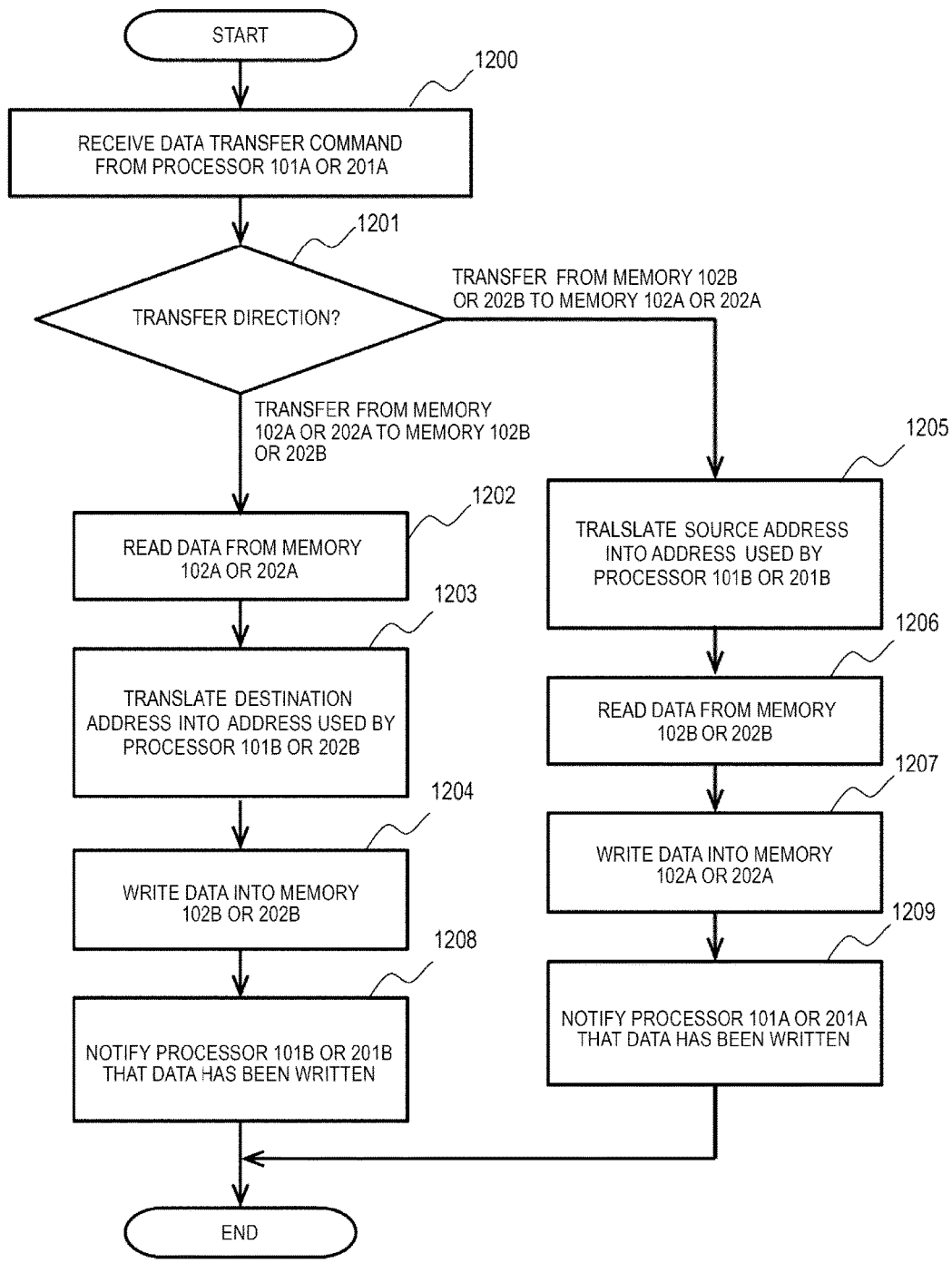
FIG. 12 is a flowchart illustrating other examples of process procedures in a case where the backend switch receives the data transfer command from the storage controller.

A description will be made of a case where the configuration illustrated in FIG. 1 is used as a configuration of the storage system of the present example with reference to FIGS. 12 and 13. FIG. 12 is a flowchart illustrating examples of process procedures in a case where the backend switch 104 receives a data transfer command from the processor 101A.

This is also the same for process procedures in a case where the backend switch 104 receives a data transfer command from the processor 101B. In this case, in FIG. 12, the processor 101A and the processor 101B are replaced with each other, and the memory 102A and the memory 102B may be replaced with each other.

In FIG. 12, the descriptions of step 800 to step 807 in FIG. 8B in Example 3 may be applied to processes from step 1200 to step 1207. In step 1208, the backend switch 104 notifies the processor 101B that the data has been written into the memory 102B.

The processor 101B is notified, for example, by a predefined specific signal to the processor 101B from the backend switch 104. The notification is performed by transferring predefined specific data to a specific address of the processor 101B. An interrupt signal may be sent from the backend switch 104 to the processor 101B.

After step 1207, the backend switch 104 proceeds to step 1209. In step 1209, the backend switch 104 notifies the processor 101A that the data read from the memory 102B has been written into the memory 102A.

The processor 101A is notified, for example, by a predefined specific signal to the processor 101A from the backend switch 104. The notification is performed by transferring predefined specific data to a specific address of the processor 101A. An interrupt signal may be sent from the backend switch 104 to the processor 101A.

Figure 13A:
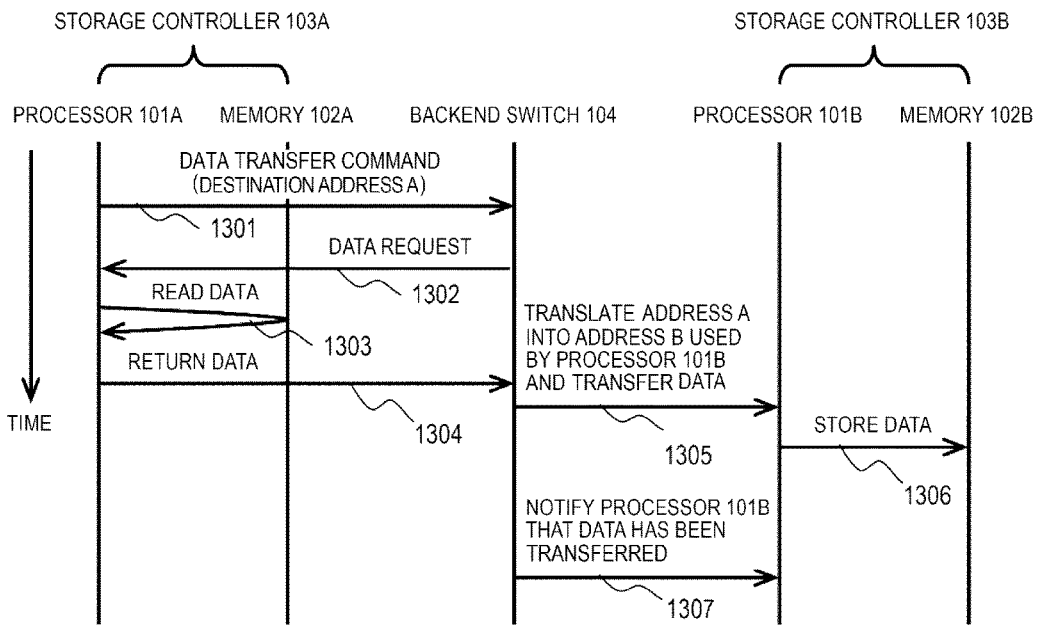
FIG. 13A is a diagram illustrating still another example of a sequence of a process in which the first storage controller transfers data to the second storage controller.
Figure 13B:
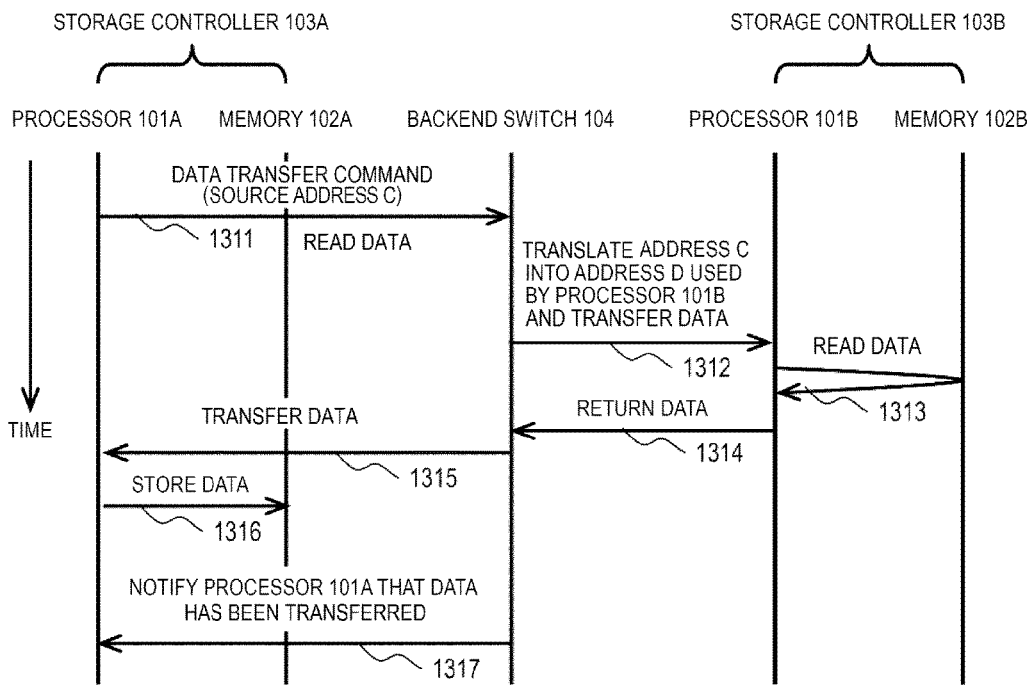
FIG. 13B is a diagram illustrating still another example of a sequence of a process in which the first storage controller reads data from the second storage controller.

FIG. 13A illustrates an example of a sequence of a process in which data is transferred from the storage controller 103A to the storage controller 103B in a case where the backend switch 104 performs a process according to the process procedures illustrated in FIG. 12. FIG. 13B illustrates an example of a sequence of a process in which the storage controller 103A reads data from the storage controller 103B.

This is also the same for a sequence of a process in which the storage controller 103B transfers data to the storage controller 103A or reads data from the storage controller 103A. In this case, in FIGS. 13A and 13B, the storage controller 103A and the storage controller 103B are replaced with each other, the processor 101A and the processor 101B are replaced with each other, and the memory 102A and the memory 102B are replaced with each other.

In FIG. 13A, the descriptions of step 901 to step 906 in FIG. 9A in Example 3 may be applied to step 1301 to step 1306. In FIG. 13A, after step 1305, in step 1307, the backend switch 104 notifies the processor 101B that the data has been transferred. A notification method is the same as described in step 1208 in FIG. 12.

In FIG. 13B, the descriptions of step 911 to step 916 in FIG. 9B in Example 3 may be applied to processes from step 1311 to step 1316. In FIG. 13B, after step 1315, in step 1317, the backend switch 104 notifies the processor 101A that the data has been transferred. A notification method is the same as described in step 1209 in FIG. 12.

As mentioned above, in the present example, a notification of data transfer is sent from the backend switch to the processor. According to the present example, in addition to the effect described in Example 3, it is possible to recognize that data has been transferred from the backend switch 104 even if the processor 101A or 101B does not polling check the content of the memory 102A or 102B. Since the content of the memory 102A or 102B is not required to be polling checked, performance overhead can be reduced, and thus it is possible to improve the efficiency of the processor 101A or 101B.

As a configuration of the storage system of the present example, the configuration illustrated in FIG. 2 may be used instead of the configuration illustrated in FIG. 1. In this case, descriptions of FIGS. 2, 4A, 4B, 6A to 7B, and 27 are the same as in Example 3. In descriptions of FIGS. 12 and 13, the storage controller 103A is replaced with the storage controller 203A, and the storage controller 103B is replaced with the storage controller 203B.

The processor 101A is replaced with the processor 201A, the processor 101B is replaced with the processor 201B, the memory 102A is replaced with the memory 202A, and the memory 102B is replaced with the memory 202B. The backend switch 104 is replaced with the backend switch 204A or 204B, and the storage devices 105A to 105F are replaced with the storage devices 205A to 205F.

Example 6

Next, Example 6 will be described with reference to FIG. 1 or 2, and FIGS. 4A, 4B, 6A to 7B, 14 and 27. In the present example, descriptions of FIGS. 1, 2, 4A, 4B, 6A to 7B, and 27 are the same as in Example 3. A description will be made of a case where the configuration illustrated in FIG. 1 is used as a configuration of the storage system of the present example with reference to FIG. 14.

Figure 14:
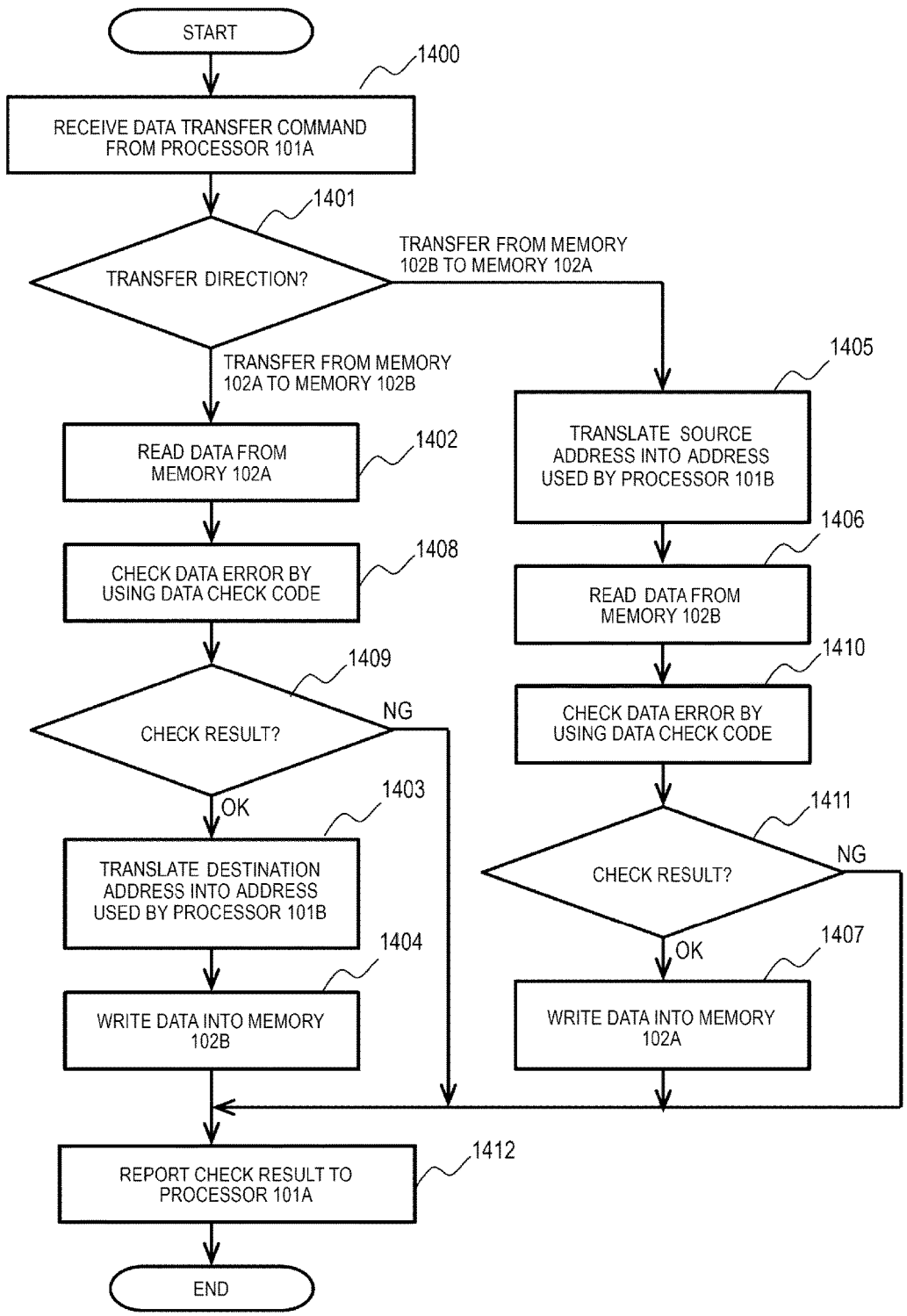
FIG. 14 is a flowchart illustrating still other examples of process procedures in a case where the backend switch receives the data transfer command from the storage controller.

FIG. 14 is a flowchart illustrating examples of process procedures in a case where the backend switch 104 receives a data transfer command from the processor 101A. This is also the same for process procedures in a case where the backend switch 104 receives a data transfer command from the processor 101B. In this case, in FIG. 14, the processor 101A and the processor 101B are replaced with each other, and the memory 102A and the memory 102B may be replaced with each other.

In FIG. 14, the descriptions of step 800 to step 807 in FIG. 8B in Example 3 may be applied to processes from step 1400 to step 1407. In FIG. 14, a data transfer command received from the processor 101A in step 1400 includes a data check code for checking whether or not there is an error in data to be transferred.

The data check code may be, for example, a standard data check code called T10DIF. A data protection code which can be collated with the data check code may be assigned to a check target, and may be supplied to the backend switch 104 separately from a check target.

In FIG. 14, the process proceeds to step 1408 after step 1402. In step 1408, the backend switch 104 checks whether or not there is an error in the data read from the memory 102A in step 1402 by using the data check code included in the data transfer command received from the processor 101A.

Next, the process proceeds to step 1409, and the backend switch 104 determines whether or not there is an error as a check result. If there is no error (1409: OK), the process proceeds to step 1403. If there is an error (1409: NG), the backend switch 104 does not write the data into the memory 102B, and proceeds to step 1412. The backend switch 104 also proceeds to step 1412 after step 1404.

The process proceeds to step 1410 after step 1406. In step 1410, the backend switch 104 checks whether or not there is an error in the data read from the memory 102B in step 1406 by using the data check code included in the data transfer command received from the processor 101A.

Next, the process proceeds to step 1411, and the backend switch 104 determines whether or not there is an error as a check result. If there is no error (1411: OK), the backend switch 104 proceeds to step 1407. If there is an error (1411: NG), the backend switch 104 does not write the data into the memory 102A, and proceeds to step 1412. The backend switch 104 also proceeds to step 1412 after step 1403.

In step 1412, the backend switch 104 reports the check result in step 1408 or step 1410 to the processor 101A, and finishes the process.

As mentioned above, according to the present example, in addition to the effect described in Example 3, it is possible for the backend switch 104 to check whether or not there is an error in data to be transferred. Therefore, it is possible to increase integrity of data to be transferred, and performance overhead is not caused in the processor 101A or 101B due to data error checking.

As a configuration of the storage system of the present example, the configuration illustrated in FIG. 2 may be used instead of the configuration illustrated in FIG. 1. In this case, descriptions of FIGS. 2, 4A, 4B, 6A to 7B, and 27 are the same as in Example 3. In a description of FIG. 14, the processor 101A is replaced with the processor 201A, the processor 101B is replaced with the processor 201B, the memory 102A is replaced with the memory 202A, and the memory 102B is replaced with the memory 202B. The backend switch 104 is replaced with the backend switch 204A or 204B, and the storage devices 105A to 105F are replaced with the storage devices 205A to 205F.

Example 7

Next, Example 7 will be described with reference to FIG. 1 or 2, and FIGS. 4A, 4B, 6A to 7B, 15, 16 and 27. In the present example, descriptions of FIGS. 1, 2, 4A, 4B, 6A to 7B, and 27 are the same as in Example 3. A description will be made of a case where the configuration illustrated in FIG. 1 is used as a configuration of the storage system of the present example with reference to FIGS. 15 and 16.

Figure 15:
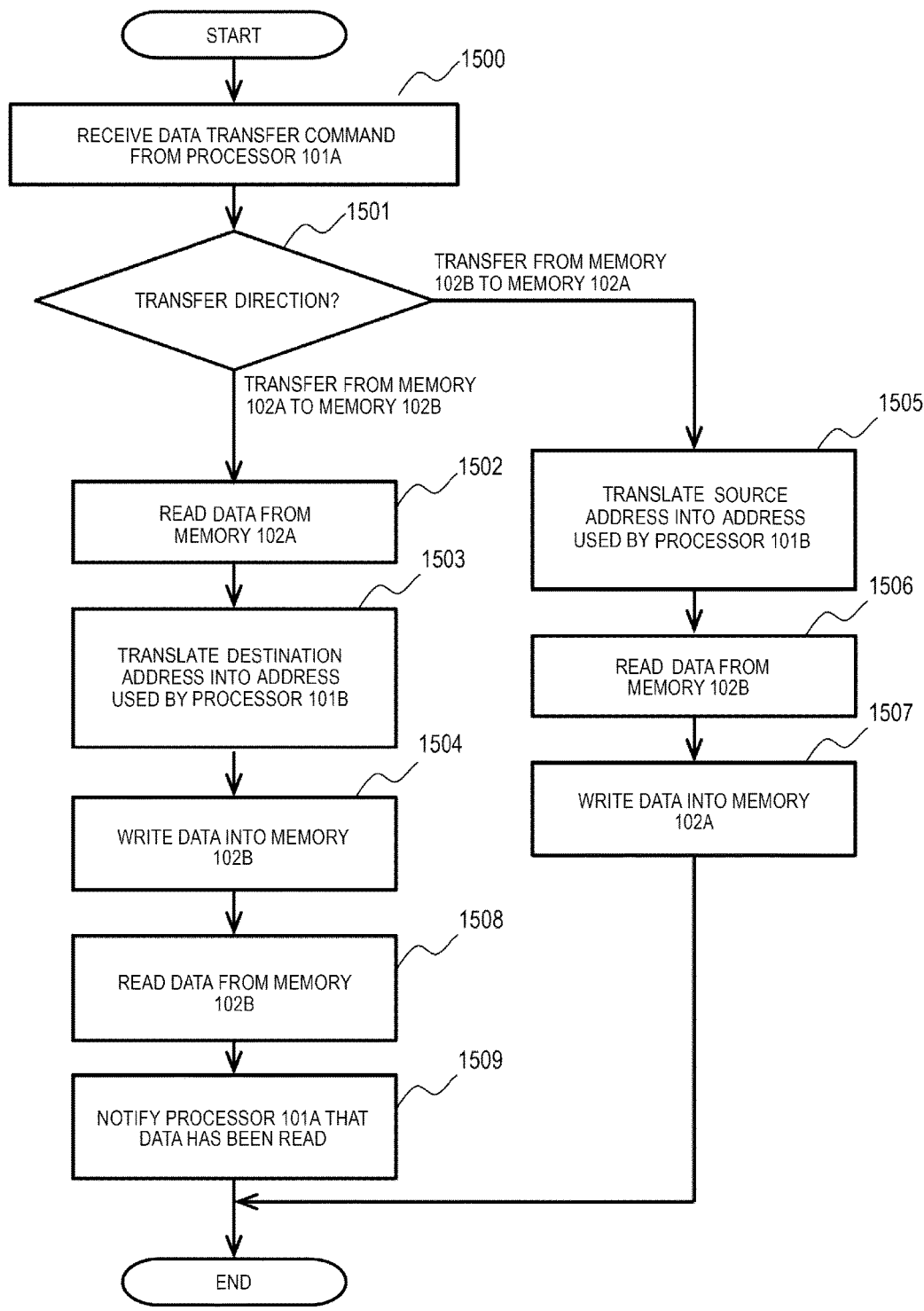
FIG. 15 is a flowchart illustrating still other examples of process procedures in a case where the backend switch receives the data transfer command from the storage controller.

FIG. 15 is a flowchart illustrating examples of process procedures in a case where the backend switch 104 receives a data transfer command from the processor 101A. This is also the same for process procedures in a case where the backend switch 104 receives a data transfer command from the processor 101B. In this case, in FIG. 15, the processor 101A and the processor 101B are replaced with each other, and the memory 102A and the memory 102B may be replaced with each other.

In FIG. 15, the descriptions of step 800 to step 807 in FIG. 8 in Example 3 may be applied to processes from step 1500 to step 1507. In FIG. 15, the backend switch 104 proceeds to step 1508 after step 1504.

In step 1508, the backend switch 104 reads the data written into the memory 102B again. Owing to this step, it is possible to ensure that the process of reliably writing the data into the memory 102B is completed in step 1504. A length of the data read in step 1508 may be the same as a length of the data written in step 1504, and may be a part of the length of the data written in step 1504. For example, the backend switch 104 may read the last part of the data written in step 1504.

In step 1509, the backend switch 104 notifies the processor 101A that the data has been read. The notification may be performed, for example, by transferring the whole or part of the data read in step 1508 to the processor 101A, and may be performed by transferring a predefined specific signal to the processor 101A.

In a case where the whole or part of the read data is transferred to the processor 101A, the whole or part of the transferred data is discarded by the processor 101A. In a case where there is the whole or part of the data not transferred to the processor 101A from the backend switch 104, the data not transferred to the processor 101A is discarded by the backend switch 104.

The notification may be performed by transferring separately predefined specific data to a specific address in the address space of the processor 101A, and may be performed by sending an interrupt signal from the backend switch 104 to the processor 101A. In the above-described way, it is possible to notify the processor 101A that the process of writing data into the memory 102B is completed.

Figure 16:
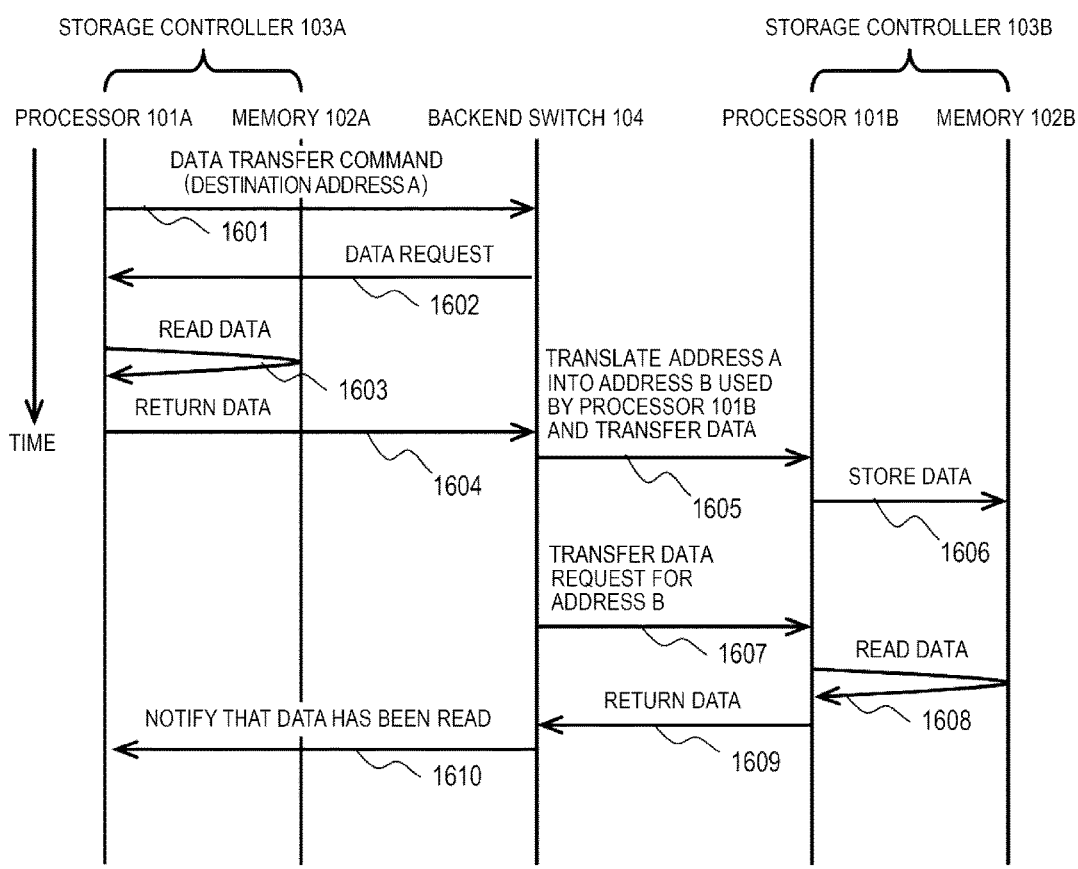
FIG. 16 is a diagram illustrating still another example of a sequence of a process in which the first storage controller transfers data to the second storage controller.

FIG. 16 illustrates an example of a sequence of a process in which data is transferred from the storage controller 103A to the storage controller 103B in a case where the backend switch 104 performs a process according to the process procedures illustrated in FIG. 15. This is also the same for a flow of a process in which the storage controller 103B transfers data to the storage controller 103A.

In this case, in FIG. 16, the storage controller 103A and the storage controller 103B are replaced with each other, the processor 101A and the processor 101B are replaced with each other, and the memory 102A and the memory 102B are replaced with each other.

In FIG. 16, the descriptions of step 901 to step 906 in FIG. 9A in Example 3 may be applied to processes from step 1601 to step 1606. In FIG. 16, in step 1607, the backend switch 104 transfers a request for reading the data from the memory 102B by using the address B used in step 1605 again, to the processor 101B.

A length of data to be read may be the same as a length of the data assigned with the address B and transferred in step 1605, and may be a part of the length of the data assigned with the address B and transferred in step 1605. This is the same as described in step 1508 in FIG. 15. For example, the backend switch 104 may change a length of data to be read and the address B such that the last part of the data transferred in step 1605.

If the data request assigned with the address B is received from the backend switch 104, in step 1608, the processor 101B reads the data from the memory 102B according to the address B. Next, in step 1609, the processor 101B returns the data read from the memory 102B to the backend switch 104.

Steps 1608 and 1609 may be executed by software operating on the processor 101B, and may be executed by functional hardware (circuit) implemented in the processor 101B. If the data request assigned with the address B is received from the backend switch 104, the functional hardware automatically reads the data from the memory 102B according to the address B, and returns the data to the backend switch 104.

If the data with the address B is received from the processor 101B, in step 1610, the backend switch 104 notifies the processor 101A that the data has been read from the memory 102B. A notification method is as described in step 1509 in FIG. 15.

As mentioned above, according to the present example, in addition to the effect described in Example 3, in a case where data is transferred from the storage controller 103A to the storage controller 103B, it is possible to confirm that the data can be stored in the memory 102B. For example, in a case where data to be written to the storage devices 105A to 105F is received from a host computer not illustrated in FIG. 1, it is possible to ensure that the storage controllers 103A and 103B can duplicate the data.

Since sufficient reliability and availability can be ensured even if writing to the storage devices 105A to 105F is not completed, the host computer can be notified of write completion before the data is written to the storage devices 105A to 105F. In the present example, it is possible to more reliably ensure duplication of data than in Example 3.

As a configuration of the storage system of the present example, the configuration illustrated in FIG. 2 may be used instead of the configuration illustrated in FIG. 1. In this case, descriptions of FIGS. 2, 4A, 4B, 6A to 7B, and 27 are the same as in Example 3. In descriptions of FIGS. 15 and 16, the storage controller 103A is replaced with the storage controller 203A, and the storage controller 103B is replaced with the storage controller 203B.

The processor 101A is replaced with the processor 201A, the processor 101B is replaced with the processor 201B, the memory 102A is replaced with the memory 202A, and the memory 102B is replaced with the memory 202B. The backend switch 104 is replaced with the backend switch 204A or 204B, and the storage devices 105A to 105F are replaced with the storage devices 205A to 205F.

Example 8

Figure 17:
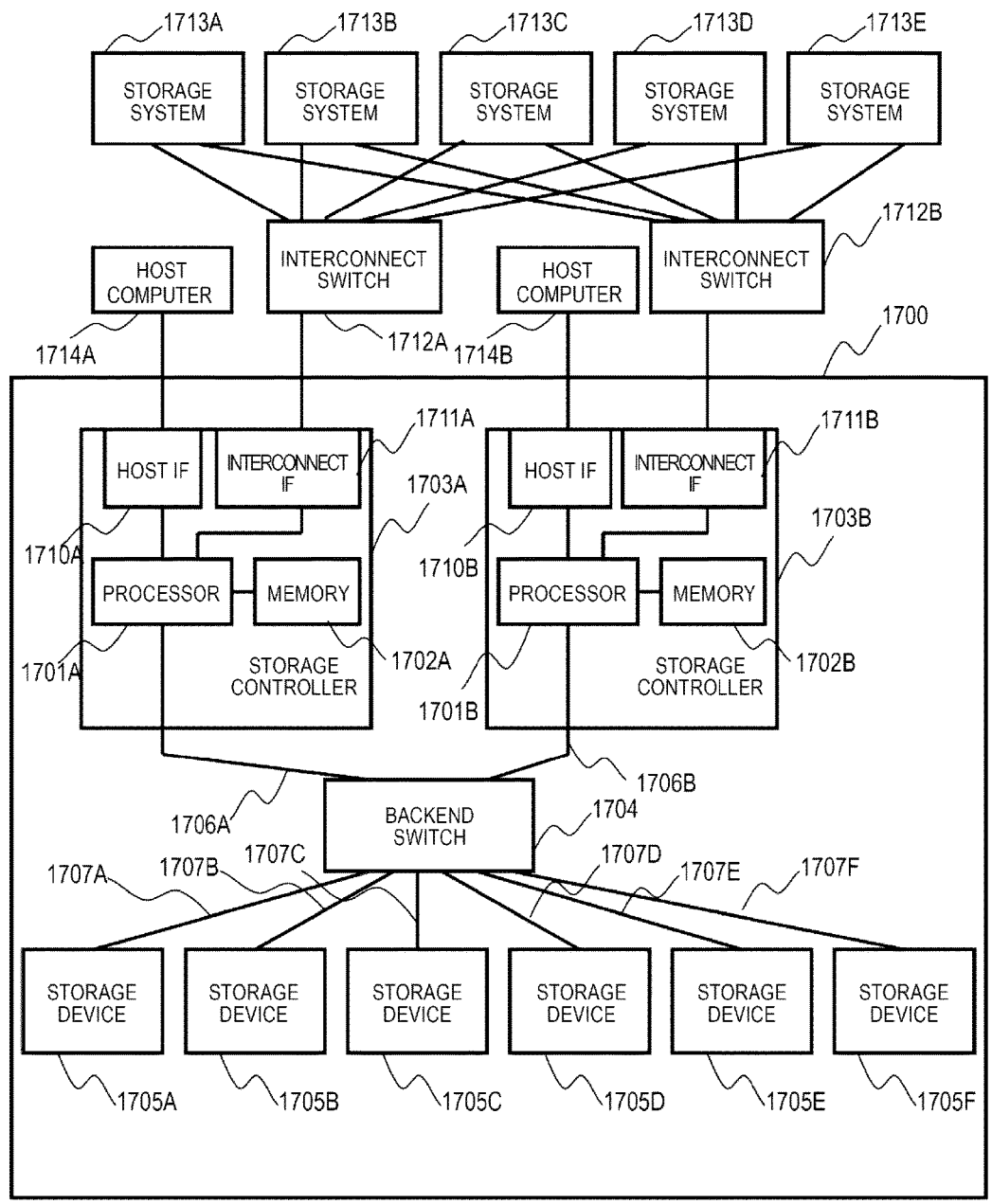
FIG. 17 illustrates a configuration example in which a storage system is connected to another storage system.

Example 8 will be described with reference to FIG. 17 or 18, and FIGS. 19 and 20. FIG. 17 is a diagram illustrating an example of a storage system according to Example 8. In FIG. 17, a storage system 1700 includes two storage controllers 1703A and 1703B.

The storage controller 1703A is configured to include a processor 1701A, a memory 1702A, a host IF (interface) 1710A connected to a host computer 1714A, and an interconnect IF 1711A. The storage controller 1703B is configured to include a processor 1701B, a memory 1702B, a host IF 1710B connected to a host computer 1714B, and an interconnect IF 1711B.

The interconnect IFs 1711A and 1711B are connected to other storage systems 1713A to 1713E via interconnect switches 1712A and 1712B which are different from a backend switch 1704.

The storage system 1700 includes storage devices 1705A to 1705F. The storage devices 1705A to 1705F are connected to the backend switch 1704 via paths 1707A to 1707F, respectively. FIG. 17 illustrates six storage devices 1705A to 1705F, but any number of storage devices may be used.

FIG. 17 illustrates five storage systems 1713A to 1713E, but any number of storage systems may be used. Other storage systems 1713A to 1713E may have the same configuration as that of the storage system 1700.

The respective host computers 1714A and 1714B may be virtual machines (computers) realized by software operating on the processors 1701A and 1701B or other processors of the storage controllers 1703A and 1703B. The software exchanges requests and responses with the storage system 1700 via a software driver instead of the host IF 1710A or 1710B.

Figure 18:
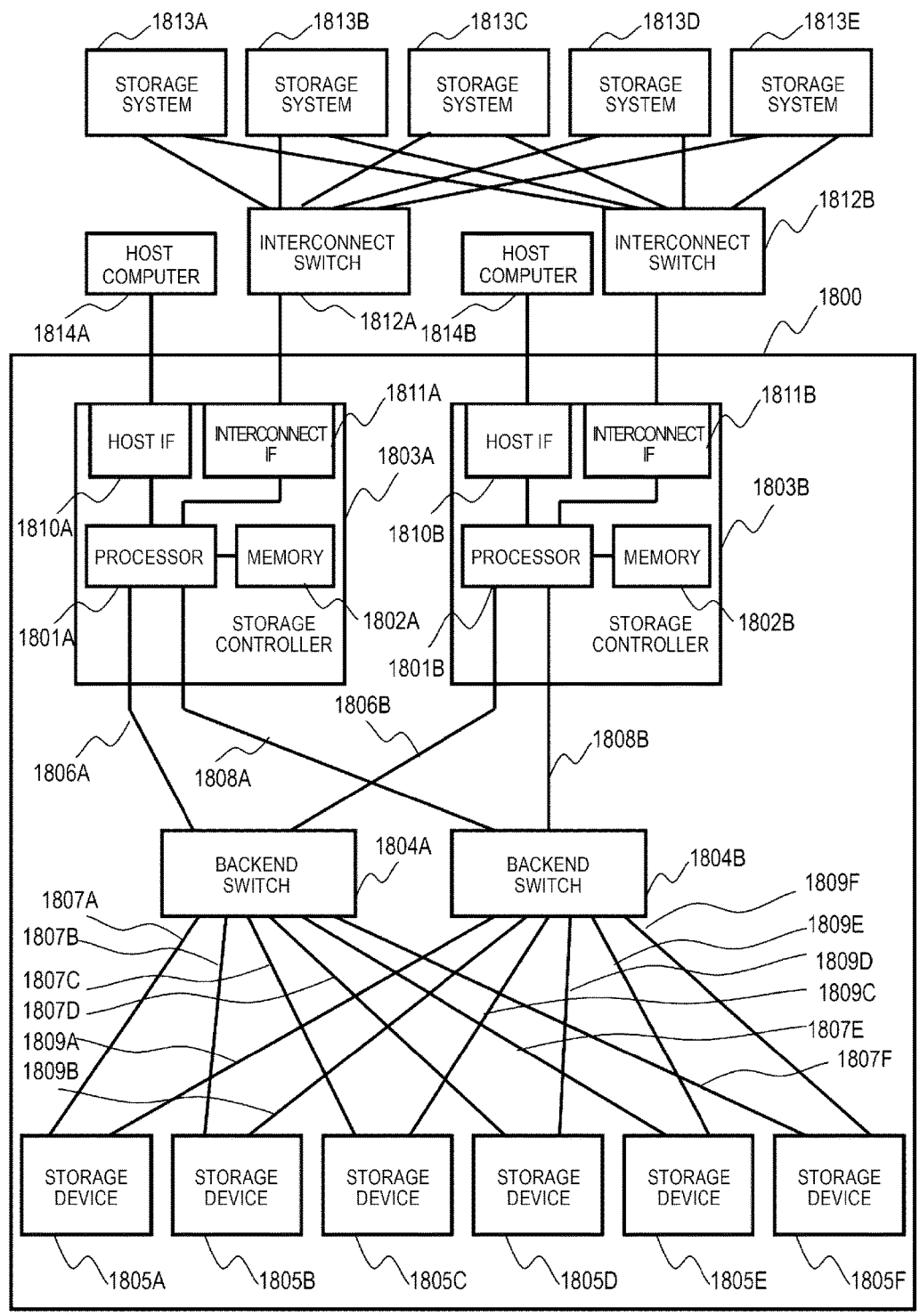
FIG. 18 illustrates another configuration example in which a storage system is connected to another storage system.

FIG. 18 is a diagram illustrating an example of a configuration of a storage system using two backend switches instead of FIG. 17. In FIG. 18, a storage system 1800 includes two storage controllers 1803A and 1803B.

The storage controller 1803A is configured to include a processor 1801A, a memory 1802A, a host IF 1810A connected to a host computer 1814A, and an interconnect IF 1811A. The storage controller 1803B is configured to include a processor 1801B, a memory 1802B, a host IF 1810B connected to a host computer 1814B, and an interconnect IF 1811B.

The storage system 1800 includes two backend switches 1804A and 1804B which are independent from each other. The processor 1801A is connected to the backend switches 1804A and 1804B via paths 1806A and 1808A, respectively. The processor 1801B is connected to the backend switches 1804A and 1804B via paths 1806B and 1808B, respectively.

The storage system 1800 includes storage devices 1805A to 1805F. The storage devices 1805A to 1805F are connected to the backend switch 1804A via paths 1807A to 1807F, respectively. The storage devices 1805A to 1805F are connected to the backend switch 1804B via paths 1809A to 1809F, respectively.

The processors 1801A and 1801B are connected to all of the storage devices 1805A to 1805F and one of the processors 1801B and 1801A by using only one of the backend switches 1804A and 1804B. With this configuration, even if an operation of one of the backend switches 1804A and 1804B is stopped, or one of the paths connected to one thereof is disconnected, the storage system 1800 can continuously perform both of communication between the processors 1801A and 1801B and communication between the processor 1801A or 1801B and the storage devices 1805A to 1805F can be continuously performed. Consequently, it is possible to increase the availability of the system.

The interconnect IFs 1811A and 1811B are connected to other storage systems 1813A to 1813E via interconnect switches 1812A and 1812B which are different from the backend switches 1804A and 1804B.

FIG. 18 illustrates six storage devices 1805A to 1805F, but any number of storage devices may be used in the present example. FIG. 18 illustrates five storage systems 1813A to 1813E, but any number of storage systems may be used in the present example.

Other storage systems 1813A to 1813E may have the same configuration as that of the storage system 1800. The host computers 1814A and 1814B may be virtual machines (computers) in the same manner as the host computers 1714A and 1714B in FIG. 17.

Figure 19:
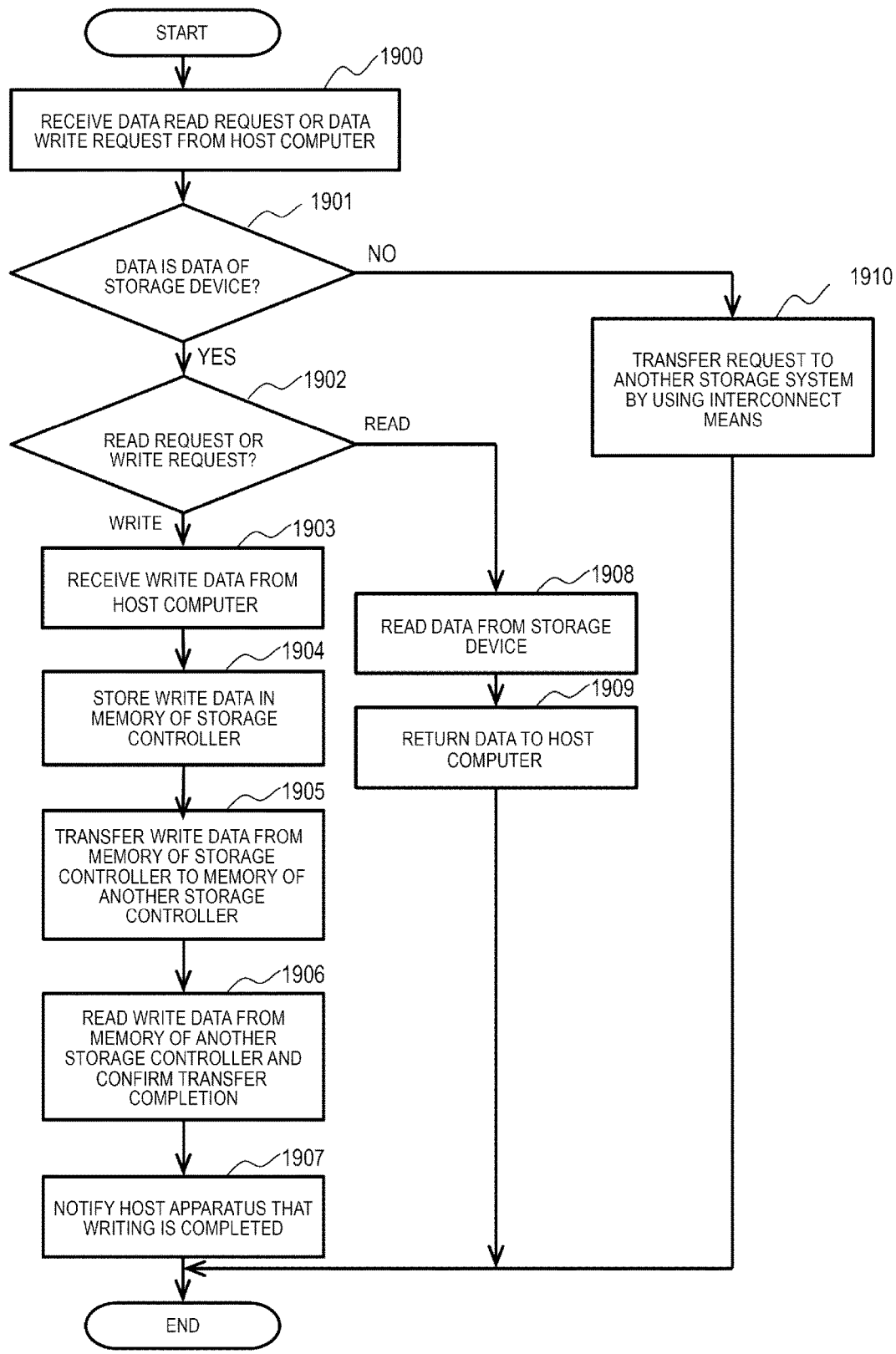
FIG. 19 is a flowchart illustrating examples of process procedures in a case where one storage controller of the storage system receives a request from a host computer.

FIG. 19 is a flowchart illustrating examples of procedures of a process performed by the storage controller 1703A, 1703B, 1803A or 1803B according to the present example. In FIG. 19, in step 1900, the storage controller receives a data read request or a data write request from the host computer.

In step 1901, the storage controller determines whether or not the received request is a request for data stored in the storage device of the storage system including the storage controller. For example, the storage controller performs the determination by referring to information for managing a relationship between an address indicated by a request from the host computer and a storage device.

If the received request is a request for data stored in the storage device of the storage system including the storage controller (1901: YES), the storage controller proceeds to step 1902. In step 1902, the storage controller determines whether the request received from the host computer is a request for reading or writing of data. If the request is a request for writing (1902: write), the storage controller proceeds to step 1903.

In step 1903, the storage controller receives data to be written (hereinafter, referred to as write data) from the host computer. Next, in step 1904, the storage controller stores the received write data in the memory of the storage controller.

Next, in step 1905, the storage controller transfers the data stored in the memory of the storage controller to the memory of the other storage controller via the backend switch of the same storage system.

In step 1906, the storage controller reads the write data transferred to the memory of the other storage controller again, and confirms that the data is stored in the memory of the other storage controller. A length of the data read again in step 1906 may be the same as a length of the data transferred in step 1905, and may be a part of the length of the data transferred in step 1905. For example, the storage controller may read the last part of the data transferred in step 1905.

Finally, in step 1907, the storage controller notifies the host computer of write completion.

In step 1902, if the request received from the host computer is a request for reading of data (1902: read), the storage controller proceeds to step 1908. In step 1908, the storage controller reads the data from the storage device of the same storage system. Next, the storage controller proceeds to step 1909, and returns the data read from the storage device to the host computer.

The storage controller may store the read data in the memory of the storage controller. In response to the next request for reading of the same data, the storage controller returns the data stored in the memory without reading the data from the storage device.

In step 1901, if the request received from the host computer is not a request for data stored in the storage device of the storage system including the storage controller (1901: NO), the storage controller proceeds to step 1910.

In step 1910, the storage controller transfers the read or write request received from the host computer to another storage system via the interconnect IF and the interconnect switch.

Figure 20:
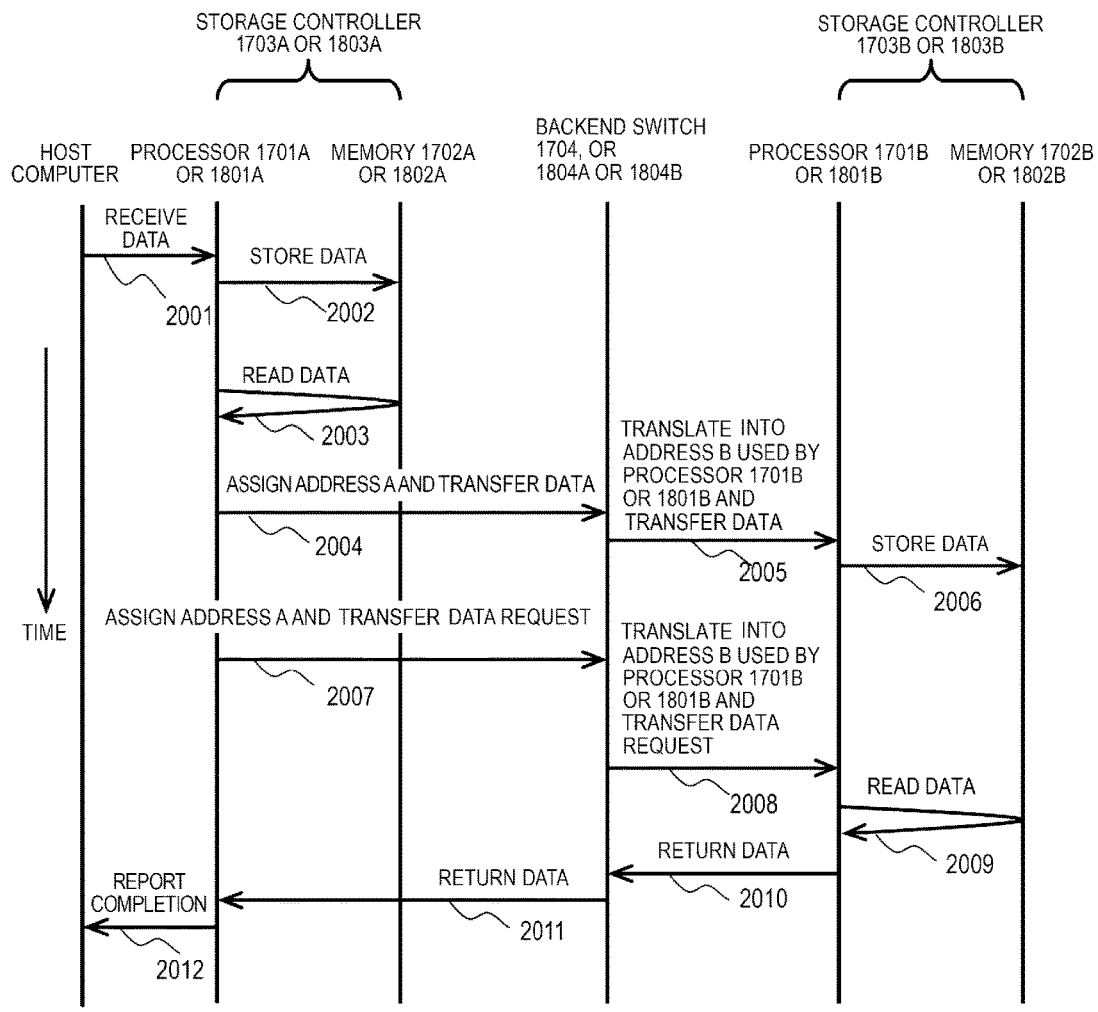
FIG. 20 is a flowchart illustrating an example of a sequence of a process in a case where the storage controller receives a data write request from the host computer.

FIG. 20 illustrates an example of a sequence in a case where the process procedures in the storage controller 1703A or 1803A are performed according to the flowchart of FIG. 19. FIG. 20 illustrates an example of a process in a case of receiving, from a host computer, a request for writing data in the storage devices 1705A to 1705F of the storage system 1700 or the storage devices 1805A to 1805F of the storage system 1800.

This is also the same for a sequence of a process in which the storage controller 1703B or 1803B receives, from the host computer, a request for writing data in the storage devices 1705A to 1705F of the storage system 1700 or the storage devices 1805A to 1805F of the storage system 1800.

In this case, in FIG. 20, the storage controller 1703A or 1803A is replaced with the storage controller 1703B or 1803B. The processor 1701A or 1801A is replaced with the processor 1701B or 1801B. The memory 1702A or 1802A is replaced with the memory 1702B or 1802B.

In FIG. 20, if a data write request is received from the host computer, in step 2001, the storage controller 1703A or 1803A receives write data. In step 2002, the processor 1701A or 1801A stores the received write data into the memory 1702A or 1802A.

Next, in step 2003, the processor 1701A or 1801A reads the data stored in the memory 1702A or 1802A again. In step 2004, the processor 1701A or 1801A assigns the address A for identifying a location on the memory 1702B or 1802B to the read data, and transfers the data to the backend switch 1704, 1804A or 1804B. The data is transferred by using, for example, the frame 333 for data sending illustrated in FIG. 3A.

Steps 2003 and 2004 may be executed by software operating on the processor 1701A or 1801A, and may be executed by functional hardware (circuit) implemented in the processor 1701A or 1801A. The software designates a location to read data on the memory 1702A or 1802A, the address A for identifying a location on the memory 1702B or 1802B, and a length of data to be transferred, and the functional hardware operates according to the designated information.

The backend switch 1704 or the backend switch 1804A or 1804B receives the data sending from the processor 1701A or 1801A. In step 2005, the backend switch 1704 or the backend switch 1804A or 1804B translates the assigned address A into the address B for the processor 1701B or 1801B identifying a location on the memory 1702B or 1802B. The data sending including the address B obtained through the translation is transferred to the processor 1701B or 1801B.

The processor 1701B or 1801B receives the data assigned with the address B from the backend switch 1704, 1804A or 1804B. In step 2006, the processor 1701B or 1801B stores the received data in the memory 1702B or 1802B on the basis of the address B.

Step 2006 may be executed by software operating on the processor 1701B or 1801B, and may be executed by functional hardware (circuit) implemented in the processor 1701B or 1801B. If the data assigned with the address B is received from the backend switch, the functional hardware automatically stores the data in the memory 1702B or 1802B according to the address B.

Next, in step 2007, the processor 1701A or 1801A transfers a request for reading the data stored in the memory 1702B or 1802B by using the address A again, to the backend switch 1704 or the backend switch 1804A or 1804B. The data request is transferred by using, for example, the frame 331 for data request illustrated in FIG. 3A.

In this case, a length of data to be read may be the same as a length of the data assigned with the address A and transferred in step 2004, and may be a part of the length of the data assigned with the address A and transferred in step 2004. For example, a length of data to be read and the address A may be changed such that the last part of the data transferred in step 2004. This is the same as described in step 1906 in FIG. 19.

Step 2007 may be executed by software operating on the processor 1701A or 1801A, and may be executed by functional hardware (circuit) implemented in the processor 1701A or 1801A. The software designates the address A for identifying a location on the memory 1702B or 1802B, and a length of data to be read, and the functional hardware operates according to the designated information.

In step 2008, the backend switch 1704 or the backend switch 1804A or 1804B translates the address A into the address B again, and transfers a request for reading data to the processor 1701B or 1801B.

The processor 1701B or 1801B receives the data read request from the backend switch 1704 or the backend switch 1804A or 1804B. In step 2009, the processor 1701B or 1801B reads data from the memory 1702B or 1802B according to the assigned address B.

In step 2010, the processor 1701B or 1801B returns the read data to the backend switch 1704 or the backend switch 1804A or 1804B.

Steps 2009 and 2010 may be executed by software operating on the processor 1701B or 1801B, and may be executed by functional hardware (circuit) implemented in the processor 1701B or 1801B.

If the data request assigned with the address B is received from the backend switch 1704 or the backend switch 1804A or 1804B, the functional hardware automatically reads the data from the memory 1702B or 1802B according to the address B, and returns the data to the backend switch 1704 or the backend switch 1804A or 1804B.

The backend switch 1704 or the backend switch 1804A or 1804B receives the returned data from the processor 1701B or 1801B. In step 2011, the backend switch 1704 or the backend switch 1804A or 1804B returns the data to the processor 1701A or 1801A.

The processor 1701A or 1801A receives the returned data from the backend switch 1704 or the backend switch 1804A or 1804B. In step 2012, the processor 1701A or 1801A reports completion of writing of the data to the host computer.

With the above-described configuration, in a case where write data received from the host computer is transferred between the storage controllers and is duplicated in the storage system, it is possible to ensure duplication.

Since the duplication is ensured, sufficient reliability and availability can be ensured even if writing to the storage devices is not completed. As a result, the host computer can be notified of data write completion before the data is written to the storage devices.

As mentioned above, in the present example, the storage system 1700 or 1800 can provide an effect called scale-out of adding capacity or performance to other storage systems.

In order to make the effect called scale-out and the availability of the storage system compatible with each other, data is held to be redundant among a plurality of storage systems related to the scale-out effect. Maintaining of redundancy of data among the storage systems also requires maintaining of consistency of the data, and thus performance overhead is caused. The usage efficiency of a storage capacity of each storage system is also reduced due to maintaining of the redundancy.

In contrast, the storage system 1800 according to the present example has considerably high availability, and thus is not required to redundantly hold data with other storage systems. Therefore, performance overhead is not caused, and the usage efficiency of the storage capacity of each storage system is not reduced.

In the storage system according to the present example, for example, a first storage controller includes a first interconnect unit, and a second storage controller includes a second interconnect unit. The first and second interconnect units are connected to a backend switch and one or more different interconnect switches. The interconnect switches are connected to a second storage system. The first or second storage controller receives a data read or write request from a host computer, and determines whether requested data has been stored or is to be stored in a storage device in the received data read or write request. If it is determined that the data has not been stored or is not to be stored in the storage device, the first or second storage controller transfers the data read or write request to the second storage system by using the first or second interconnect unit and the interconnect switch.

Example 9

Figure 21:
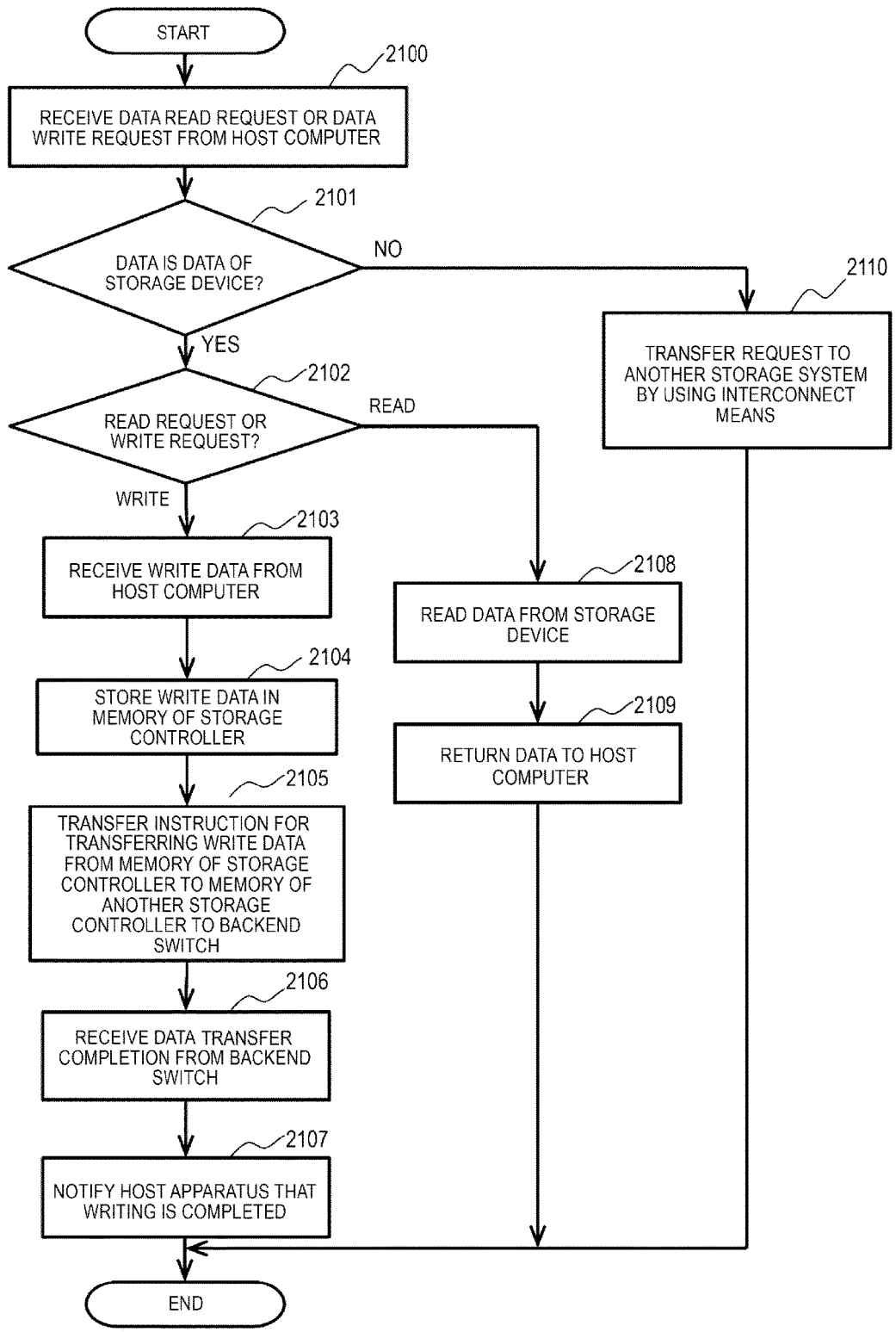
FIG. 21 is a flowchart illustrating other examples of process procedures in a case where one storage controller of the storage system receives a request from the host computer.

Example 9 will be described FIGS. 21 and 22. A configuration example of a storage system in Example 9 is the configuration illustrated in FIG. 17 or 18. FIG. 21 is a flowchart illustrating examples of procedures of a process performed by the storage controller 1703A or 1703B of the storage system 1700 illustrated in FIG. 17, or the storage controller 1803A or 1803B of the storage system 1800 illustrated in FIG. 18.

In FIG. 21, the descriptions of steps 1900 to 1904, and steps 1907, and 1908 to 1910 in FIG. 19 described in Example 8 may be applied to processes from steps 2100 to 2104, step 2107, and steps 2108 to 2110. In FIG. 21, in step 2105, the storage controller transfers an instruction for transferring write data from the memory to the memory of the other storage controller of the same storage system, to the backend switch.

If the instruction is received, the backend switch transfers the designated write data from the memory of the storage controller to the memory of the other storage controller. The backend switch reads the memory of the other storage controller again so as to confirm that the transfer is completed, and notifies the storage controller that the data transfer is completed.

In step 2106, the storage controller receives the notification of data transfer completion from the backend switch. In step 2107, the storage controller notifies the host computer of write completion.

Figure 22:
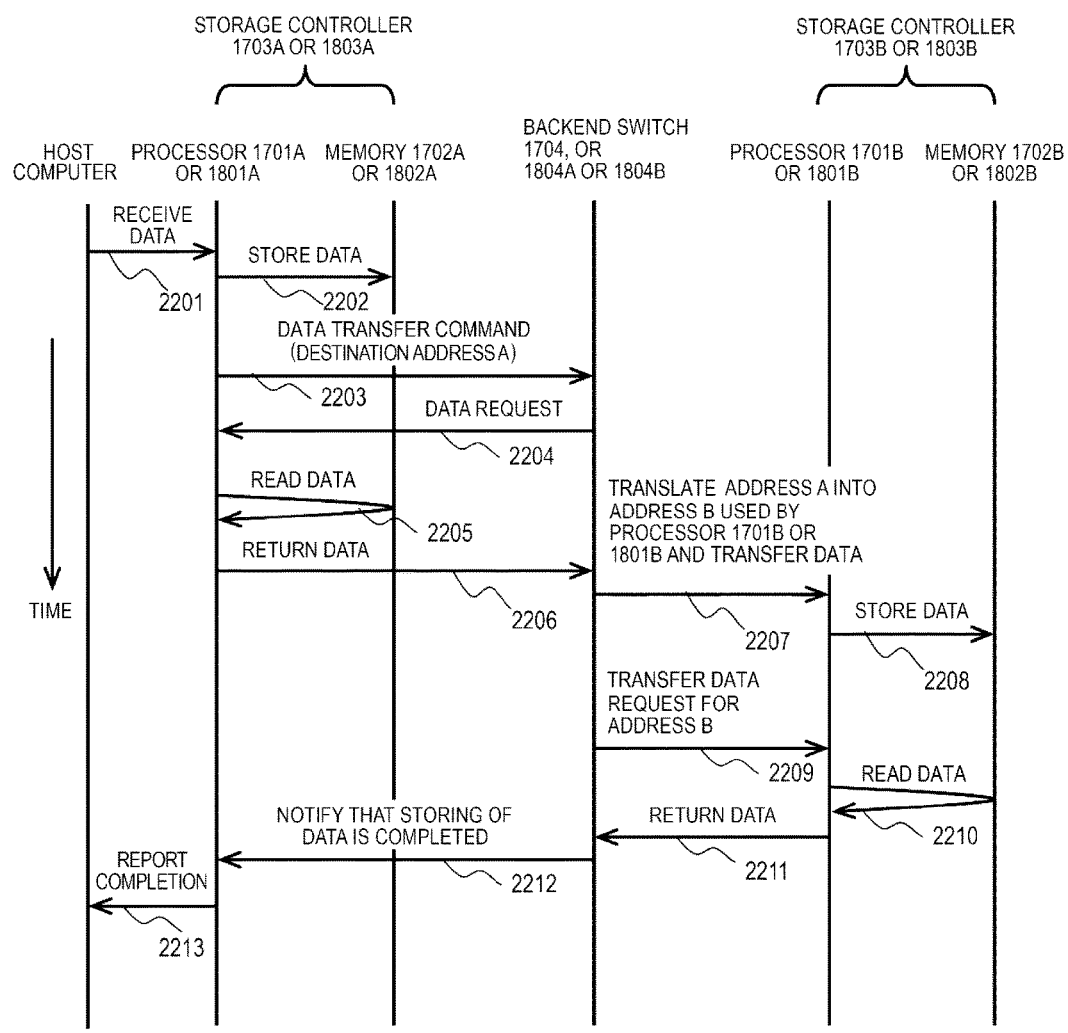
FIG. 22 is a flowchart illustrating another example of a sequence of process in a case where the storage controller receives a data write request from the host computer.

FIG. 22 illustrates an example of a sequence in a case where the process procedures in the storage controller 1703A or 1803A are performed according to the flowchart of FIG. 21. More specifically, FIG. 22 illustrates an example of a sequence of a process in a case of receiving, from a host computer, a write request for data to be stored in the storage devices 1705A to 1705F of the storage system 1700 or the storage devices 1805A to 1805F of the storage system 1800.

This is also the same for a sequence of a process in which the storage controller 1703B or 1803B receives, from the host computer, a write request for data to be stored in the storage devices 1705A to 1705F of the storage system 1700 or the storage devices 1805A to 1805F of the storage system 1800.

In this case, in FIG. 22, the storage controller 1703A or 1803A is replaced with the storage controller 1703B or 1803B. The processor 1701A or 1801A is replaced with the processor 1701B or 1801B. The memory 1702A or 1802A is replaced with the memory 1702B or 1802B.

In FIG. 22, if a data write request is received from the host computer, in step 2201, the storage controller 1703A or 1803A receives write data. In step 2202, the processor 1701A or 1801A stores the received write data into the memory 1702A or 1802A.

The descriptions of steps 1601 to 1610 in FIG. 16 of Example 7 may be applied to processes from steps 2203 to 2212. The storage controller 103A or 203A is replaced with the storage controller 1703A or 1803A. The storage controller 103B or 203B is replaced with the storage controller 1703B or 1803B.

The processor 101A or 201A is replaced with the processor 1701A or 1801A. The processor 101B or 201B is replaced with the processor 1701B or 1801B. The memory 102A or 202A is replaced with the memory 1702A or 1802A. The memory 102B or 202B is replaced with the memory 1702B or 1802B.

The backend switch 104 or the backend switch 204A or 204B is replaced with the backend switch 1704 or the backend switch 1804A or 1804B. Data of a transfer source is replaced with write data received from a host computer.

In step 2212, the processor 1701A or 1801A receives the notification of data storing completion from the backend switch 1704 or the backend switch 1804A or 1804B. In step 2213, the processor 1701A or 1801A reports the data write completion to the host computer.

With the above-described configuration, according to Example 9, it is possible to achieve the same effect as the effect described in Example 8.

Example 10

Figure 23:
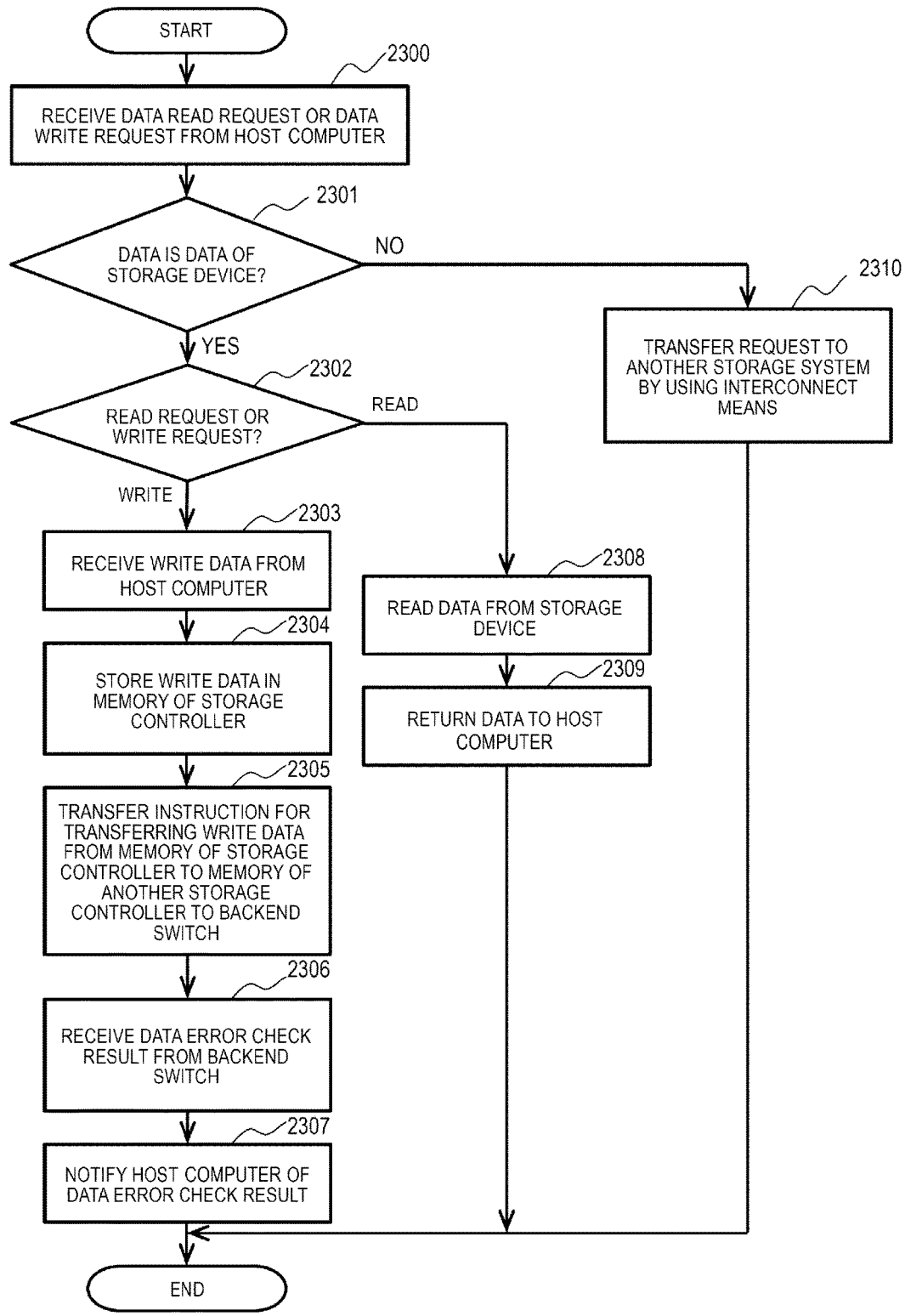
FIG. 23 is a flowchart illustrating still other examples of process procedures in a case where one storage controller of the storage system receives a request from the host computer.

Example 10 will be described FIGS. 23 and 24. A configuration example of a storage system in Example 10 is the configuration illustrated in FIG. 17 or 18. FIG. 23 is a flowchart illustrating examples of procedures of a process performed by the storage controller 1703A or 1703B of the storage system 1700 illustrated in FIG. 17, or the storage controller 1803A or 1803B of the storage system 1800 illustrated in FIG. 18.

In FIG. 23, the descriptions of steps 2100 to 2104, and steps 2107, 2108 and 2110 in FIG. 21 described in Example 9 may be applied to processes from steps 2300 to 2304 and steps 2307, and 2308 to 2310.

In FIG. 23, in step 2304, the storage controller stores the write data received from the host computer into the memory of the storage controller. Next, in step 2305, the storage controller transfers an instruction for transferring the write data from the memory to the memory of the other storage controller of the same storage system, to the backend switch.

Next, in step 2306, the storage controller receives a result of data error check from the backend switch. In step 2307, the storage controller notifies the host computer of the check result. In a case where the received check result indicates a data error, the host computer determines that data cannot be correctly written, and transfers, for example, the previous data write request to the storage system again.

Figure 24:
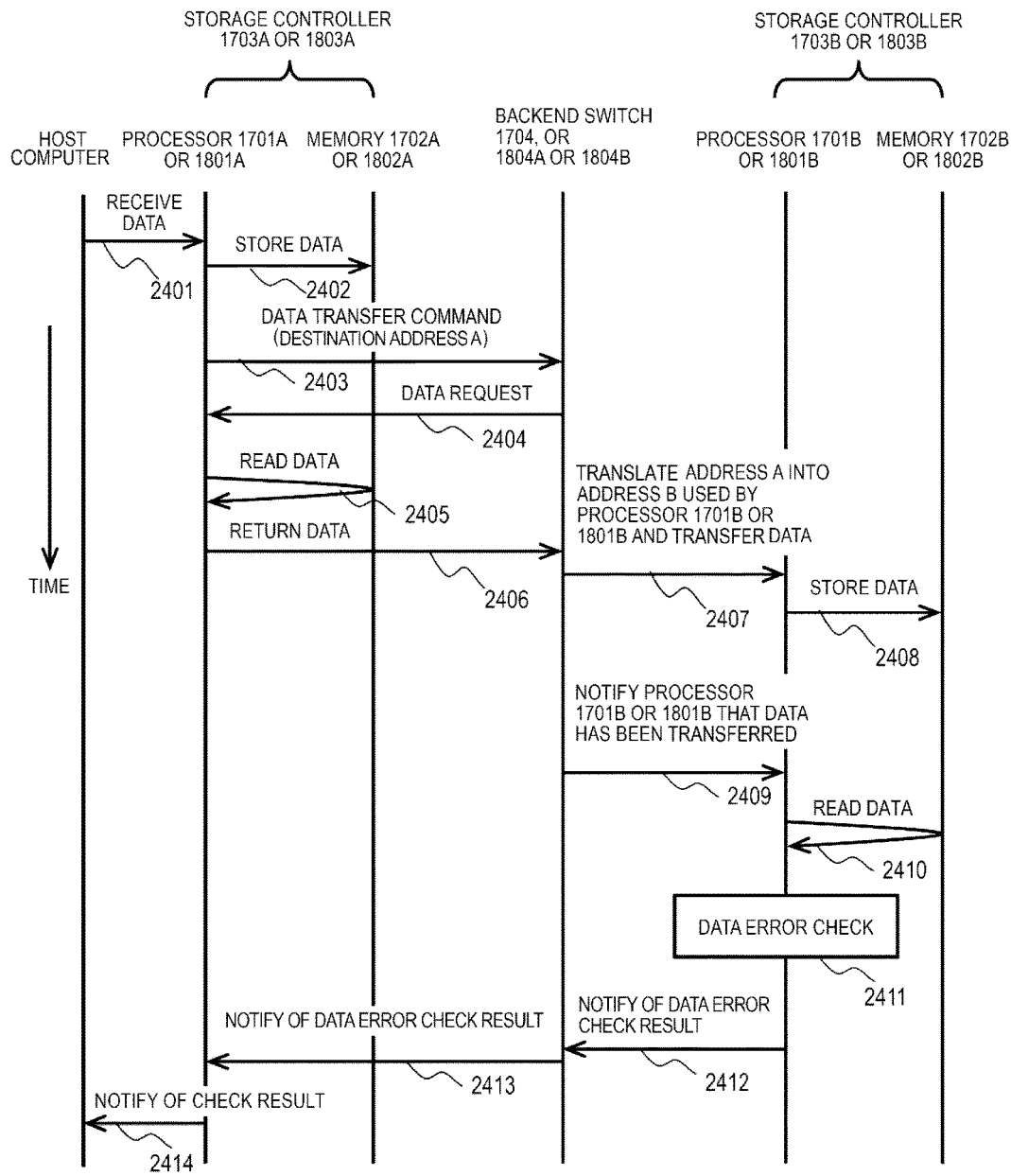
FIG. 24 is a flowchart illustrating still other example of a sequence of a process in a case where the storage controller receives a data write request from the host computer.

FIG. 24 illustrates an example of a sequence in a case where the process procedures in the storage controller 1703A or 1803A are performed according to the flowchart of FIG. 23. More specifically, FIG. 24 illustrates an example of a sequence of a process in a case of receiving, from a host computer, a write request for data to be stored in the storage devices 1705A to 1705F of the storage system 1700 or the storage devices 1805A to 1805F of the storage system 1800.

This is also the same for a sequence of a process in which the storage controller 1703B or 1803B receives, from the host computer, a write request for data to be stored in the storage devices 1705A to 1705F of the storage system 1700 or the storage devices 1805A to 1805F of the storage system 1800.

In this case, in FIG. 24, the storage controller 1703A or 1803A is replaced with the storage controller 1703B or 1803B. The processor 1701A or 1801A is replaced with the processor 1701B or 1801B. The memory 1702A or 1802A is replaced with the memory 1702B or 1802B.

In FIG. 24, the descriptions of steps 2201 to 2208 in FIG. 22 of Example 9 may be applied to processes from steps 2401 to 2408. In FIG. 24, in step 2409, the backend switch 1704 or the backend switch 1804A or 1804B notifies the processor 1701B or 1801B that the write data has been transferred.

If the notification that the write data has been transferred is received, in step 2410, the processor 1701B or 1801B reads the write data from the memory 1702B or 1802B. Next, in step 2411, the processor 1701B or 1801B checks whether or not there is an error in the write data read from the memory 1702B or 1802B.

In a case where a data check code is necessary separately from check target data in checking a data error, the data check code is given to the processor 1701B or 1801B in advance. Alternatively, the processor 1701B or 1801B may generate a data check code on the basis of a predefined rule. Alternatively, the processor 1701A or 1801A may supply a data check code to the processor 1701B or 1801B via the backend switch 1704 or the backend switch 1804A or 1804B.

After step 2411, in step 2412, the processor 1701B or 1801B notifies the backend switch 1704 or the backend switch 1804A or 1804B of a result of the data error check. In step 2413, the backend switch 1704 or the backend switch 1804A or 1804B notifies the processor 1701A or 1801A of the sent notification of the result.

In step 2414, the processor 1701A or 1801A notifies the host computer of the notification of the data error check result sent from the backend switch 1704 or the backend switch 1804A or 1804B.

As mentioned above, the storage system 1700 or 1800 according to Example 10 can check that data is stored in the memory without an error in addition to the effect in Example 9, and can thus increase the integrity of the data.

In other words, since write data stored in the memory 1702A or 1802A is transferred to the memory 1702B or 1802B, and then an error of the transferred data is checked, an error of the data stored in the memory 1702A or 1802A can also be checked.

In the storage system according to the present example, a first storage controller receives host data to be written to one or more storage devices from a host computer, and stores the host data in a first location of a first memory before writing the host data to the storage device as first data.

A first processor transfers a data transfer command to a backend switch after the host data is stored in the first location of the first memory. If a second processor is notified that the first data has been stored in a second memory, the second processor reads the first data from the second memory, determines whether or not there is an error in the first data, and transfers a determination result to the first processor. The first processor notifies the host computer of the determination result received from the second processor.

Example 11

Figure 25:
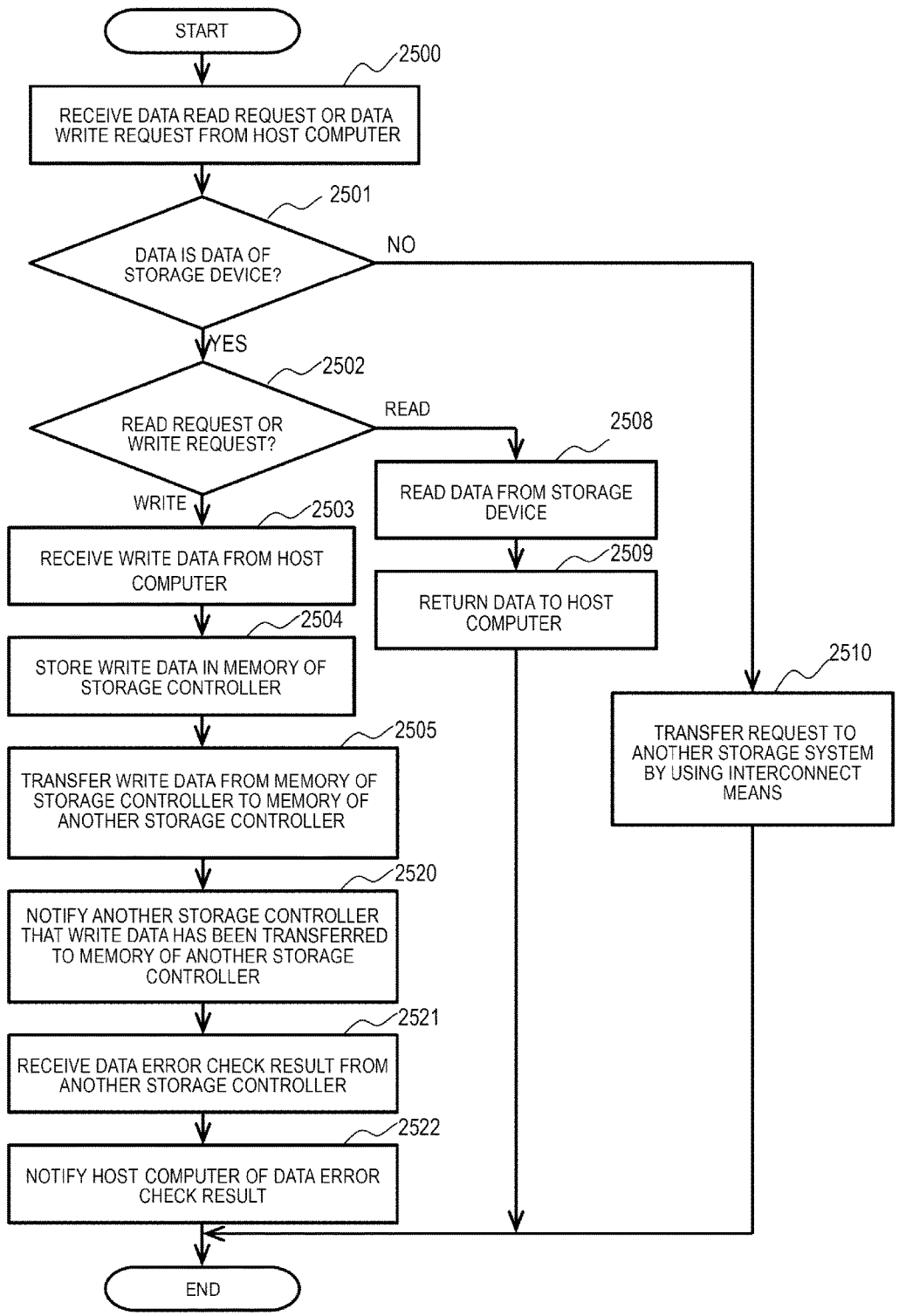
FIG. 25 is a flowchart illustrating still other examples of process procedures in a case where one storage controller of the storage system receives a request from the host computer.

Example 11 will be described FIGS. 25 and 26. A configuration example of a storage system in Example 11 is the configuration illustrated in FIG. 17 or 18. FIG. 25 is a flowchart illustrating examples of procedures of a process performed by the storage controller 1703A or 1703B of the storage system 1700 illustrated in FIG. 17, or the storage controller 1803A or 1803B of the storage system 1800 illustrated in FIG. 18.

In FIG. 25, the descriptions of steps 1900 to 1905, and steps 1908 to 1910 in FIG. 19 described in Example 8 may be applied to processes from steps 2500 to 2505 and steps 2508 to 2510.

In FIG. 25, in step 2505, the storage controller transfers the write data from the memory of the storage controller to the memory of the other storage controller of the same storage system, and then proceeds to step 2520.

In step 2520, the storage controller notifies the other storage controller that the write data has been transferred to the memory of the other storage controller. The notification may be performed by transferring predefined specific data to a specific address of the other storage controller. The notification may be performed by using specific data including information for identifying the write data and information regarding a location where the write data is written in the memory of the other storage controller. The notification may include an interrupt signal.

If the notification that the write data has been transferred is received, the other storage controller performs data error check on the transferred data, and notifies the storage controller of a check result. This notification is performed similarly to the above-described method of notifying the other storage controller that the write data has been transferred to the memory of the other storage controller.

In step 2521, the storage controller receives the notification of the data error check result sent from the storage controller. Next, in step 2522, the storage controller notifies the host computer of the result of the data error check. In a case where there is a data error, the host computer determines that data cannot be correctly written, and transfers, for example, the previous data write request to the storage system again. This is the same as described in step 2307 in FIG. 23 in Example 10.

Figure 26:
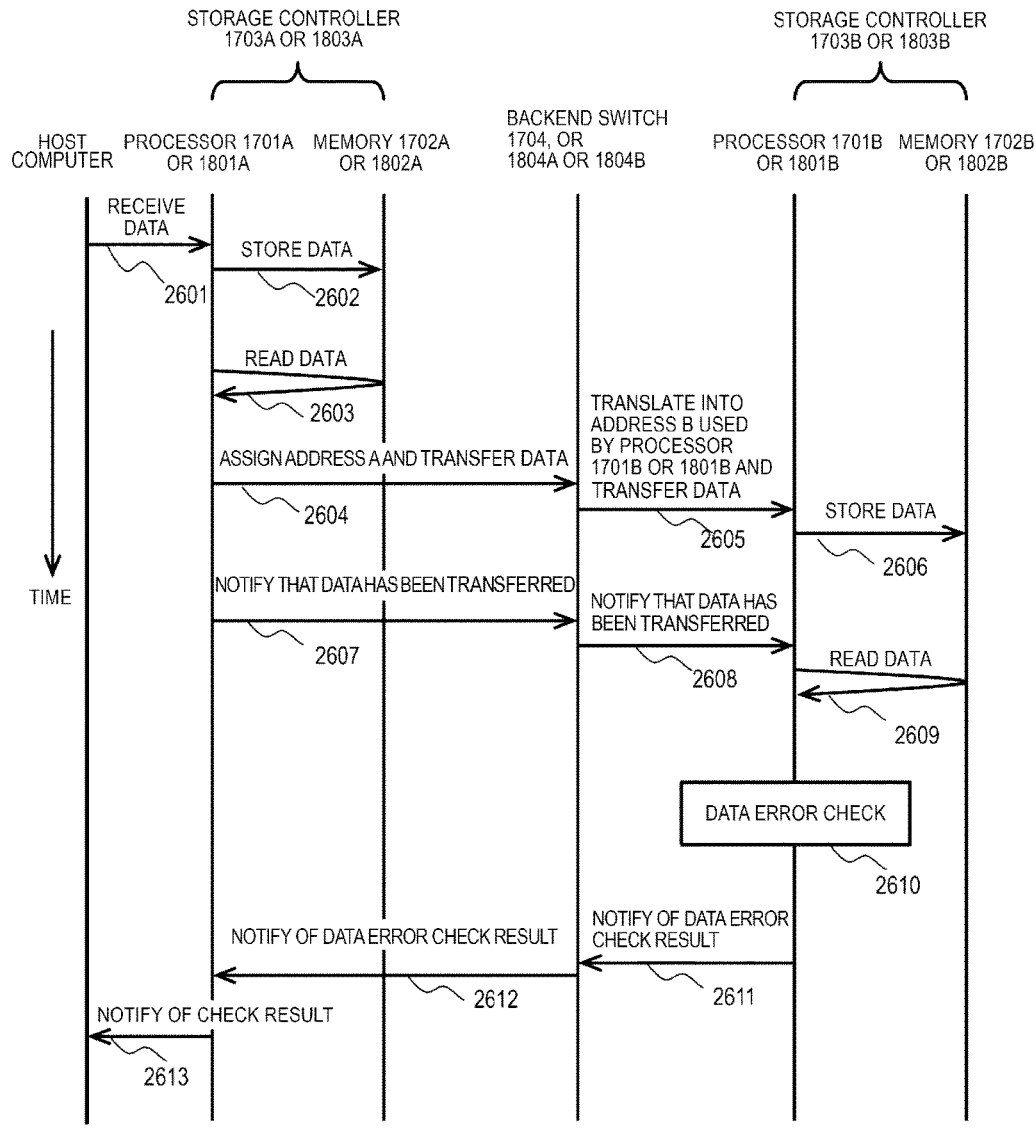
FIG. 26 is a flowchart illustrating still other example of a sequence of a process in a case where the storage controller receives a data write request from the host computer.

FIG. 26 illustrates an example of a sequence in a case where the process procedures in the storage controller 1703A or 1803A are performed according to the flowchart of FIG. 25. More specifically, FIG. 26 illustrates an example of a sequence of a process in a case of receiving, from a host computer, a write request for data to be stored in the storage devices 1705A to 1705F of the storage system 1700 or the storage devices 1805A to 1805F of the storage system 1800.

This is also the same for a sequence of a process in which the storage controller 1703B or 1803B receives, from the host computer, a write request for data to be stored in the storage devices 1705A to 1705F or the storage devices 1805A to 1805F.

In this case, in FIG. 26, the storage controller 1703A or 1803A is replaced with the storage controller 1703B or 1803B. The processor 1701A or 1801A is replaced with the processor 1701B or 1801B. The memory 1702A or 1802A is replaced with the memory 1702B or 1802B.

In FIG. 26, the descriptions of steps 2001 to 2006 in FIG. 20 of Example 8 may be applied to processes from steps 2601 to 2606.

In FIG. 26, in step 2604, the processor 1701A or 1801A reads the write data received from the host computer from the memory 1702A or 1802A, and transfers the data to the backend switch 1704 or the backend switch 1804A or 1804B. In step 2607, the processor 1701A or 1801A notifies the backend switch 1704 or the backend switch 1804A or 1804B that the write data has been transferred.

If the notification is received, in step 2608, the backend switch 1704 or the backend switch 1804A or 1804B transfers the same notification to the processor 1701B or 1801B. A method of the notification performed in steps 2607 and 2608 is the same as described in step 2520 in FIG. 25.

The processor 1701B or 1801B is notified that the write data has been transferred, by the backend switch 1704 or the backend switch 1804A or 1804B. In step 2609, the processor 1701B or 1801B reads the write data from the memory 1702B or 1802B.

Next, in step 2610, the processor 1701B or 1801B checks whether or not there is an error in the write data read from the memory 1702A or 1802A. The data error check in step 2610 is the same as the data error check in step 2411 in FIG. 24 of Example 10.

The descriptions of steps 2412 to 2414 in FIG. 24 of Example 10 may be applied to the subsequent steps 2611 to 2613.

With the above-described configuration, according to Example 11, it is possible to achieve the same effect as the effect described in Example 10.

Example 12

Example 12 will be described with reference to FIG. 1 or 2, and FIGS. 4A, 4B, 6A to 7B, 28 and 29. In a case where the configuration illustrated in FIG. 1 is used as a configuration of the storage system of Example 12, descriptions of FIGS. 1, 4A, 4B, and 6A to 7B are the same as in Example 1.

Figure 28:
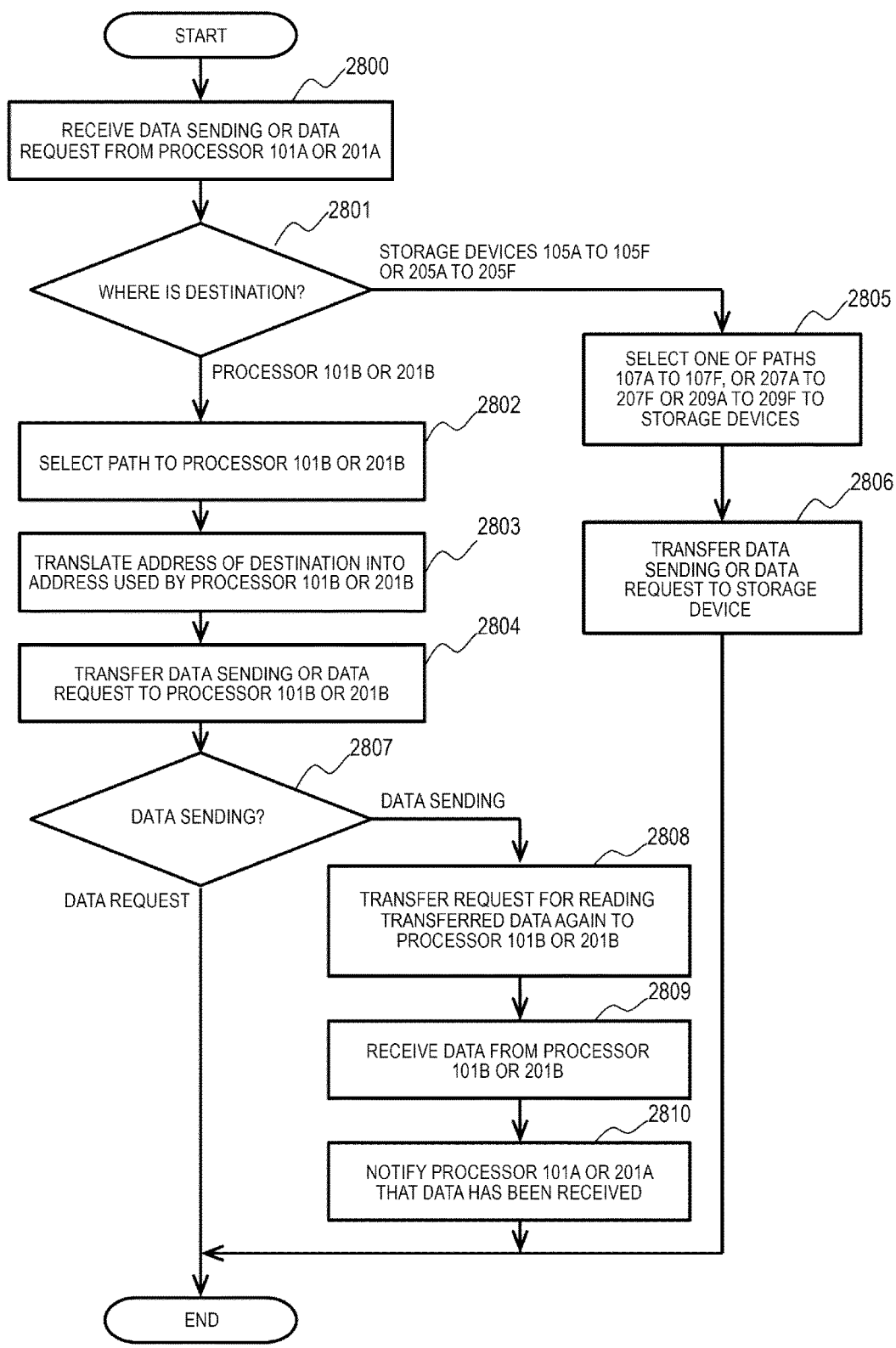
FIG. 28 is a flowchart illustrating still other examples of process procedures in a case where the backend switch receives data sending or a data request from the processor.

FIG. 28 is a flowchart illustrating examples of process procedures in a case where the backend switch 104 receives data sending or a data request from the processor 101A in Example 12. This is also the same for process procedures in a case where the backend switch 104 receives data sending or a data request from the processor 101B. In this case, the processor 101A in FIG. 28 is replaced with the processor 101B. The processor 101B in FIG. 28 is replaced with the processor 101A.

In FIG. 28, the descriptions of step 300 to step 306 in FIG. 3 in Example 1 may be applied to processes from step 2800 to step 2806. After step 2804, the process in the backend switch 104 proceeds to step 2807.

In step 2807, the backend switch 104 determines whether the frame transferred from the processor 101A corresponds to data sending for storing in the memory 102B or a data request for reading data from the memory 102B. If a determination result is data sending for storing in the memory 102B (2807: data sending), the backend switch 104 proceeds to step 2808.

In step 2808, the backend switch 104 transfers a request for reading the data stored in the memory 102B again, to the processor 101B. A length of the data requested again may be the same as a length of the data transferred in step 2804, and may be a part of the length of the data transferred in step 2804. For example, the backend switch 104 may read the last part of the data transferred in step 2804.

In step 2809, the backend switch 104 receives the data from the processor 101B. In step 2810, the backend switch 104 notifies the processor 101A that the data has been received from the processor 101B, and finishes the process.

The notification sent to the processor 101A may be performed, for example, by transferring the whole or part of the data received from the processor 101B to the processor 101A, and may be performed by transferring a predefined specific signal to the processor 101A. In a case where the whole or part of the read data received from the processor 101B is transferred to the processor 101A, the whole or part of the transferred data is discarded by the processor 101A.

The notification may be performed by transferring predefined specific data to a specific address in the address space of the processor 101A. Otherwise, the notification may be performed by sending an interrupt signal to the processor 101A. In the above-described way, it is possible to notify the processor 101A that the data has been certainly written into the memory 102B. In step 2807, if the determination result shows a request for reading data from the memory 102B (2807: data request), the backend switch 104 finishes the process.

Figure 29:
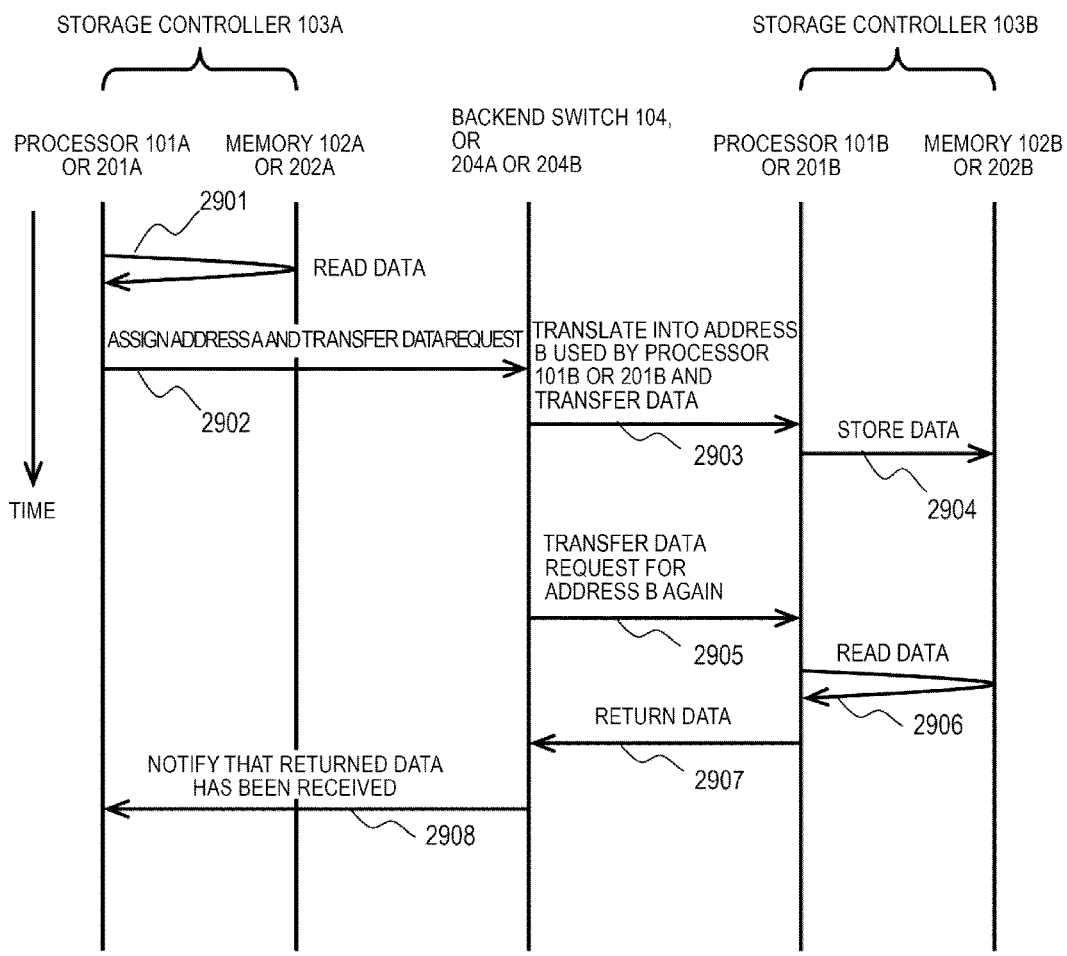
FIG. 29 is a diagram illustrating still another example of a sequence of a process in which the first storage controller transfers data to the second storage controller.

FIG. 29 illustrates an example of a sequence of a process in which data is transferred from the storage controller 103A to the storage controller 103B in a case where the backend switch 104 performs a process according to the process procedures illustrated in FIG. 28. This is also the same for a sequence of a process in which the storage controller 103B transfers data to the storage controller 103A.

In this case, in FIG. 29, the storage controller 103A and the storage controller 103B are replaced with each other. The processor 101A and the processor 101B are replaced with each other. The memory 102A and the memory 102B are replaced with each other.

In FIG. 29, the descriptions of step 501 to step 504 in FIG. 5A in Example 1 may be applied to processes from step 2901 to step 2904. In FIG. 29, in step 2905, the backend switch 104 transfers a data read request for which the address B transferred in step 2903 is designated again, to the processor 101B.

In this case, a length of data to be read may be the same as a length of the data assigned with the address B and transferred in step 2905, and may be a part of the length of the data assigned with the address B and transferred in step 2905. For example, the backend switch 104 may change a length of data to be read and the address B such that the last part of the data transferred in step 2905. This is the same as described in step 2808 in FIG. 28.

If the data request assigned with the address B is received from the backend switch 104, in step 2906, the processor 101B reads the data from the memory 102B according to the address B. Next, in step 2907, the processor 101B returns the data read from the memory 102B to the backend switch 104.

Steps 2906 and 2907 may be executed by software operating on the processor 101B, and may be executed by functional hardware (circuit) implemented in the processor 101B. If the data request assigned with the address B is received from the backend switch 104, the functional hardware automatically reads the data from the memory 102B according to the address B, and returns the data to the backend switch 104.

If the data with the address B is received from the processor 101B, in step 2908, the backend switch 104 notifies the processor 101A that the data has been transferred. A notification method is as described in step 2810 in FIG. 28.

With the above-described configuration, in addition to the effect described in Example 1, it is possible to notify the processor 101A that data transferred to the storage controller 103B has been certainly stored in the memory 102B. Consequently, for example, in a case where data to be written to the storage devices 105A to 105F is received from a host computer not illustrated in FIG. 1, it is possible to ensure that the storage controllers 103A and 103B can duplicate the data.

Therefore, since sufficient reliability and availability can be ensured even if writing to the storage devices 105A to 105F is not completed, the host computer can be notified of write completion before the data is written to the storage devices 105A to 105F.

As a configuration of the storage system of the present example, the configuration illustrated in FIG. 2 may be used instead of the configuration illustrated in FIG. 1. In this case, descriptions of FIGS. 2, 4A, 4B, and 6A to 7B are the same as in Example 2.

In descriptions of FIGS. 28 and 29, the storage controller 103A is replaced with the storage controller 203A. The storage controller 103B is replaced with the storage controller 203B. The processor 101A is replaced with the processor 201A.

The processor 101B is replaced with the processor 201B. The memory 102A is replaced with the memory 202A. The memory 102B is replaced with the memory 202B. The backend switch 104 is replaced with the backend switch 204A or 204B. The storage devices 105A to 105F are replaced with the storage devices 205A to 205F.

Example 13

Figure 30:
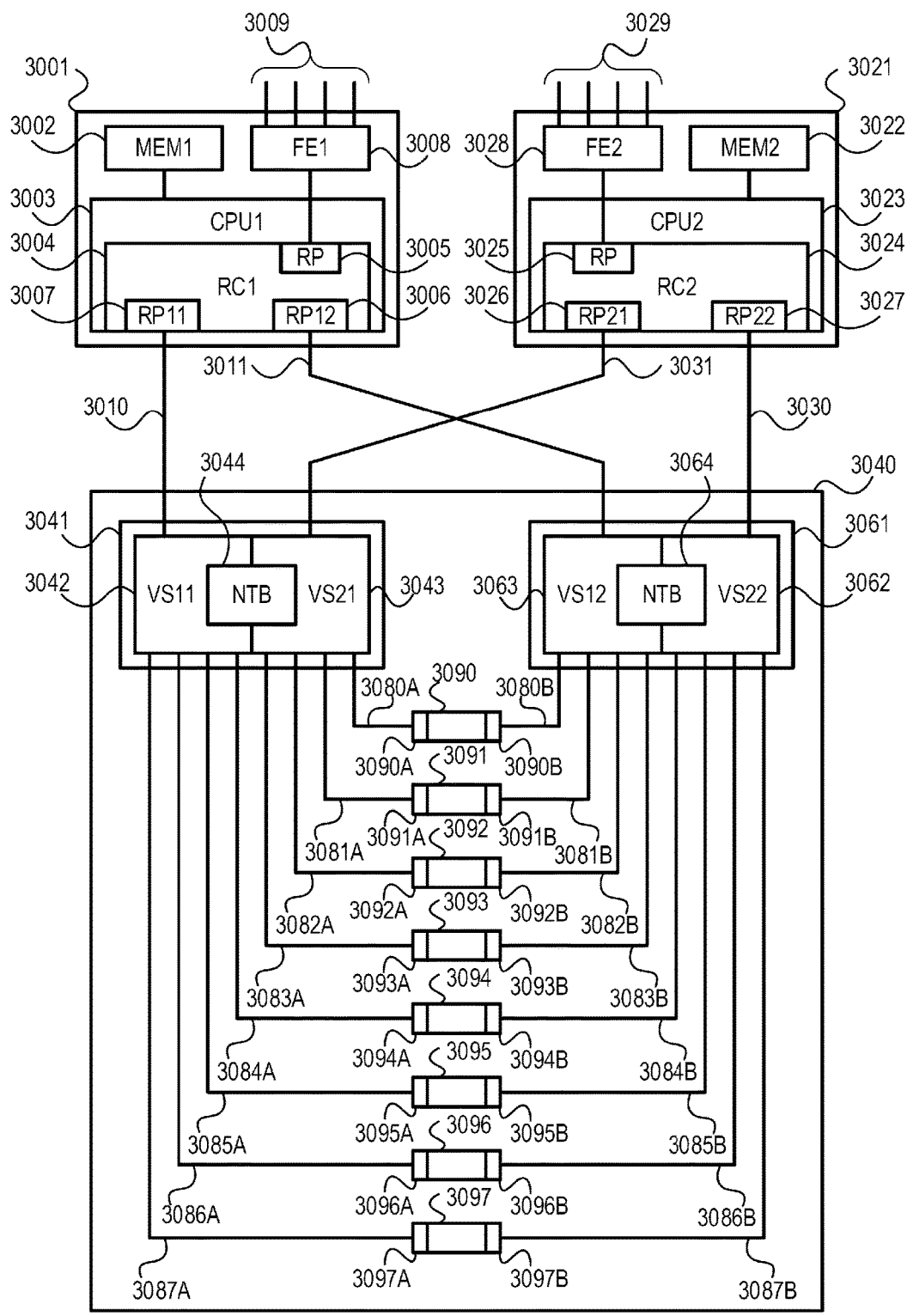
FIG. 30 illustrates still another configuration example of the storage system.

Example 13 of the present invention will be described with reference to FIGS. 30 to 43. FIG. 30 illustrates a configuration example of a storage system according to Example 13. In FIG. 30, the storage system includes two storage controllers 3001 and 3021, and a drive enclosure 3040. The storage controller 3001 is configured to include a processor (CPU1) 3003, a memory (MEM1) 3002, and a host IF (FE1) 3008 connected to a host computer (not illustrated) via host channels 3009.

The processor 3003 includes a Root Complex (RC1) 3004. The Root Complex 3004 is configured to include a Root Port (RP) 3005 connected to the host IF 3008, a Root Port (RP12) 3006, and a Root Port (RP11) 3007.

The storage controller 3021 is configured to include a processor (CPU2) 3023, a memory (MEM2) 3022, and a host IF (FE2) 3028 connected to a host computer (not illustrated) via host channels 3029. The processor 3023 includes a Root Complex (RC2) 3024. The Root Complex 3024 is configured to include a Root Port (RP) 3025 connected to the host IF 3028, a Root Port (RP21) 3026, and a Root Port (RP22) 3027.

The storage system according to Example 13 includes two backend switches 3041 and 3061 which are independent from each other in the drive enclosure 3040. In this example, the backend switches 3041 and 3061 are PCI Express (PCIe) switches. The backend switch 3041 is configured to include virtual switches 3042 and 3043, and a non-transparent bridge (NTB) 3044. The backend switch 3061 is configured to include virtual switches 3062 and 3063, and a non-transparent bridge (NTB) 3064.

The processor 3003 is connected to the virtual switch 3042 via the Root Port 3007 and a link 3010. Here, the link is a PCIe Link, and is implemented as, for example, a cable or a wiring on a wiring board. The processor 3003 is connected to the virtual switch 3063 via the Root Port 3006 and a link 3011.

The processor 3023 is connected to the virtual switch 3062 via the Root Port 3027 and a link 3030. The processor 3023 is connected to the virtual switch 3043 via the Root Port 3026 and a link 3031.

The storage system according to Example 13 is configured to include storage devices 3090 to 3097 in the drive enclosure 3040. The storage devices 3090 to 3097 are, for example, a dual-port drive with the NVMe specification, and respectively include PCIe Ports (hereinafter, abbreviated to ports) 3090A to 3097A, and 3090B to 3097B.

The ports 3090A to 3093A of the storage devices 3090 to 3093 are connected to the virtual switch 3043 via links 3080A to 3083A. The ports 3094A to 3097A of the storage devices 3094 to 3097 are connected to the virtual switch 3042 via links 3084A to 3087A.

The ports 3090B to 3093B of the storage devices 3090 to 3093 are connected to the virtual switch 3063 via links 3080B to 3083B. The ports 3094B to 3097B of the storage devices 3094 to 3097 are connected to the virtual switch 3062 via links 3084B to 3087B.

The processor 3003 is communicably connected to the processor 3023 via the link 3010, the virtual switch 3042, the NTB 3044, the virtual switch 3043, and the link 3031. The processor 3023 is communicably connected to the processor 3003 via the link 3030, the virtual switch 3062, the NTB 3064, the virtual switch 3063, and the link 3011.

All of the storage devices 3090 to 3097 are connected to the processor 3003 or 3023 even if only one of the backend switches 3041 and 3061 is used. The processors 3003 and 3023 are connected to the other processor via one of the backend switches 3041 and 3061.

FIG. 30 illustrates eight storage devices 3090 to 3097, but any number of storage devices may be used.

Figure 31:
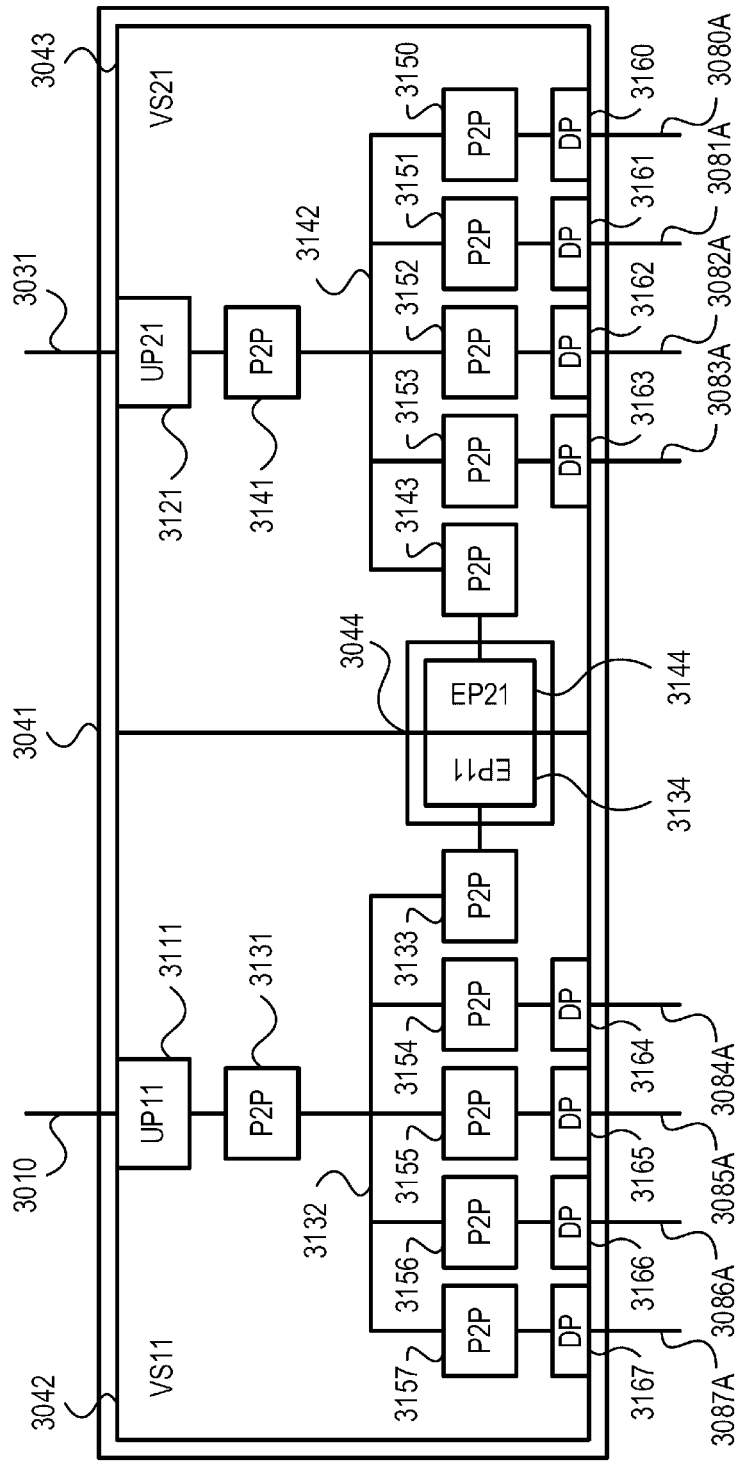
FIG. 31 illustrates a configuration example of the backend switch.

FIG. 31 illustrates an internal configuration example of the backend switch 3041. The virtual switch 3042 is configured to include an Upstream Port (UP11) 3111 connected to the link 3010, and Downstream Ports (DP) 3164 to 3167 connected to the links 3084A to 3087A.

The Upstream Port 3111 is connected to a PCI-to-PCI Bridge (P2P) 3131, and the Downstream Ports 3164 to 3167 are connected to P2P Bridges 3154 to 3157. The P2P Bridges 3131, 3133 and 3154 to 3157 are connected to an internal bus 3132.

The virtual switch 3043 is configured to include an Upstream Port (UP21) 3121 connected to the link 3031, and Downstream Ports 3160 to 3163 connected to the links 3080A to 3083A. The Upstream Port 3121 is connected to a P2P Bridge 3141, and the Downstream Ports 3160 to 3163 are respectively connected to P2P Bridges 3150 to 3153. The P2P Bridges 3141, 3143, and 3150 to 3153 are connected to an internal bus 3142.

The NTB 3044 includes an Endpoint (EP11) 3134 and an Endpoint (EP21) 3144. The Endpoint 3134 is connected to the P2P Bridge 3133, and is set to be accessed from the processor 3003 via the link 3010. The Endpoint 3144 is connected to the P2P Bridge 3143, and is set to be accessed from the processor 3023 via the link 3031. The Endpoints 3134 and 3144 are set and connected to each other such that a PCIe packet of which a destination is within a predetermined address range can pass in a bidirectional manner.

Figure 32:
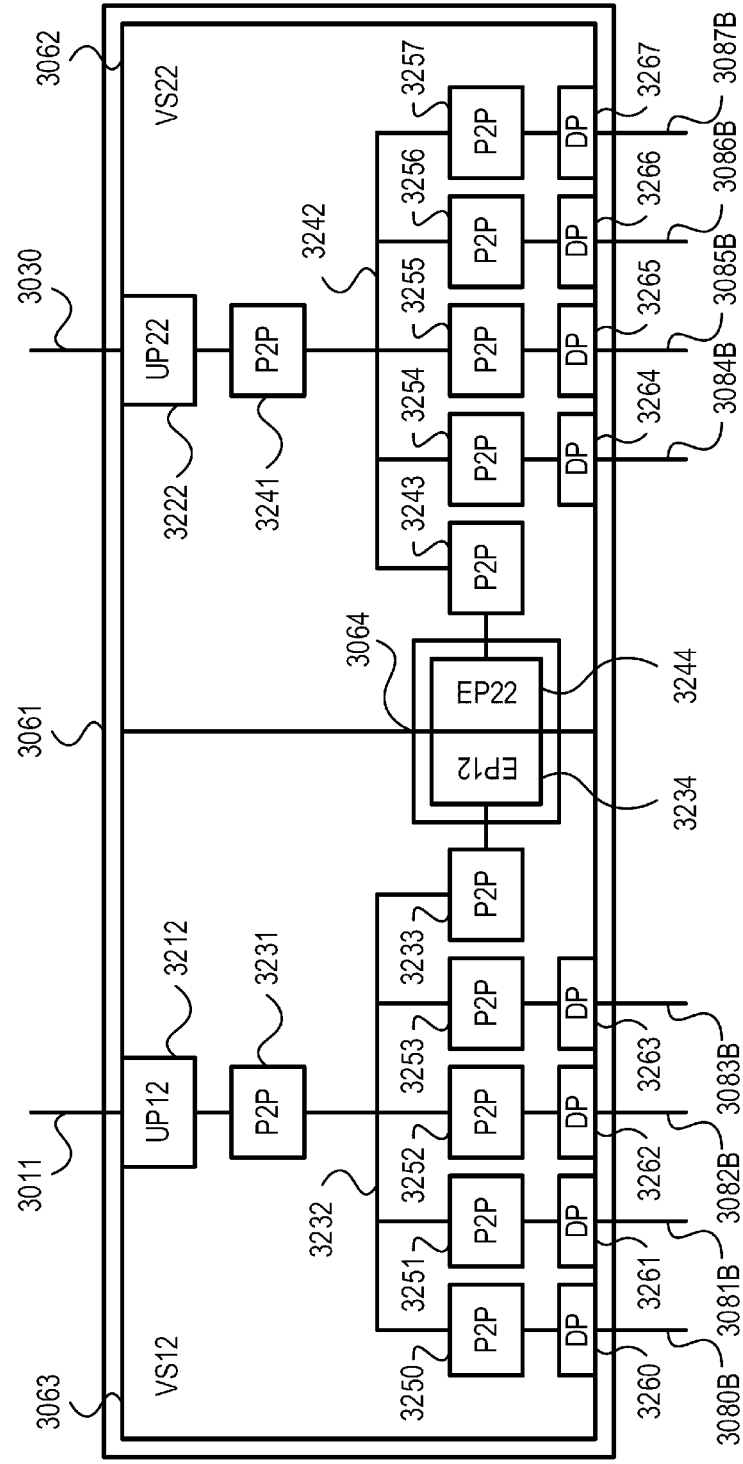
FIG. 32 illustrates another configuration example of the backend switch.

FIG. 32 illustrates an internal configuration example of the backend switch 3061. The virtual switch 3062 is configured to include an Upstream Port (UP22) 3222 connected to the link 3030, and Downstream Ports 3264 to 3267 connected to the links 3084B to 3087B. The Upstream Port 3222 is connected to a P2P Bridge 3241, and the Downstream Ports 3264 to 3267 are connected to P2P Bridges 3254 to 3257. The P2P Bridges 3241, 3243 and 3254 to 3257 are connected to an internal bus 3242.

The virtual switch 3063 is configured to include an Upstream Port (UP12) 3212 connected to the link 3011, and Downstream Ports 3260 to 3263 connected to the links 3080B to 3083B. The Upstream Port 3212 is connected to a P2P Bridge 3231, and the Downstream Ports 3260 to 3263 are respectively connected to P2P Bridges 3250 to 3253. The P2P Bridges 3231, 3233, and 3250 to 3253 are connected to an internal bus 3232.

The NTB 3064 includes an Endpoint (EP12) 3234 and an Endpoint (EP22) 3244. The Endpoint 3234 is connected to the P2P Bridge 3233, and is set to be accessed from the processor 3003 via the link 3011. The Endpoint 3244 is connected to the P2P Bridge 3243, and is set to be accessed from the processor 3023 via the link 3030. The Endpoints 3234 and 3244 are set and connected to each other such that a PCIe packet of which a destination is within a predetermined address range can pass in a bidirectional manner.

Figure 33:
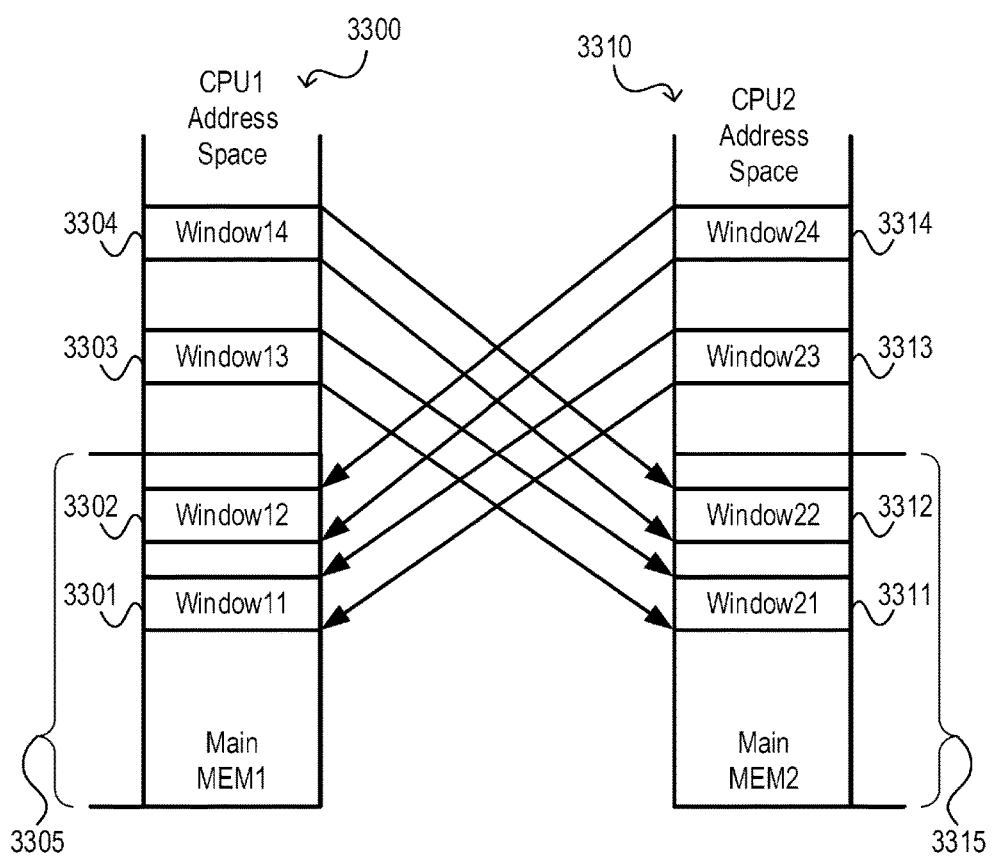
FIG. 33 is a diagram illustrating an example of an address translation operation of an NTB.
Figure 34:
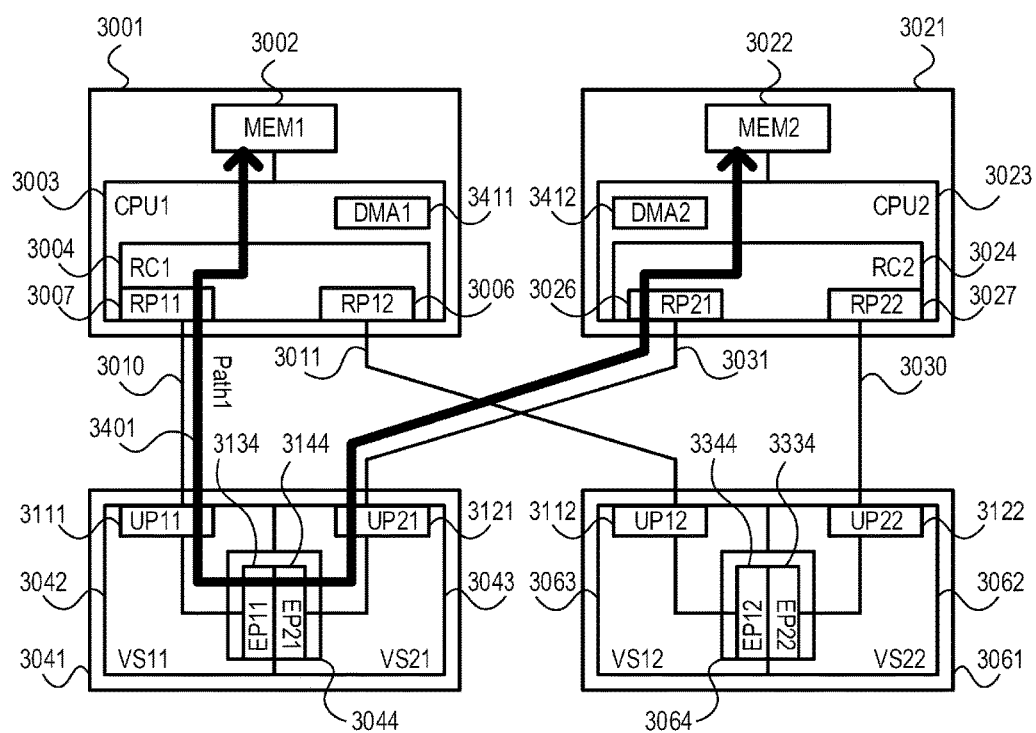
FIG. 34 is a diagram illustrating an example of a data transfer path between the storage controllers.
Figure 35:
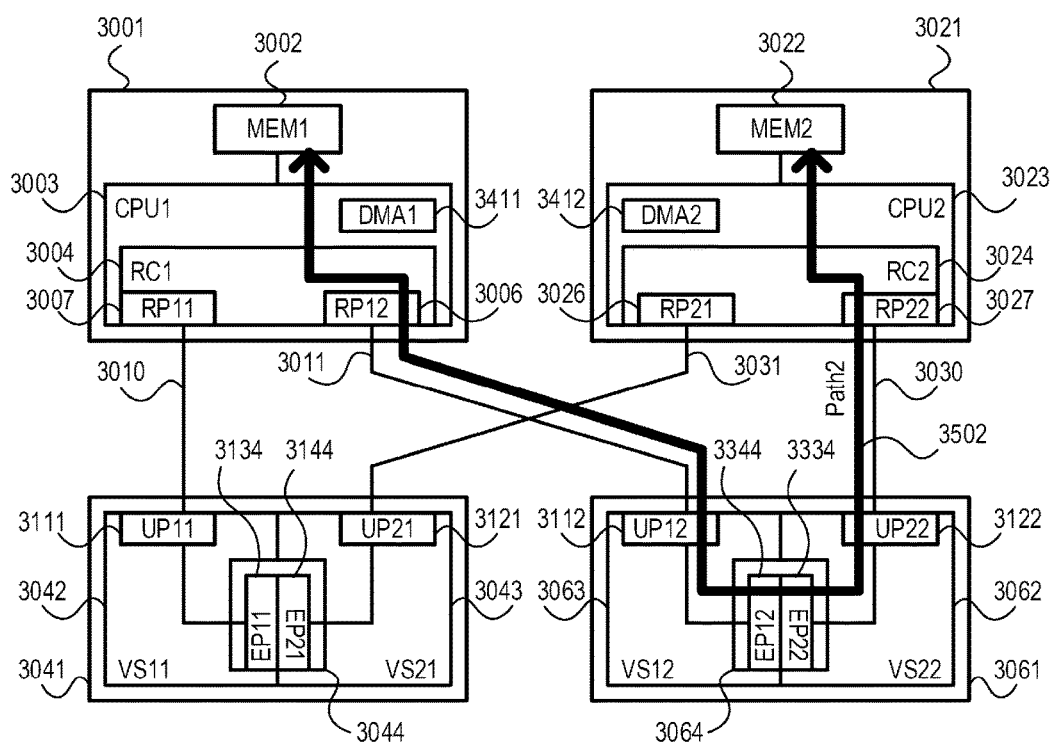
FIG. 35 is a diagram illustrating another example of a data transfer path between the storage controllers.

With reference to FIGS. 33 to 35, a description will be made of an address translation operation in the NTBs 3044 and 3064. According to the PCIe specification, data transfer cannot be performed between PCIe trees having different Root Ports except for a case of using a Root Complex. However, in a case where an NTB appropriately translates a header of a PCIe packet, data transfer between PCIe trees having different Root Ports can be performed by using the NTB.

Generally, address spaces of PCIe packet send and receive destinations, and systems of a Routing ID are different from each other between different PCIe trees. The Routing ID includes a Requester ID and Completer ID, and both of the IDs are information (device identifiers) for identifying PCI Functions of a PCIe Device in a PCIe tree. The NTB translates a destination address and a Routing ID included in a header of a PCIe packet transferred and received between PCIe trees, in accordance with a system of a destination PCIe tree by referring to routing information.

In FIG. 33, an address space 3300 of the processor 3003 includes a main memory space 3305 of the processor 3003, a window 3303 for accessing the Endpoint 3134 in the NTB 3044, and a window 3304 for accessing the Endpoint 3234 in the NTB 3064.

An address space 3310 of the processor 3023 includes a main memory space 3315 of the processor 3023, a window 3313 for accessing the Endpoint 3244 in the NTB 3064, and a window 3314 for accessing the Endpoint 3144 in the NTB 3044. The main memory space 3305 includes windows 3301 and 3302. The main memory space 3315 includes windows 3311 and 3312.

The storage devices 3090 to 3097 are mapped to be able to access a space (not illustrated) other than the main memory space 3305 and the windows 3303 and 3304 of the address space 3300 from the processor 3003. The processor 3003 can access the storage devices 3090 to 3097 without using the NTBs 3044 and 3064, that is, without address translation.

Similarly, the storage devices 3090 to 3097 are mapped to be able to access a space other than the main memory space 3315 and the windows 3313 and 3314 of the address space 3310 from the processor 3023. The processor 3023 can access the storage devices 3090 to 3097 without using the NTBs 3044 and 3064, that is, without address translation.

The NTB 3044 translates a destination address of a PCIe packet in the window 3303, received by the Endpoint 3134, into an address in the window 3311, and transfers the packet from the Endpoint 3144. The NTB 3044 translates a destination address of a PCIe packet in the window 3314, received by the Endpoint 3144, into an address in the window 3302, and transfers the packet from the Endpoint 3134.

The NTB 3064 translates a destination address of a PCIe packet in the window 3304, received by the Endpoint 3234, into an address in the window 3312, and transfers the packet from the Endpoint 3244. The NTB 3064 translates a destination address of a PCIe packet in the window 3313, received by the Endpoint 3244, into an address in the window 3301, and transfers the packet from the Endpoint 3234.

With reference to FIG. 34, a description will be made of a data transfer path (Path1) 3401 between the processor 3003 and the processor 3023 using the NTB 3044. The data transfer path 3401 allows data in the memory 3002 and the memory 3022 to be transferred in a bidirectional manner, and passes through the Root Complex 3004, the Root Port 3007, the link 3010, the Upstream Port 3111, the NTB 3044, the Upstream Port 3121, the link 3031, the Root Port 3026, and the Root Complex 3024.

Data transfer may be performed by the processor in response to a memory access command, and may be performed by a direct memory access (DMA) function implemented in the processor. The processor 3003 has a DMA function 3411, and the processor 3023 has a DMA function 3412.

For example, the DMA function 3411 transfers data read from the memory 3002 to the Endpoint 3134 so as to transfer the data to the memory 3022. The DMA function 3412 transfers data read from the memory 3022 to the Endpoint 3144 so as to transfer the data to the memory 3002. The DMA functions 3411 and 3412 may be respectively implemented in the backend switches 3041 and 3061.

With reference to FIG. 35, a description will be made of a data transfer path (Path2) 3502 between the processor 3023 and the processor 3003 using the NTB 3064. The data transfer path 3502 allows data in the memory 3022 and the memory 3002 to be transferred in a bidirectional manner, and passes through the Root Complex 3024, the Root Port 3027, the link 3030, the Upstream Port 3122, the NTB 3064, the Upstream Port 3112, the link 3011, the Root Port 3006, and the Root Complex 3004.

Data transfer may be performed by the processor in response to a memory access command, and may be performed by a direct memory access (DMA) function implemented in the processor. For example, the DMA function 3411 transfers data read from the memory 3002 to the Endpoint 3344 so as to transfer the data to the memory 3022. The DMA function 3412 transfers data read from the memory 3022 to the Endpoint 3334 so as to transfer the data to the memory 3002.

As described above, the processors 3003 and 3023 can transfer data to the memories 3002 and 3022 thereof in a bidirectional manner by using the data transfer path 3401 including the NTB 3044 or the data transfer path 3502 including the NTB 3064.

The storage system according to Example 13 uses both of the data transfer path 3401 and the data transfer path 3502 during a normal operation. Generally, the processor is configured to include a plurality of processor cores, but a data transfer path used by each processor core may be allocated in advance such that about a half of the cores use the data transfer path 3401, and about the other half of the cores use the data transfer path 3502.

Figure 36:
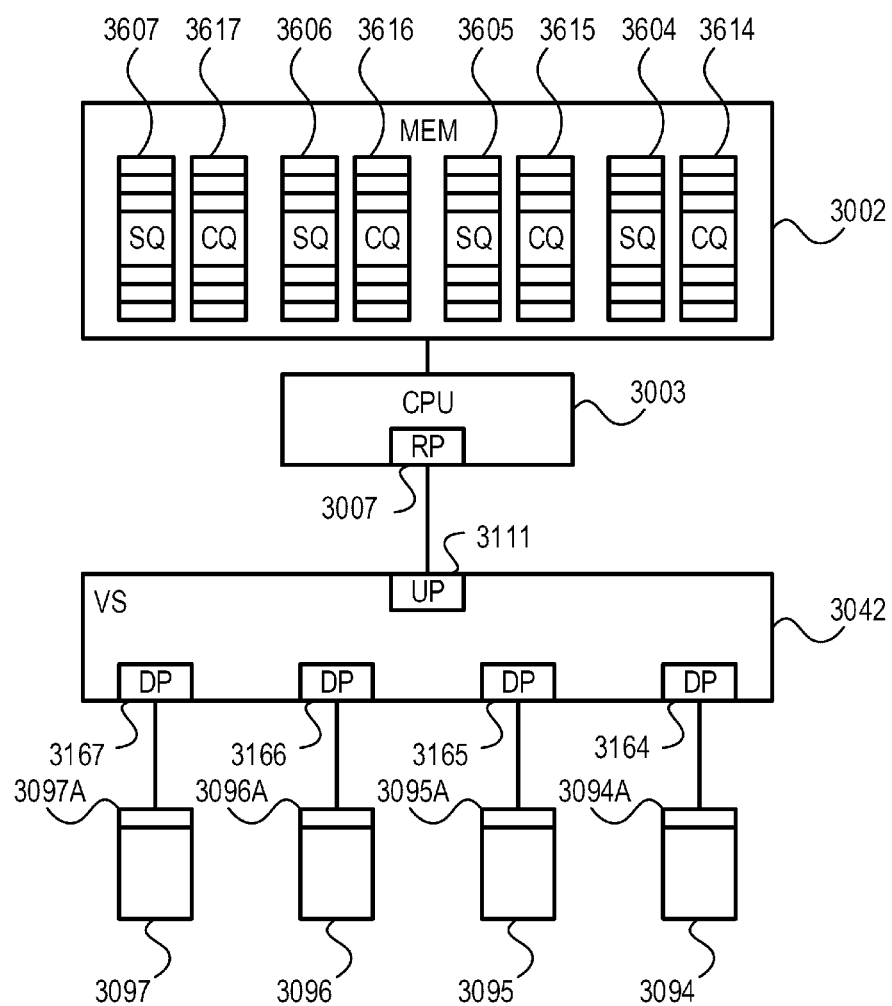
FIG. 36 is a diagram illustrating an example of a PCIe tree in the storage system.

With reference to FIGS. 36 and 37, a description will be made of a PCIe tree included in the storage system according to Example 13 and a queue allocated in the memory in order to control the storage devices. FIG. 36 illustrates a PCIe tree having the Root Port 3007 as a root as an example. The processor 3003 is connected to the Upstream Port 3111 of the virtual switch 3042 via the Root Port 3007.

The Downstream Ports 3164 to 3167 of the virtual switch 3042 are respectively connected to the ports 3094A to 3097A of the storage devices 3094 to 3097. A tree-like topology from the Root Port 3007 to the ports 3094A to 3097A is a PCIe tree.

In the storage system according to Example 13, the storage devices 3094 to 3097 are, for example, NVMe specification solid state drives. In the NVMe specification, in order to control the storage device, one or more Submission Queues and one or more Completion Queues are allocated in the main memory of the processor for each storage device.

As illustrated in FIG. 36, Submission Queues (SQ) 3604 and Completion Queues (CQ) 3614 for controlling the storage device 3094 are allocated in the memory 3002. Similarly, Submission Queues (SQ) 3605 to 3607 and Completion Queues (CQ) 3615 to 3617 for controlling the storage devices 3095 to 3097 are allocated in the memory 3002.

As an example, a description will be made of procedures in a case where the processor 3003 causes the storage device 3097 to execute an NVMe command. The processor 3003 enqueues an Entry including the NVMe command to the Submission Queues 3607. The processor 3003 notifies the storage device 3097 that there is the new Entry added to the Submission Queues.

The storage device 3097 receiving the notification reads the Entry from the Submission Queues 3607, and executes the content thereof. After the execution is completed, the storage device 3097 writes an Entry including a completion notification, that is, a Completion to the Completion Queues 3617. Finally, the processor 3003 reads the Completion so as to check the content of the completion notification.

As illustrated in FIG. 30, the storage system according to Example 13 includes the four Root Ports 3007, 3006, 3026 and 3027, and thus four PCIe trees are formed.

FIG. 37 illustrates a relationship among a port 3701 of the storage device, a storage device 3702, a port group 3703, a virtual switch 3704, a Root Port 3705, a processor 3706 controlling the storage device, and a memory 3707 in which queues for controlling the storage device are stored, included in the four PCIe trees. The port group is a group of ports of storage devices connected to Downstream Ports of the same virtual switch. The storage controllers 3001 and 3021 hold the information illustrated in FIG. 37 in, for example, the memories 3002 and 3022.

The ports 3094A to 3097A of the storage devices 3094 to 3097 connected to the Downstream Ports of the virtual switch 3042 are included in a port group Gr11. The processor 3003 accesses the ports 3094A to 3097A included in the port group Gr11 via the Root Port 3007, and controls the storage devices 3094 to 3097 with the queues allocated in the memory 3002.

The ports 3090B to 3093B of the storage devices 3090 to 3093 connected to the Downstream Ports of the virtual switch 3063 are included in a port group Gr12. The processor 3003 accesses the ports 3090B to 3093B included in the port group Gr12 via the Root Port 3006, and controls the storage devices 3090 to 3093 with the queues allocated in the memory 3002.

The ports 3090A to 3093A of the storage devices 3090 to 3093 connected to the Downstream Ports of the virtual switch 3043 are included in a port group Gr21. The processor 3023 accesses the ports 3090A to 3093A included in the port group Gr21 via the Root Port 3026, and controls the storage devices 3090 to 3093 with the queues allocated in the memory 3022.

The ports 3094B to 3097B of the storage devices 3094 to 3097 connected to the Downstream Ports of the virtual switch 3062 are included in a port group Gr22. The processor 3023 accesses the ports 3094B to 3097B included in the port group Gr22 via the Root Port 3027, and controls the storage devices 3094 to 3097 with the queues allocated in the memory 3022.

Figure 38:
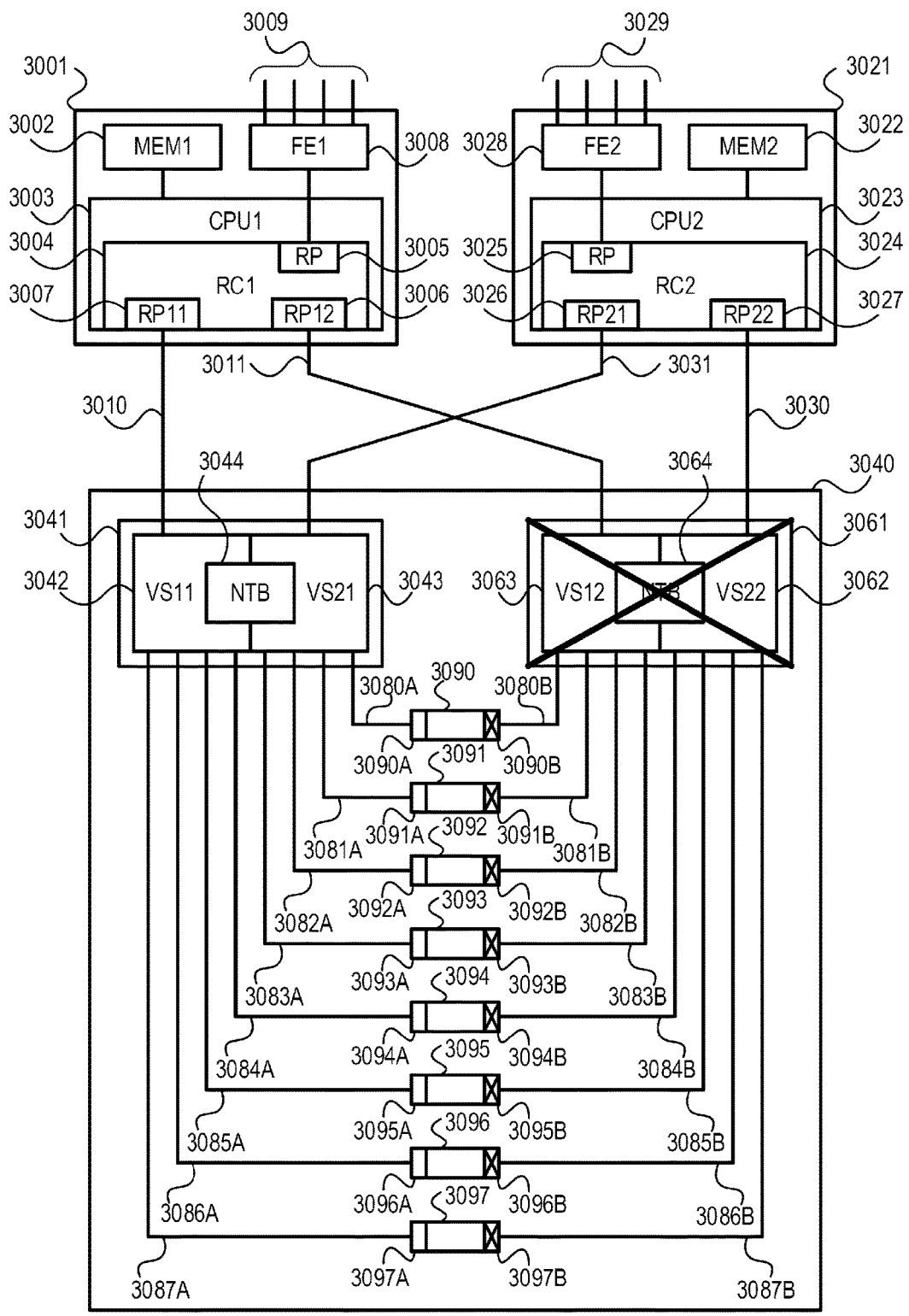
FIG. 38 is a diagram illustrating an example of a failure influence range of the backend switch.

With reference to FIG. 38, a description will be made of an influence range of a backend switch failure in the storage system according to Example 13. As an example, a case is assumed in which a failure occurs in the backend switch 3061, and thus operations of the virtual switches 3062, 3063 and the NTB 3064 of the backend switch 3061 cannot be performed.

In this case, the ports 3090B to 3097B of the storage devices 3090 to 3097 connected to the Downstream Ports of the virtual switches 3062, 3063 cannot be accessed from the processors 3003 and 3023. Data transfer between the processors using the data transfer path 3502 in FIG. 35 cannot be performed.

However, the ports 3090A to 3093A of the storage devices 3090 to 3093 can be accessed from the processor 3023 via the link 3031 and the virtual switch 3043. The ports 3094A to 3097A of the storage devices 3094 to 3097 can be accessed from the processor 3003 via the link 3010 and the virtual switch 3042. Data transfer between the processors using the data transfer path 3401 in FIG. 34 can be performed. Therefore, even in a case where a failure occurs in the backend switch 3061, the storage system according to Example 13 can continuously perform an operation thereof.

As mentioned above, in the storage system according to Example 13, even if one of the backend switches 3041 and 3061 stops an operation thereof, or one of the links 3010, 3011, 3030 and 3031 to the backend switches 3041 and 3061 is disconnected, both of communication between the processors 3003 and 3023 and communication among the processors 3003 and 3023 and the storage devices 3090 to 3097 can be continuously performed. Consequently, it is possible to increase the availability of the system.

Figure 39:
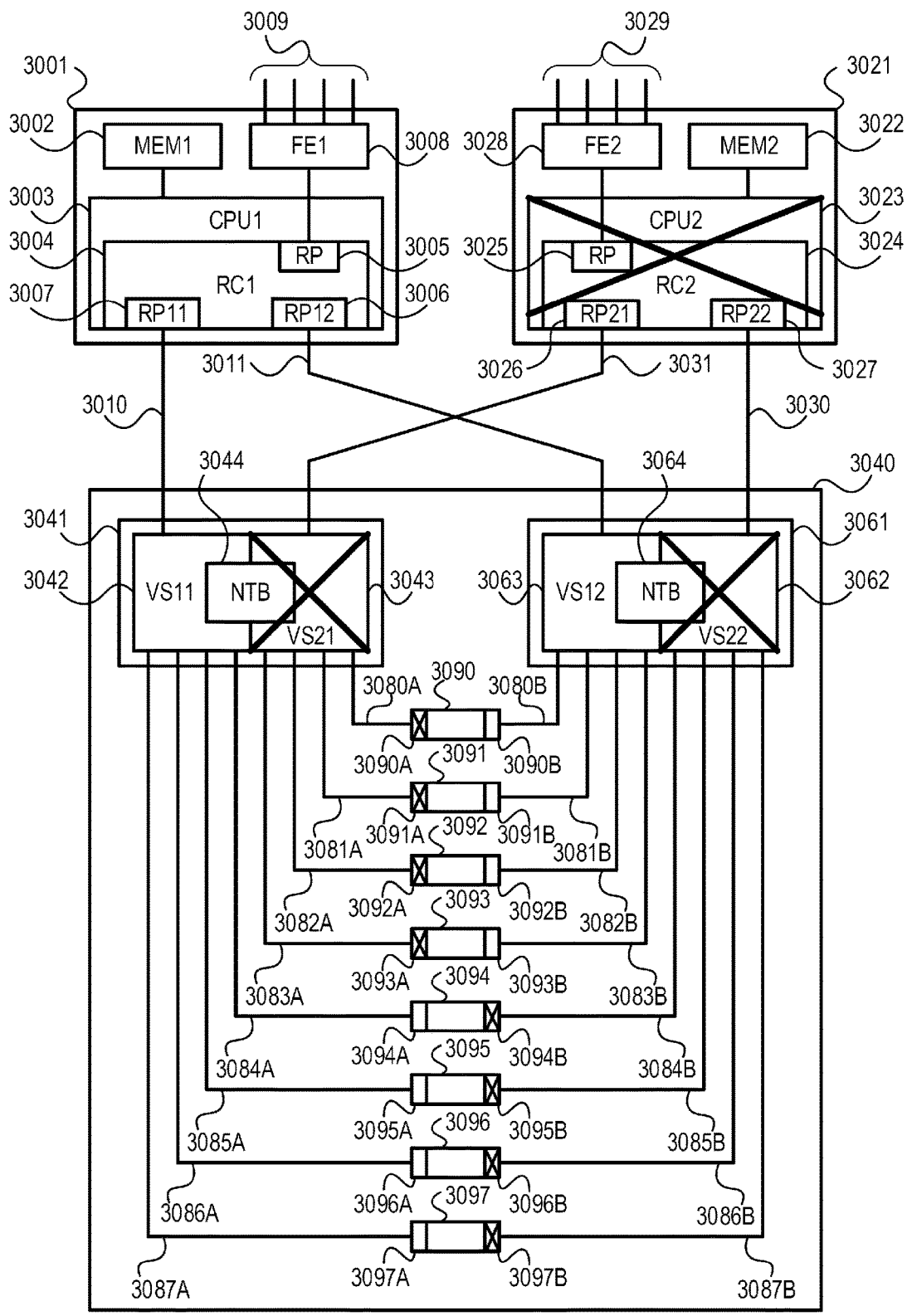
FIG. 39 is a diagram illustrating an example of a failure influence range of the storage controller.

With reference to FIG. 39, a description will be made of an influence range of a storage controller failure in the storage system according to Example 13. First, a function of the virtual switch will be described. A plurality of virtual switches included in the same backend switch can be separately reset. For example, in a case where the link 3030 is down in the backend switch 3061, the virtual switch 3062 becomes Reset state, but the virtual switch 3063 is not influenced thereby.

The virtual switch 3063 can continuously perform an operation thereof regardless of a state of the virtual switch 3062. In a case where the link 3011 is down, the virtual switch 3063 becomes Reset state, but the virtual switch 3062 is not influenced thereby. The virtual switch 3062 can continuously perform an operation thereof regardless of a state of the virtual switch 3063.

As an example, a case is assumed in which a failure occurs in the processor 3023 of the storage controller 3021, and the virtual switch 3062 of the backend switch 3061 and the virtual switch 3043 of the backend switch 3041 cannot perform operations thereof.

In this case, the ports 3090A to 3093A of the storage devices 3090 to 3093 connected to the Downstream Ports of the virtual switch 3043 and the ports 3094B to 3097B of the storage devices 3094 to 3097 connected to the Downstream Ports of the virtual switch 3062 cannot be accessed from the processor 3023.

Data transfer between the processors using the data transfer path 3401 in FIG. 34 and the data transfer path 3502 in FIG. 35 cannot be performed. However, the ports 3090B to 3093B of the storage devices 3090 to 3093 can be accessed from the processor 3003 via the link 3011 and the virtual switch 3063.

The ports 3094A to 3097A of the storage devices 3094 to 3097 can be accessed from the processor 3003 via the link 3010 and the virtual switch 3042. As mentioned above, in the storage system according to Example 13, even in a case where a failure occurs in one of the storage controllers, all of the storage devices can be accessed.

With reference to FIGS. 40 to 43, a description will be made of a reading method for the storage devices during the occurrence of a failure in the backend switch and a maintenance or replacement method for the backend switch in the storage system according to Example 13.

The maintenance includes, for example, update work for firmware of the backend switch, and the backend switch is temporarily disconnected during the work. The replacement includes, for example, replacement of a switch due to a failure in the backend switch. In either case, since a path passing through a target backend switch cannot be used as a data transfer path, an alternative path is required to be used in order to access the storage devices.

First, a description will be made of a case where the storage controller receives a write request for the storage device from a host computer when one of the two backend switches in disconnected. For example, in a case where the host IF 3008 of the storage controller 3001 receives a write request, write data accompanying the write request is stored in the memory 3002. The write data stored in the memory 3002 is transferred to the memory 3022 of the storage controller 3021 via the data transfer path 3401 or 3502.

As mentioned above, the storage system according to Example 13 duplicates and holds the received write data in the memories of the two storage controllers. The two storage controllers can access the storage devices of the storage system via any one of the two backend switches. Therefore, even in a case where one of the two backend switches is disconnected, storage system according to Example 13 can write data received from a host computer to the storage devices.

Next, a description will be made of a case where the storage controller receives a read request for the storage device from a host computer when one of the two backend switches is disconnected. As described with reference to FIGS. 36 and 37, in the storage system according to Example 13, a port group of storage devices which can be accessed is defined for each PCIe tree. In other words, if one of the backend switches is disconnected, a storage device which cannot be accessed from one storage controller.

For example, it is assumed that the host IF 3028 of the storage controller 3021 receives a request for reading data stored in the storage device 3097 from a host computer. In this case, if the backend switch 3061 is disconnected, the storage controller 3021 cannot read desired data from the storage device 3097. In this case, the storage controller 3021 is required to request the storage controller 3001 which can access the storage device 3097 storing data to be read, to read the data from the storage device 3097.

With reference to FIG. 40, a description will be made of a relationship between an alternative path used during maintenance or replacement work for a (disconnected) backend switch which is a replacement or maintenance target, and ports of storage device which are access destinations. Specifically, FIG. 40 illustrates a relationship among a maintenance or replacement target switch 4001, a storage controller 4002 having received a request, an access destination port group 4003, an alternative process storage controller 4004, an alternative access destination port group 4005, and an available data transfer path 4006 between storage controllers. The storage controllers 3001 and 3021 store the information illustrated in FIG. 40 in, for example, the memories 3002 and 3022.

First, a description will be made of a case where a maintenance or replacement target switch (4001) is the backend switch 3041, a storage controller (4002) having received a read request from a host computer is the storage controller 3001, and a port group (4003) of read destination storage devices is Gr11.

In this case, the storage controller 3001 requests the storage controller 3021 to read data from the storage devices by using the data transfer path 3502 which is an available data transfer path (4006) between the storage controllers. The storage controller 3021 receiving the request accesses the ports of the storage devices included in the port group Gr22, and reads desired data.

Next, a description will be made of a case where a maintenance or replacement target switch (4001) is the backend switch 3041, a storage controller (4002) having received a read request from a host computer is the storage controller 3001, and a port group (4003) of read destination storage devices is Gr12. In this case, the storage controller 3001 can directly access the ports of the storage devices included in the port group Gr12, and thus it is not necessary to request the storage controller 3021 to read data.

Next, a description will be made of a case where a maintenance or replacement target switch (4001) is the backend switch 3041, a storage controller (4002) having received a read request from a host computer is the storage controller 3021, and a port group (4003) of read destination storage devices is Gr21.

In this case, the storage controller 3021 requests the storage controller 3001 to read data from the storage devices by using the data transfer path 3502 which is an available data transfer path (4006) between the storage controllers. The storage controller 3001 receiving the request accesses the ports of the storage devices included in the port group Gr12, and reads desired data.

Next, a description will be made of a case where a maintenance or replacement target switch (4001) is the backend switch 3041, a storage controller (4002) having received a read request from a host computer is the storage controller 3021, and a port group (4003) of read destination storage devices is Gr22. In this case, the storage controller 3021 can directly access the ports of the storage devices included in the port group Gr22, and thus it is not necessary to request the storage controller 3001 to read data.

Next, a description will be made of a case where a maintenance or replacement target switch (4001) is the backend switch 3061, a storage controller (4002) having received a read request from a host computer is the storage controller 3001, and a port group (4003) of read destination storage devices is Gr11. In this case, the storage controller 3001 can directly access the ports of the storage devices included in the port group Gr11, and thus it is not necessary to request the storage controller 3021 to read data.

Next, a description will be made of a case where a maintenance or replacement target switch (4001) is the backend switch 3061, a storage controller (4002) having received a read request from a host computer is the storage controller 3001, and a port group (4003) of read destination storage devices is Gr12.

In this case, the storage controller 3001 requests the storage controller 3021 to read data from the storage devices by using the data transfer path 3401 which is an available data transfer path (4006) between the storage controllers. The storage controller 3021 receiving the request accesses the ports of the storage devices included in the port group Gr21, and reads desired data.

Next, a description will be made of a case where a maintenance or replacement target switch (4001) is the backend switch 3061, a storage controller (4002) having received a read request from a host computer is the storage controller 3021, and a port group (4003) of read destination storage devices is Gr21. In this case, the storage controller 3021 can directly access the ports of the storage devices included in the port group Gr21, and thus it is not necessary to request the storage controller 3001 to read data.

Next, a description will be made of a case where a maintenance or replacement target switch (4001) is the backend switch 3061, a storage controller (4002) having received a read request from a host computer is the storage controller 3021, and a port group (4003) of read destination storage devices is Gr22.

In this case, the storage controller 3021 requests the storage controller 3001 to read data from the storage devices by using the data transfer path 3401 which is an available data transfer path (4006) between the storage controllers. The storage controller 3001 receiving the request accesses the ports of the storage devices included in the port group Gr11, and reads desired data.

As described above, in a case where one of the backend switches is disconnected due to an inoperable state, the storage controller having received a read request from a host computer determines the necessity and unnecessity of an alternative read request for the other storage controller, a read destination port group, and an available data transfer path between the storage controllers, according to the information illustrated in FIG. 40.

Figure 41:
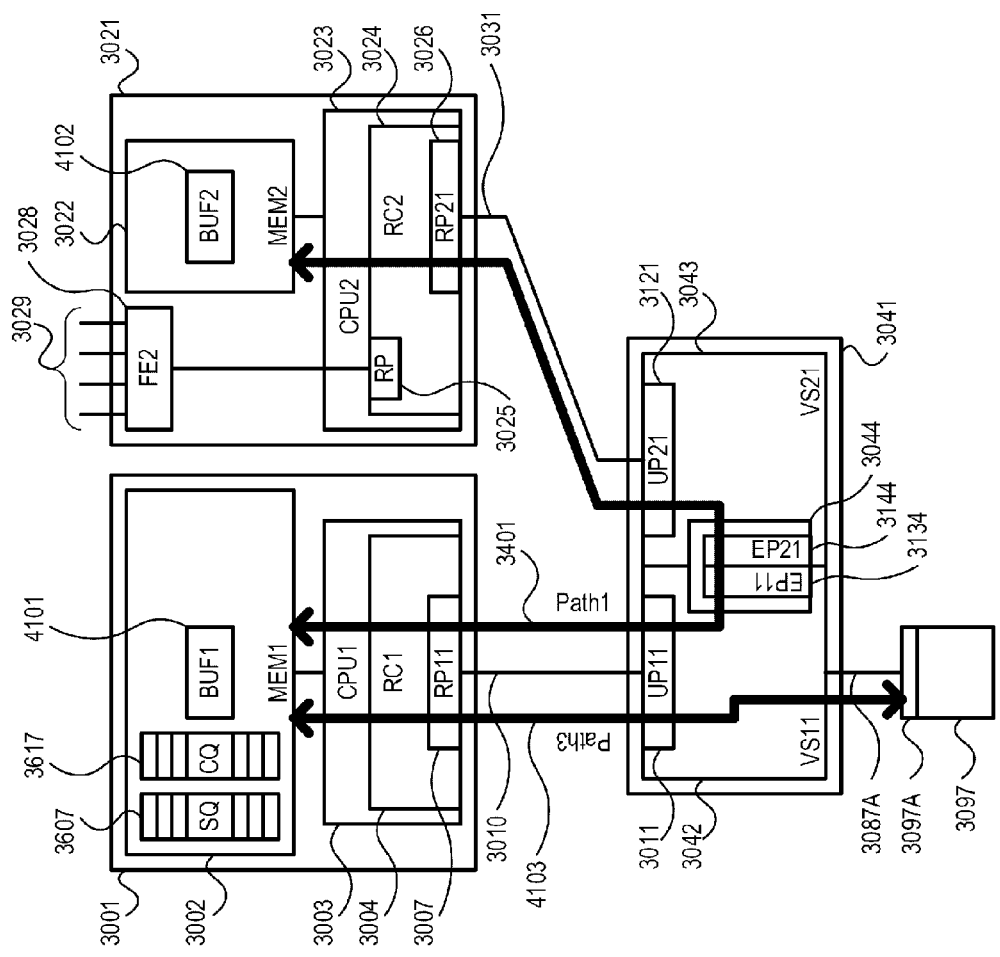
FIG. 41 is a diagram illustrating an example of a data read path from the storage device.

With reference to FIG. 41, a description will be made of an example of a data read path from the storage device to a host computer when a failure occurs in the backend switch. In FIG. 41, only one backend switch 3041 is operable, and the backend switch 3061 (not illustrated) is inoperable. The host IF 3028 of the storage controller 3021 receives a request for reading data from the storage device 3097 from a host computer (not illustrated).

Since the backend switch 3061 is disconnected, the storage controller 3021 cannot access the storage device 3097, and thus requests the storage controller 3001 to read data from the storage device 3097 by transferring a predetermined command or message by using the data transfer path 3401. The message includes read destination storage device information, address information of read destination data in the storage device, and address information of a buffer (BUF2) 4102 in the memory 3022 which is a destination of read data.

The storage controller 3001 includes the Submission Queues 3607 and the Completion Queues 3617 for controlling the storage device 3097 in the memory 3002. The storage controller 3001 performed data transfer between the storage device 3097 and the memory 3002 by using a data transfer path (Path3) 4103 passing through the Root Port 3007 of the processor 3003, the link 3010, the virtual switch 3042, and a link 3087A.

The storage controller 3001 stores the data read from the storage device 3097 in a buffer 4101 of the memory 3002. The storage controller 3001 transfers the read data in the buffer 4101 to the buffer 4102 by using the data transfer path 3401.

Figure 42:
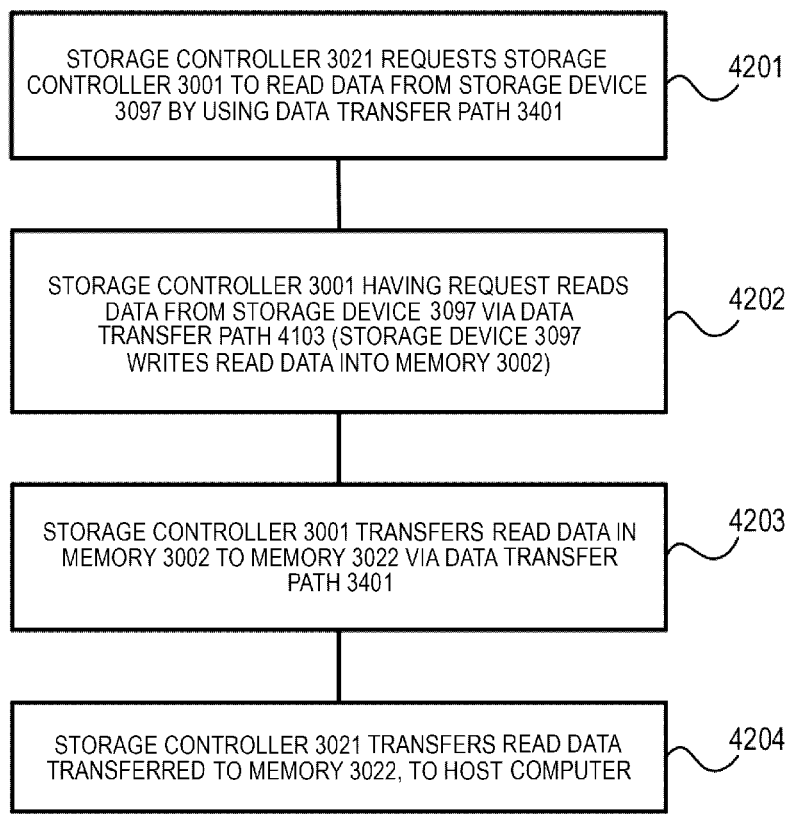
FIG. 42 is a flowchart illustrating examples of data read procedures from the storage device when a failure occurs in the backend switch.

With reference to FIG. 42, a description will be made of a flowchart illustrating a method of reading data from the storage device when a failure occurs in the backend switch. In step 4201, the storage controller 3021 requests the storage controller 3001 to read data from the storage device 3097 by using the data transfer path 3401.

In step 4202, the storage controller 3001 having the request reads data from the storage device 3097 via the data transfer path 4103. Specifically, the processor 3003 enqueues an Entry including a read command for the storage device 3097 to the Submission Queues 3607. A destination of read data is the buffer 4101 of the memory 3002.

The storage device 3097 which fetches the read command from the Submission Queues 3607 transfers the requested data to the buffer 4101 via the data transfer path 4103. After transfer of the data to the buffer 4101 is completed, the storage device 3097 enqueues a Completion to the Completion Queues 3617.

In step 4203, the storage controller 3001 having checked the Completion transfers the read data in the buffer 4101 of the memory 3002 to the buffer 4102 of the memory 3022 via the data transfer path 3401. The storage controller 3001 notifies the storage controller 3021 of transfer completion. In step 4204, the storage controller 3021 transfers the read data transferred to the buffer 4102 of the memory 3022, to the host computer.

Figure 43:
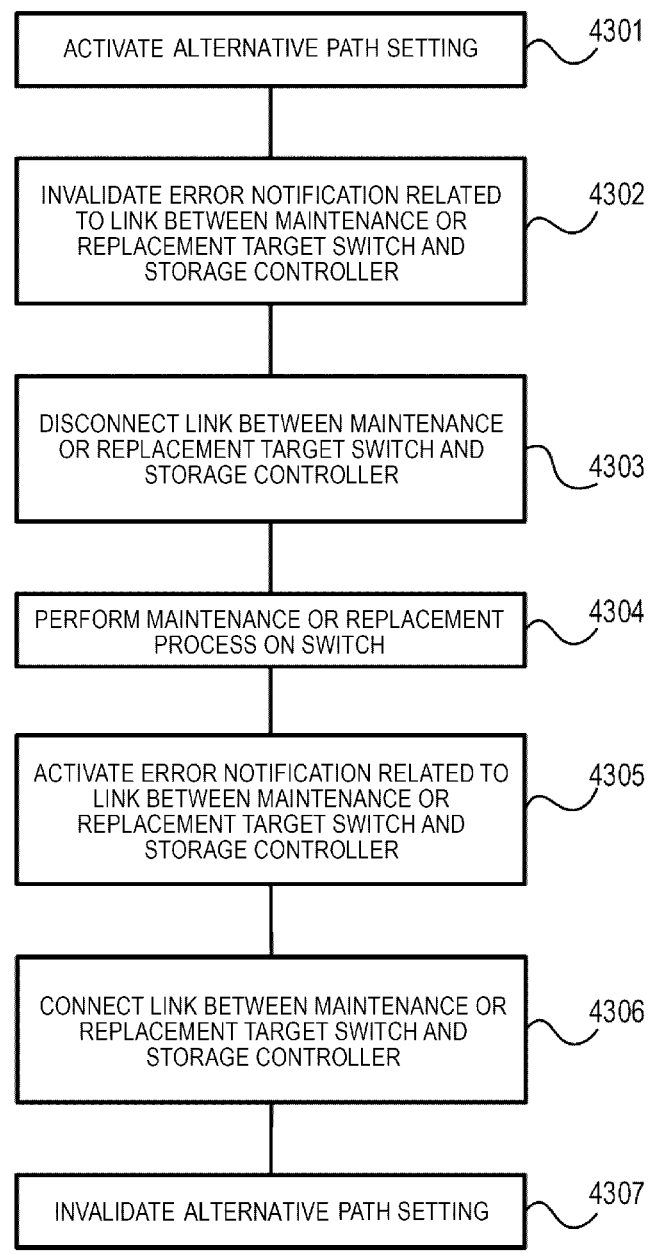
FIG. 43 is a flowchart illustrating examples of procedures of maintenance or replacement of the backend switch.

With reference to FIG. 43, a description will be made of a flowchart illustrating maintenance or replacement of the backend switch in the storage system according to Example 13. The storage controllers 3001 and 3021 hold information set by a maintenance person in a flow described below, and perform an I/O process according to the information.

In step 4301, the maintenance person of the storage system activates the alternative path setting described in FIG. 40 in the storage system according to Example 13. After the step is executed, the storage system according to Example 13 performs reading or writing on the storage device without using a maintenance or replacement target backend switch.

In step 4302, the maintenance person invalidates an error notification related to a link between the maintenance or replacement target backend switch and the storage controller. This is so that link-down occurs due to replacement work or the like for the backend switch, but automatic starting of a failure handling caused by detection of the link-down is prevented. This step does not act on a failure handling which has been already performed, caused by the link-down.

In step 4303, the maintenance person disconnects the link between the maintenance or replacement target backend switch and the storage controller. In step 4304, the maintenance person performs maintenance or replacement work for the backend switch.

In step 4305, the maintenance person activates an error notification related to the link between the maintenance or replacement target backend switch and the storage controller. If link-down occurs after link-up is performed again, a failure handling caused by detection of the link-down is started.

In step 4306, the maintenance person connects between the link between the maintenance or replacement target backend switch and the storage controller.

In step 4307, the maintenance person invalidates the alternative path setting described in FIG. 40. After the step is executed, the storage system according to Example 13 resumes reading or writing for the storage device by using the maintenance or replacement target backend switch.

As described above, the storage system according to Example 13 can perform maintenance or replacement work for the backend switch while continuously performing an operation of the storage system including reading data from the storage device.

Features of the storage system according to Example 13 are summarized as follows. The storage system according to Example 13 includes the two storage controllers 3001 and 3021, and the drive enclosure 3040 in which the storage devices 3090 to 3097 each including two PCIe Ports are installed.

The two storage controllers 3001 and 3021 and the drive enclosure 3040 are connected to each other via the links 3010, 3011, 3030 and 3031. The drive enclosure 3040 includes the backend switch 3041 in which the virtual switches 3042 and 3043 are connected to each other via the NTB 3044, and the backend switch 3061 in which the virtual switches 3062 and 3063 are connected to each other via the NTB 3064.

Each of the backend switches 3041 and 3061 includes two Upstream Ports (3111 and 3121 or 3222 and 3212), one of which is connected to the storage controller 3001 and the other of which is connected to the storage controller 3021.

The storage devices 3090 to 3097 are connected to the Downstream Ports (3160 to 3167 or 3260 to 3267) of the two backend switches so as to be accessed from the two storage controllers 3001 and 3021 without using the NTBs 3044 and 3064.

According to the storage system of Example 13 having the above-described features, a data transfer path between the storage controllers and a data transfer path between the storage controller and the storage devices are duplicated, and thus it is possible to realize the storage system with high availability.

Example 14

Figure 44:
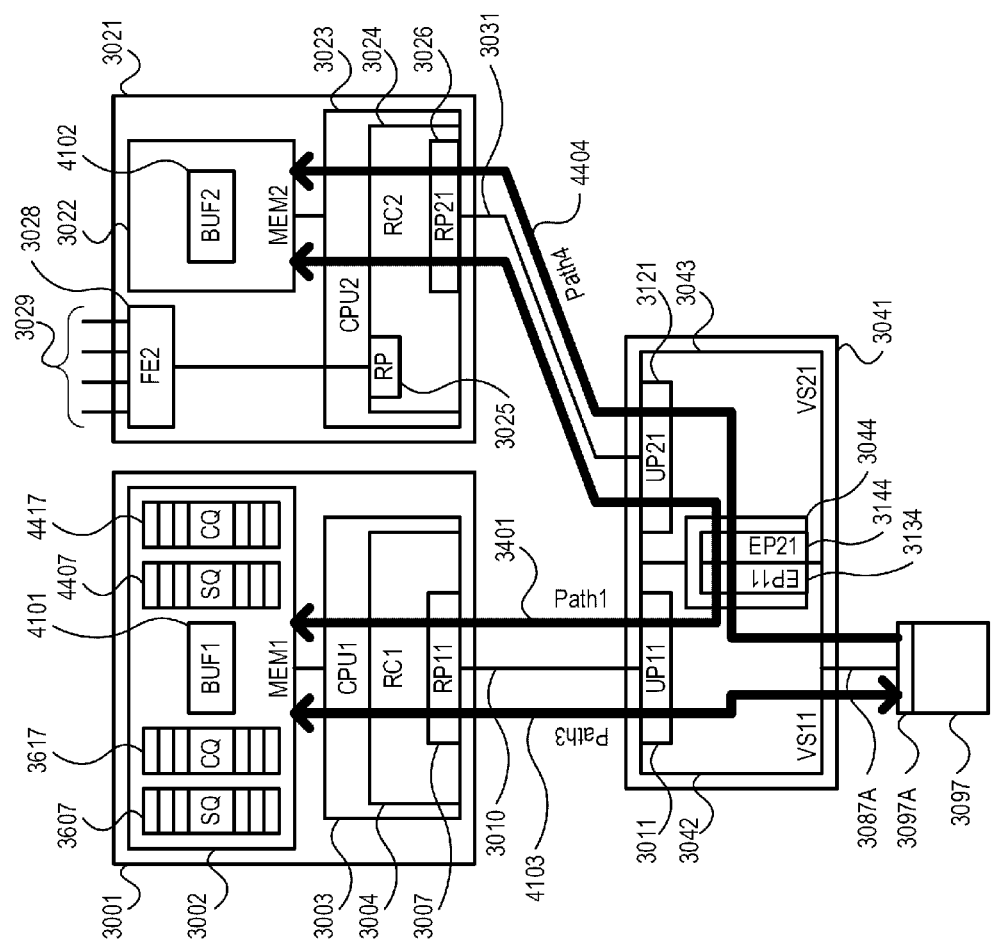
FIG. 44 is a diagram illustrating another example of a data read path from the storage device.
Figure 45:
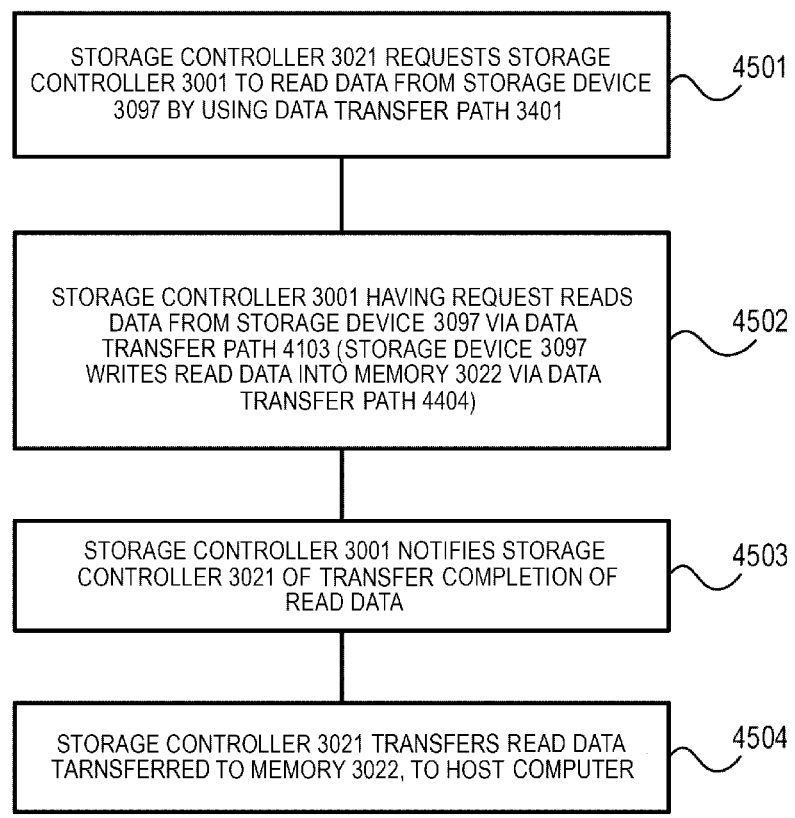
FIG. 45 is a flowchart illustrating other examples of data read procedures from the storage device when a failure occurs in the backend switch.

With reference to FIGS. 44 and 45, Example 14 will be described. A storage system according to Example 14 is different from the storage system according to Example 13 in terms of a method of reading data from the storage device when a failure occurs in the backend switch.

With reference to FIG. 44, a description will be made of a data read path from the storage device to a host computer during the occurrence of a failure in the backend switch. In FIG. 44, only one backend switch 3041 is operable, and the backend switch 3061 (not illustrated) is inoperable. In this example, the host IF 3028 of the storage controller 3021 receives a request for reading data from the storage device 3097 from a host computer (not illustrated).

Since the backend switch 3061 is disconnected, the storage controller 3021 cannot access the storage device 3097. The storage controller 3021 requests the storage controller 3001 to read data from the storage device 3097 by transferring a predetermined command or message by using the data transfer path 3401. The message includes read destination storage device information, address information of read destination data in the storage device, and address information of the buffer 4102 in the memory 3022 which is a destination of read data.

The storage controller 3001 includes the Submission Queues 3607 and the Completion Queues 3617 for controlling the storage device 3097 in the memory 3002. The storage controller 3001 includes Submission Queues 4407 and Completion Queues 4417 for controlling the storage device 3097 in the memory 3002. The Submission Queues 4407 and the Completion Queues 4417 are queues used for an alternative process requested from the storage controller 3021.

The storage controller 3001 performed data transfer between the storage device 3097 and the memory 3002 by using the data transfer path 4103. The storage device 3097 stores data read as a result of executing a command included in an Entry in the Submission Queues 4407, in the buffer 4102 of the memory 3022. The data is transferred by using a data transfer path (Path4) 4404 passing through the link 3087A, the virtual switch 3042, the NTB 3044, the virtual switch 3043, the link 3031, and the Root Port 3026 of the processor 3023.

With reference to FIG. 45, a description will be made of a flowchart illustrating a method of reading data from the storage device when a failure occurs in the backend switch. In step 4501, the storage controller 3021 requests the storage controller 3001 to read data from the storage device 3097 by using the data transfer path 3401.

In step 4502, the storage controller 3001 having the request reads data from the storage device 3097 via the data transfer path 4103. Specifically, the processor 3003 enqueues an Entry including a read command for the storage device 3097 to the Submission Queues 4407. A destination of read data is set to be the buffer 4102 of the memory 3022.

The storage device 3097 which fetches the read command from the Submission Queues 4407 transfers the requested data to the buffer 4102 via the data transfer path 4404. After transfer of the data to the buffer 4102 is completed, the storage device 3097 enqueues a Completion to the Completion Queues 4417. The processor 3023 may directly enqueue an Entry including a read command for the storage device 3097 to the Submission Queues 4407 via the data transfer path 3401.

In step 4503, the storage controller 3001 having checked the Completion notifies the storage controller 3021 of transfer completion of the read data. In step 4504, the storage controller 3021 transfers the read data transferred to the buffer 4102 of the memory 3022, to the host computer.

According to the storage system of Example 14, in a read process for the storage device during the occurrence of a failure in the backend switch, it is not necessary to transfer read data between the storage controller 3001 and the storage controller 3021. As a result, it is possible to reduce the time required for read data transfer between the storage controllers, and also to reduce a memory usage and a memory bandwidth related to data transfer between the storage controllers.

Example 15

Figure 46:
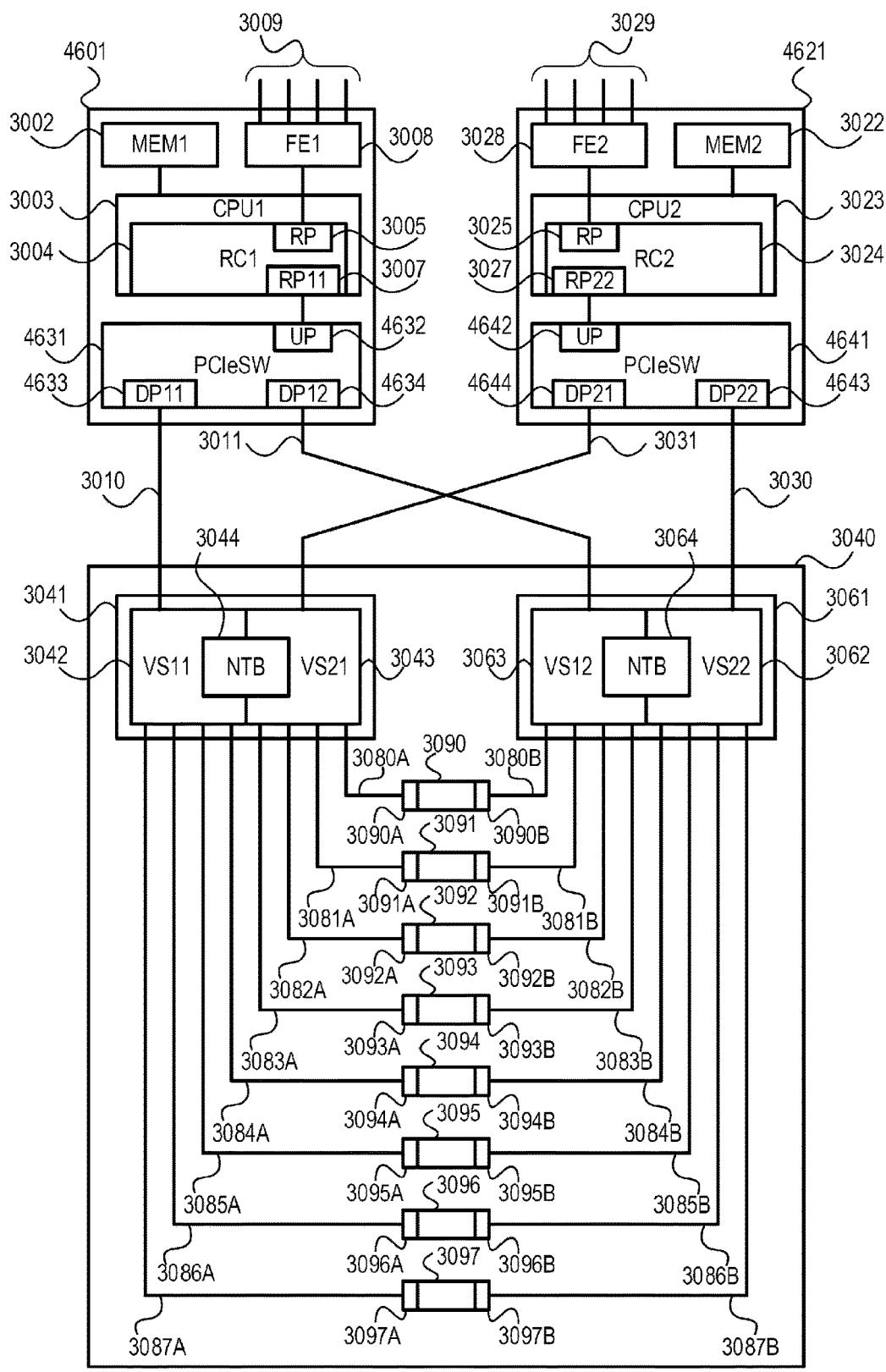
FIG. 46 illustrates still another configuration example of the storage system.

Example 15 will be described with reference to FIG. 46. FIG. 46 illustrates an example of a configuration of a storage system according to Example 15. The storage system according to Example 15 is different from the storage system according to Example 13 in that the processor of the storage controller is connected to the drive enclosure via a PCIe switch provided in the storage controller.

In FIG. 46, the storage system includes two storage controllers 4601 and 4621, and the drive enclosure 3040. The storage controller 4601 includes a PCIe switch 4631 in which an Upstream Port (UP) 4632 is connected to the Root Port 3007 of the processor 3003.

A Downstream Port (DP11) 4633 of the PCIe switch 4631 is connected to the virtual switch 3042 of the drive enclosure 3040 via the link 3010. A Downstream Port (DP12) 4634 of the PCIe switch 4631 is connected to the virtual switch 3063 of the drive enclosure 3040 via the link 3011.

The storage controller 4621 includes a PCIe switch 4641 in which an Upstream Port 4642 is connected to the Root Port 3027 of the processor 3023. A Downstream Port (DP22) 4643 of the PCIe switch 4641 is connected to the virtual switch 3062 of the drive enclosure 3040 via the link 3030. A Downstream Port (DP21) 4644 of the PCIe switch 4641 is connected to the virtual switch 3043 of the drive enclosure 3040 via the link 3031.

Other configurations and operations of the storage system according to Example 15 are the same as those of the storage system according to Example 13, and description thereof will be omitted.

According to the storage system of Example 15, even in a case where a sufficient number of Root Ports or Lanes are not provided in the processor of the storage controller, and thus the number of Root Ports or Lanes allocated to connection to the drive enclosure is insufficient, it is possible to provide the storage system with the high availability in the same manner as the storage system according to Example 13 or 14.

Example 16

Figure 47:
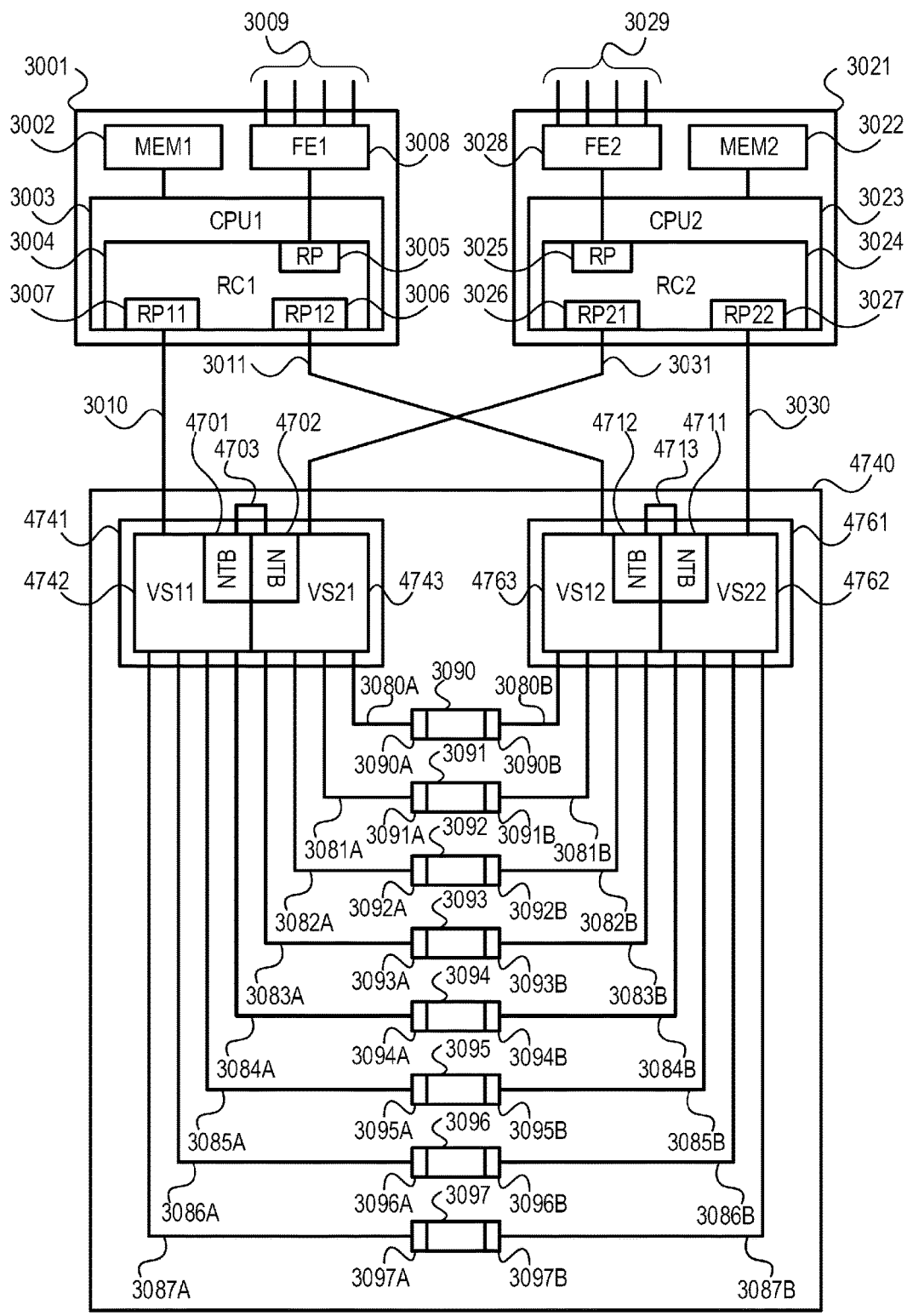
FIG. 47 illustrates still another configuration example of the storage system.

Example 16 will be described with reference to FIGS. 47 to 50. FIG. 47 illustrates a configuration example of a configuration of a storage system according to Example 16. The storage system according to Example 16 is different the storage system according to Example 13 in terms of a configuration of the backend switch.

In FIG. 47, the storage system according to Example 16 includes two storage controllers 3001 and 3021, and a drive enclosure 4740. The drive enclosure 4740 includes backend switches 4741 and 4761 instead of the backend switches 3041 and 3061 in FIG. 30. Other configurations and operations of the storage system according to Example 16 are the same as those of the storage system according to Example 13.

Figure 48:
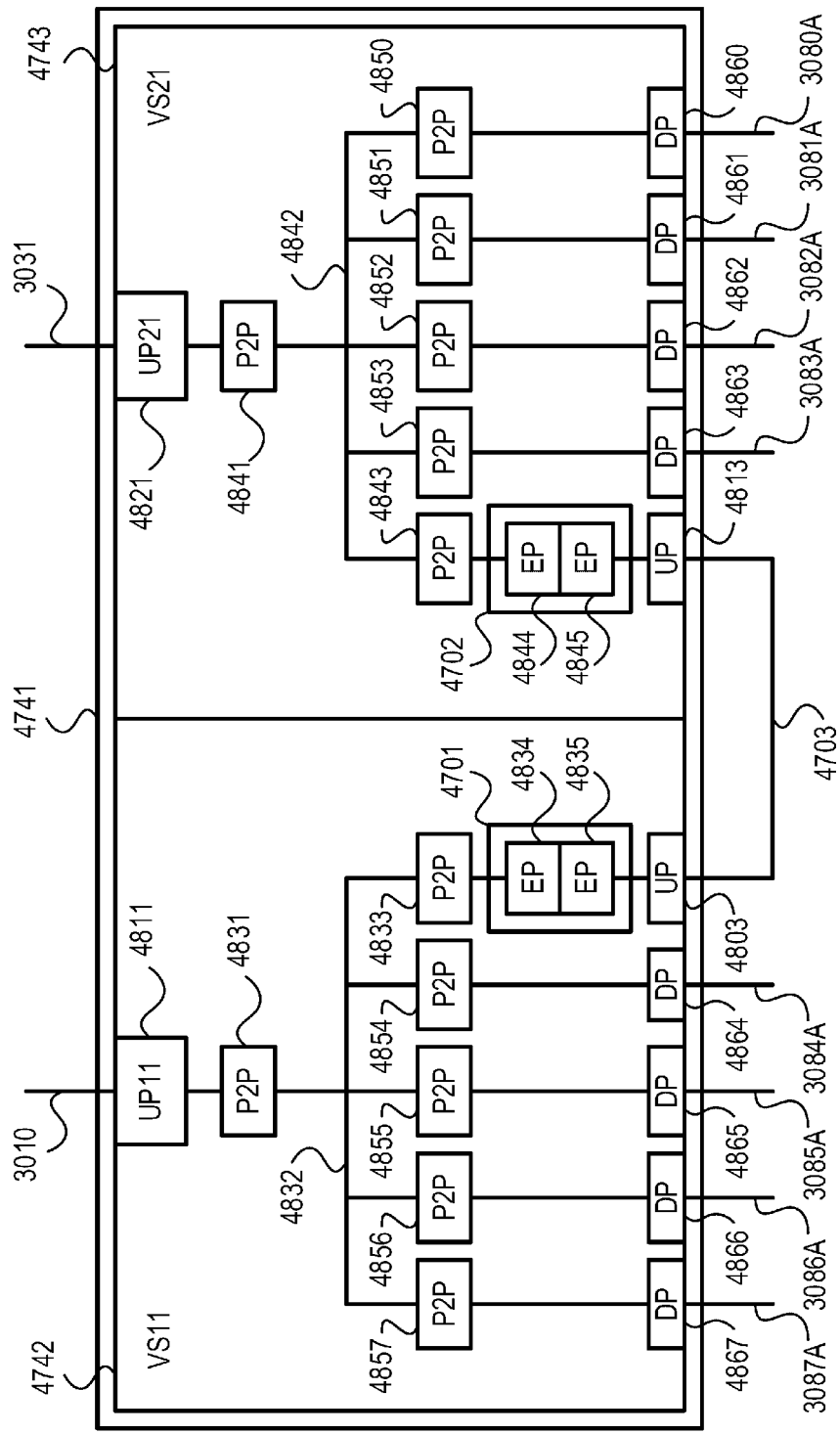
FIG. 48 illustrates still another configuration example of the backend switch.

FIG. 48 illustrates an internal configuration example of the backend switch 4741. A virtual switch 4742 is configured to include an Upstream Port 4811 connected to the link 3010, and Downstream Ports 4864 to 4867 connected to the links 3084A to 3087A. The Upstream Port 4811 is connected to a P2P Bridge 4831, and the Downstream Ports 4864 to 4867 are respectively connected to P2P Bridges 4854 to 4857. The P2P Bridges 4831, 4833 and 4854 to 4857 are connected to an internal bus 4832.

An NTB 4701 includes two Endpoints 4834 and 4835. The Endpoint 4834 is connected to the P2P Bridge 4833, and is set to be accessed from the processor 3003 via the link 3010. The Endpoint 4835 is connected to the Upstream Port 4803, and is set to be accessed from the processor 3023 via a link 4703, a virtual switch 4743, and the link 3031. The Endpoints 4834 and 4835 are set and connected to each other such that a PCIe packet of which a destination is within a predetermined address range can pass in a bidirectional manner.

The virtual switch 4743 is configured to include an Upstream Port 4821 connected to the link 3031, and Downstream Ports 4860 to 4863 connected to the links 3080A to 3083A. The Upstream Port 4821 is connected to a P2P Bridge 4841, and the Downstream Ports 4860 to 4863 are respectively connected to P2P Bridges 4850 to 4853. The P2P Bridges 4841, 4843, and 4850 to 4853 are connected to an internal bus 4842.

An NTB 4702 includes two Endpoints 4844 and 4845. The Endpoint 4844 is connected to the P2P Bridge 4843, and is set to be accessed from the processor 3023 via the link 3031. The Endpoint 4845 is connected to the Upstream Port 4813, and is set to be accessed from the processor 3003 via the link 4703, the virtual switch 4742, and the link 3010. The Endpoints 4844 and 4845 are set and connected to each other such that a PCIe packet of which a destination is within a predetermined address range can pass in a bidirectional manner.

Figure 49:
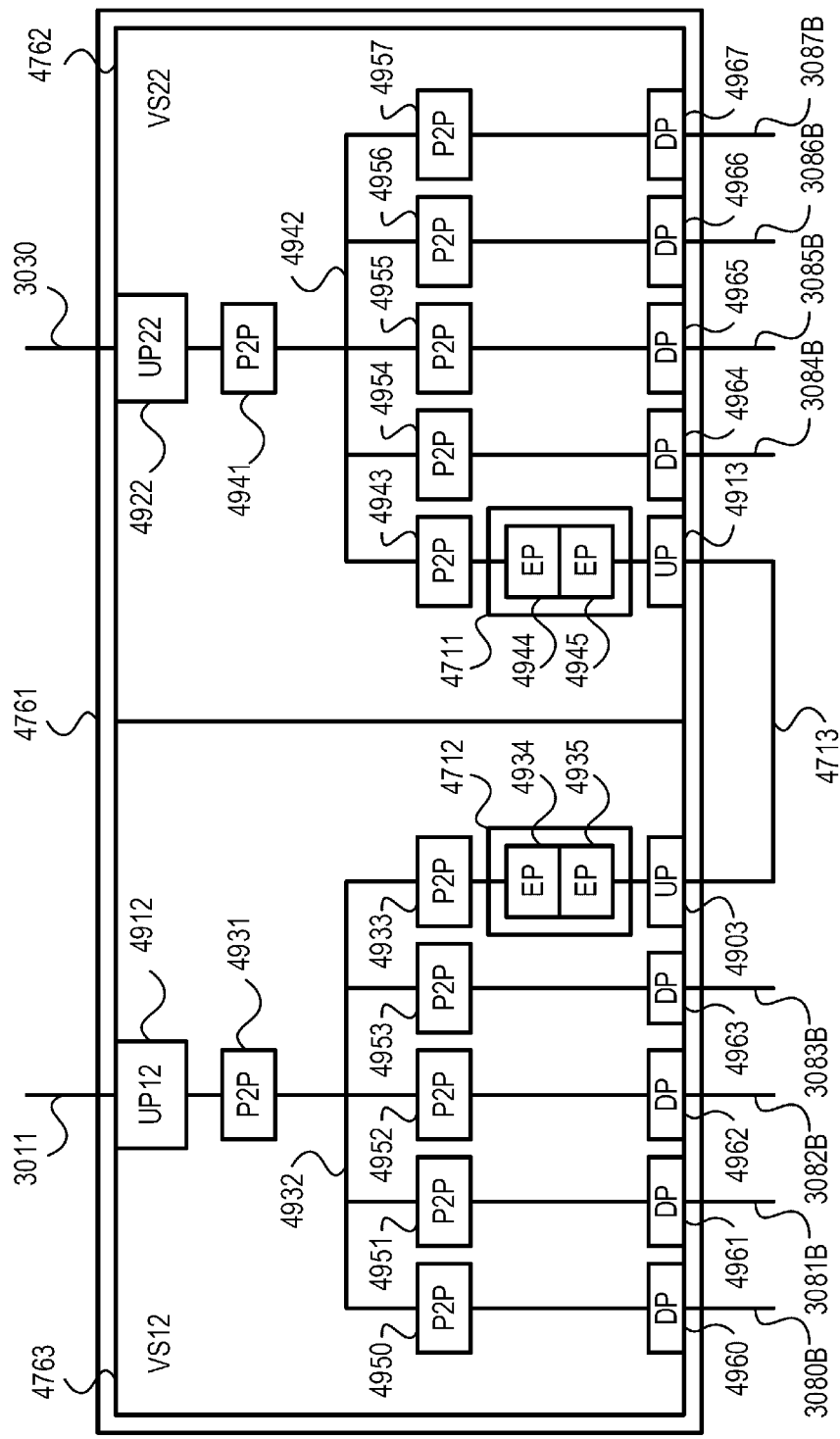
FIG. 49 illustrates still another configuration example of the backend switch.

FIG. 49 illustrates an internal configuration example of the backend switch 4761. A virtual switch 4762 is configured to include an Upstream Port 4922 connected to the link 3030, and Downstream Ports 4964 to 4967 connected to the links 3084B to 3087B. The Upstream Port 4922 is connected to a P2P Bridge 4941, and the Downstream Ports 4964 to 4967 are respectively connected to P2P Bridges 4954 to 4957. The P2P Bridges 4941, 4943 and 4954 to 4957 are connected to an internal bus 4942.

An NTB 4711 includes two Endpoints 4944 and 4945. The Endpoint 4944 is connected to the P2P Bridge 4943, and is set to be accessed from the processor 3023 via the link 3030. The Endpoint 4945 is connected to the Upstream Port 4913, and is set to be accessed from the processor 3003 via a link 4713, a virtual switch 4763, and the link 3011. The Endpoints 4944 and 4945 are set and connected to each other such that a PCIe packet of which a destination is within a predetermined address range can pass in a bidirectional manner.

The virtual switch 4763 is configured to include an Upstream Port 4912 connected to the link 3011, and Downstream Ports 4960 to 4963 connected to the links 3080B to 3083B. The Upstream Port 4912 is connected to a P2P Bridge 4931, and the Downstream Ports 4960 to 4963 are respectively connected to P2P Bridges 4950 to 4953. The P2P Bridges 4931, 4933, and 4950 to 4953 are connected to an internal bus 4932.

An NTB 4712 includes two Endpoints 4934 and 4935. The Endpoint 4934 is connected to the P2P Bridge 4933, and is set to be accessed from the processor 3003 via the link 3011. The Endpoint 4935 is connected to the Upstream Port 4903, and is set to be accessed from the processor 3023 via the link 4713, the virtual switch 4762, and the link 3030. The Endpoints 4934 and 4935 are set and connected to each other such that a PCIe packet of which a destination is within a predetermined address range can pass in a bidirectional manner.

Figure 50:
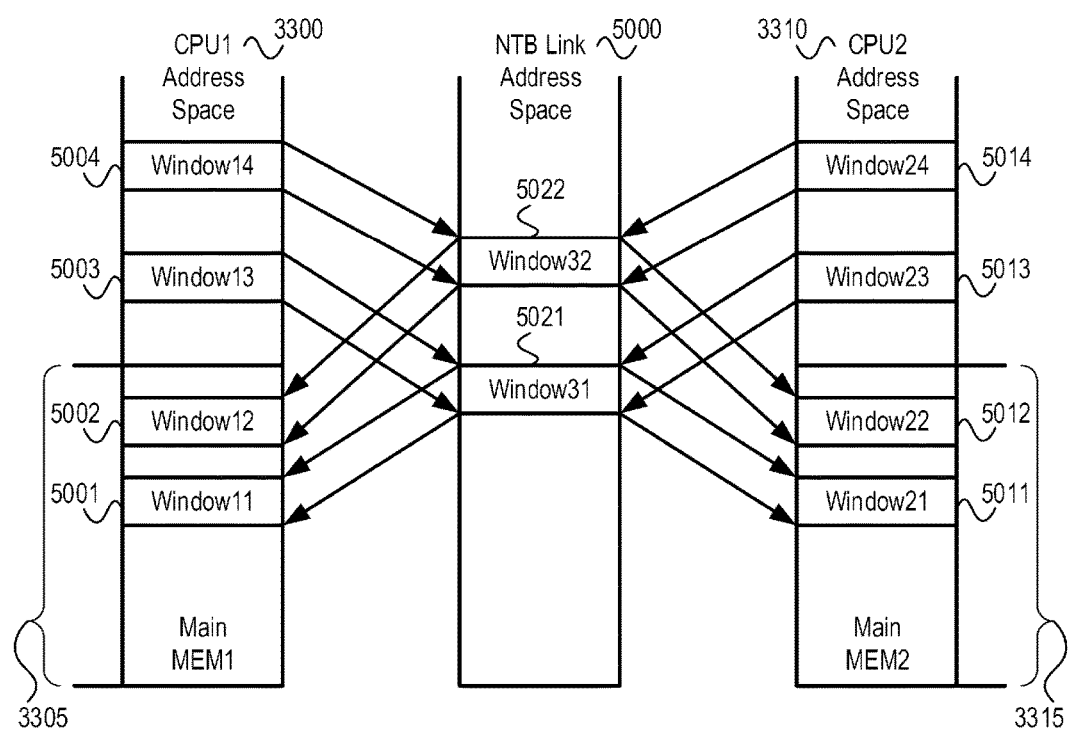
FIG. 50 is a diagram illustrating another example of an address translation operation of the NTB.

With reference to FIG. 50, a description will be made of an address translation operation in the NTBs 4701 and 4702 or NTBs 4711 and 4712. In FIG. 50, the address space 3300 of the processor 3003 includes the main memory space 3305 of the processor 3003, a window 5003 for accessing the Endpoint 4834 in the NTB 4701, and a window 5004 for accessing the Endpoint 4934 in the NTB 4712.

The address space 3310 of the processor 3023 includes the main memory space 3315 of the processor 3023, a window 5013 for accessing the Endpoint 4944 in the NTB 4711, and a window 5014 for accessing the Endpoint 4844 in the NTB 4702. The main memory space 3305 includes windows 5001 and 5002. The main memory space 3315 includes windows 5011 and 5012.

The storage devices 3090 to 3097 are mapped to be able to access a space (not illustrated) other than the main memory space 3305 and the windows 5003 and 5004 of the address space 3300 from the processor 3003. The processor 3003 can access the storage devices 3090 to 3097 without using the NTBs 4701 and 4712, that is, without address translation.

Similarly, the storage devices 3090 to 3097 are mapped to be able to access a space other than the main memory space 3315 and the windows 5013 and 5014 of the address space 3310 from the processor 3023. The processor 3023 can access the storage devices 3090 to 3097 without using the NTBs 4711 and 4702, that is, without address translation.

An address space 5000 is an address space used for a PCIe packet to pass along the link 4703 or 4713, and includes windows 5021 and 5022. A description will be made of an address translation operation in the NTBs 4701 and 4702 in a case where the storage controller 3001 transfers data to the memory 3022 of the storage controller 3021. Each of the NTBs 4701 and 4702 is an address translation unit, and a combination thereof is also an address translation unit.

The NTB 4701 translates a destination address of a PCIe packet in the window 5003, received by the Endpoint 4834, into an address in the window 5021, and transfers the packet from the Endpoint 4835. The NTB 4702 translates a destination address of a PCIe packet in the window 5021, received by the Endpoint 4845 via the link 4703, into an address in the window 5011, and transfers the packet from the Endpoint 4844.

A description will be made of an address translation operation in the NTBs 4712 and 4711 in a case where the storage controller 3001 transfers data to the memory 3022 of the storage controller 3021. Each of the NTBs 4711 and 4712 is an address translation unit, and a combination thereof is also an address translation unit. The NTB 4712 translates a destination address of a PCIe packet in the window 5004, received by the Endpoint 4934, into an address in the window 5022, and transfers the packet from the Endpoint 4935. The NTB 4711 translates a destination address of a PCIe packet in the window 5022, received by the Endpoint 4945 via the link 4713, into an address in the window 5012, and transfers the packet from the Endpoint 4944.

A description will be made of an address translation operation in the NTBs 4711 and 4712 in a case where the storage controller 3021 transfers data to the memory 3002 of the storage controller 3001. The NTB 4711 translates a destination address of a PCIe packet in the window 5013, received by the Endpoint 4944, into an address in the window 5021, and transfers the packet from the Endpoint 4945. The NTB 4712 translates a destination address of a PCIe packet in the window 5021, received by the Endpoint 4935 via the link 4713, into an address in the window 5001, and transfers the packet from the Endpoint 4934.

A description will be made of an address translation operation in the NTBs 4701 and 4702 in a case where the storage controller 3021 transfers data to the memory 3002 of the storage controller 3001. The NTB 4702 translates a destination address of a PCIe packet in the window 5014, received by the Endpoint 4844, into an address in the window 5022, and transfers the packet from the Endpoint 4845. The NTB 4701 translates a destination address of a PCIe packet in the window 5022, received by the Endpoint 4835 via the link 4703, into an address in the window 5002, and transfers the packet from the Endpoint 4834.

Some or all of the backend switches 4741 and 4761 and the virtual switches 4742, 4743, 4762 and 4763 may be designed as, for example, integrated circuits, so as to be realized in hardware. In this case, the links 4703 and 4713 may be physical interconnections (wiring) connecting the integrated circuits to each other, and may be physical or logical interconnections in the integrated circuits.

Features of the storage system according to Example 16 are summarized as follows. The storage system according to Example 16 includes the two storage controllers 3001 and 3021, and the drive enclosure 4740 in which the storage devices 3090 to 3097 each including two PCIe Ports are installed. The two storage controllers 3001 and 3021 and the drive enclosure 4740 are connected to each other via the links 3010, 3011, 3030 and 3031.

The drive enclosure 4740 includes the backend switch 4741 in which the virtual switches 4742 and 4743 are connected to each other via the NTBs 4701 and 4702 and the link 4703, and the backend switch 4761 in which the virtual switches 4762 and 4763 are connected to each other via the NTBs 4711 and 4712 and the link 4713. In each of the backend switches 4741 and 4761, one of the two Upstream Ports is connected to the storage controller 3001, and the other thereof is connected to the storage controller 3021.

The storage devices 3090 to 3097 are connected to the Downstream Ports 4860 to 4867 or 4960 to 4967 of the two backend switches (4741 and 4761) so as to be accessed from the two storage controllers 3001 and 3021 without using the NTBs 4701 and 4702 and the NTBs 4711 and 4712.

There is a case where two Endpoints forming the NTB cannot be respectively provided in different virtual switches depending on implementation of the NTB. In other words, the NTB cannot be provided to cross the two virtual switches unlike the backend switches 3041 and 3061 of the storage system according to Example 13 illustrated in FIGS. 31 and 32.

Instead, the storage system according to Example 16 includes a separate NTB in each virtual switch. The NTBs provided in the respective virtual switches are connected to each other via a link, and thus it is possible to realize a function equivalent to that of the backend switch of the storage system according to Example 13. According to the storage system according to Example 16, even in a case where a PCIe switch in which an NTB cannot be provided to cross virtual switches is applied to a backend switch, it is possible to implement the storage system with high availability in the same manner as the storage system according to Examples 13 to 15.

Example 17

Figure 51:
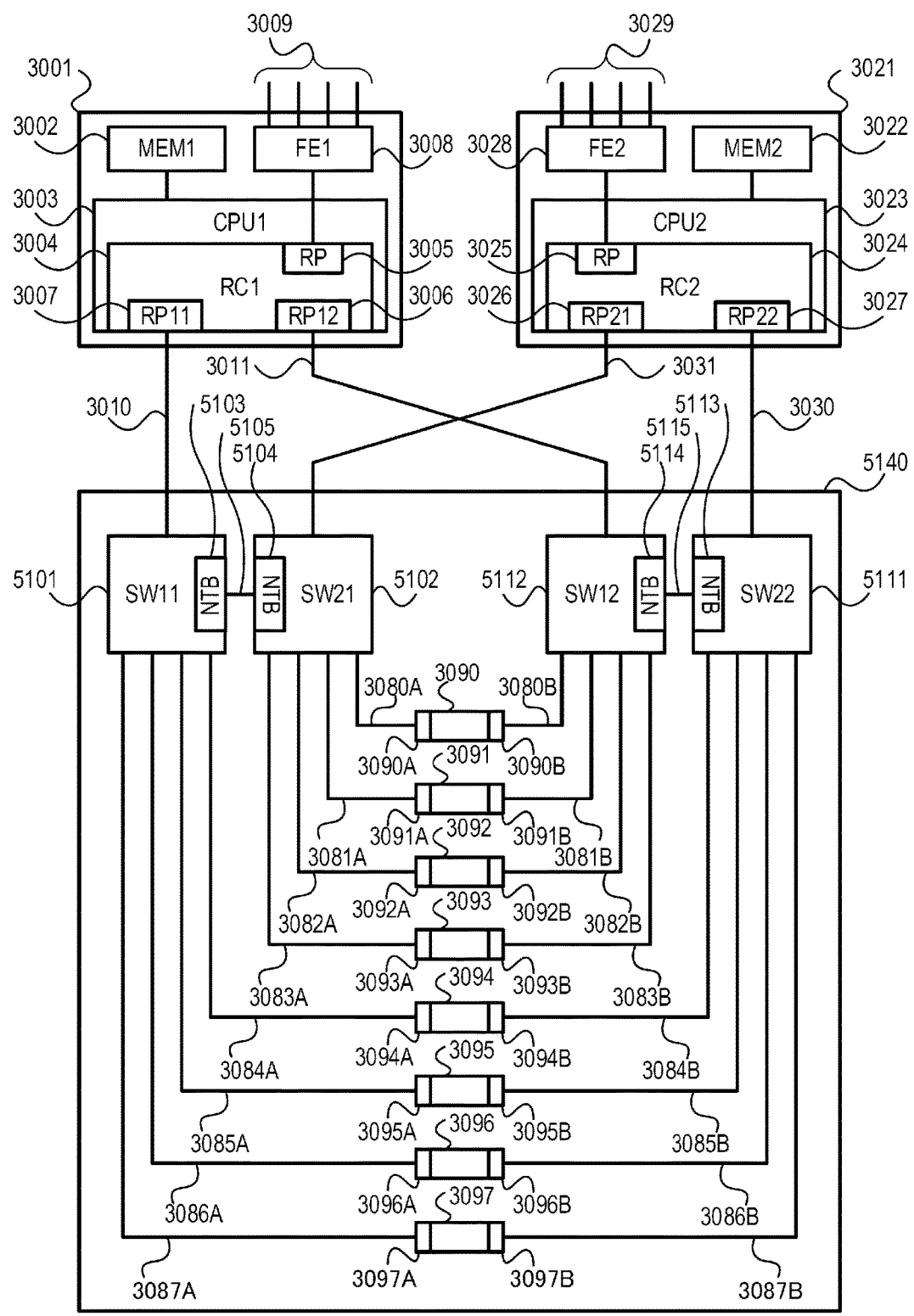
FIG. 51 illustrates still another configuration example of the storage system.

Example 17 will be described with reference to FIGS. 51 to 53. FIG. 51 illustrates a configuration example of a configuration of a storage system according to Example 17. The storage system according to Example 17 is different the storage system according to Example 16 in terms of a configuration of the backend switch.

In FIG. 51, the storage system according to Example 17 includes two storage controllers 3001 and 3021, and a drive enclosure 5140. The drive enclosure 5140 includes PCIe switches 5101, 5102, 5111 and 5112 instead of the backend switches 4741 and 4761 in FIG. 47. Other configurations and operations of the storage system according to Example 17 are the same as those of the storage system according to Example 16.

Figure 52:
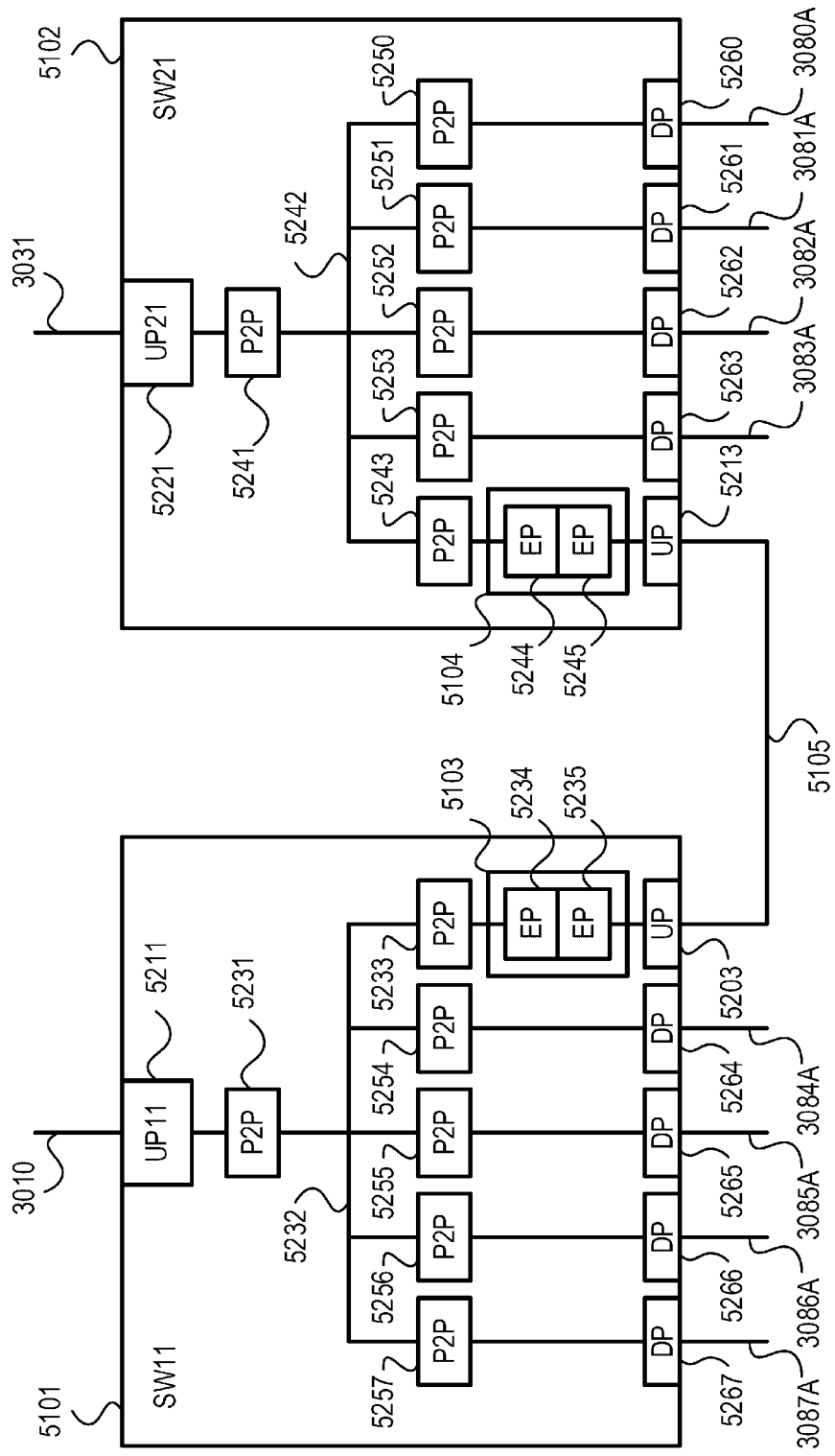
FIG. 52 illustrates still another configuration example of the backend switch.

FIG. 52 illustrates internal configuration examples of the PCIe switches 5101 and 5102. The PCIe switch 5101 is configured to include an Upstream Port 5211 connected to the link 3010, and Downstream Ports 5264 to 5267 connected to the links 3084A to 3087A. The Upstream Port 5211 is connected to a P2P Bridge 5231, and the Downstream Ports 5264 to 5267 are respectively connected to P2P Bridges 5254 to 5257. The P2P Bridges 5231, 5233 and 5254 to 5257 are connected to an internal bus 5232.

An NTB 5103 includes two Endpoints 5234 and 5235. The Endpoint 5234 is connected to the P2P Bridge 5233, and is set to be accessed from the processor 3003 via the link 3010. The Endpoint 5235 is connected to the Upstream Port 5203, and is set to be accessed from the processor 3023 via a link 5105, the PCIe switch 5102, and the link 3031. The Endpoints 5234 and 5235 are set and connected to each other such that a PCIe packet of which a destination is within a predetermined address range can pass in a bidirectional manner.

The PCIe switch 5102 is configured to include an Upstream Port 5221 connected to the link 3031, and Downstream Ports 5260 to 5263 connected to the links 3080A to 3083A. The Upstream Port 5221 is connected to a P2P Bridge 5241, and the Downstream Ports 5260 to 5263 are respectively connected to P2P Bridges 5250 to 5253. The P2P Bridges 5241, 5243, and 5250 to 5253 are connected to an internal bus 5242.

An NTB 5104 includes two Endpoints 5244 and 5245. The Endpoint 5244 is connected to the P2P Bridge 5243, and is set to be accessed from the processor 3023 via the link 3031. The Endpoint 5245 is connected to the Upstream Port 5213, and is set to be accessed from the processor 3003 via the link 5105, the PCIe switch 5101, and the link 3010. The Endpoints 5244 and 5245 are set and connected to each other such that a PCIe packet of which a destination is within a predetermined address range can pass in a bidirectional manner.

Figure 53:
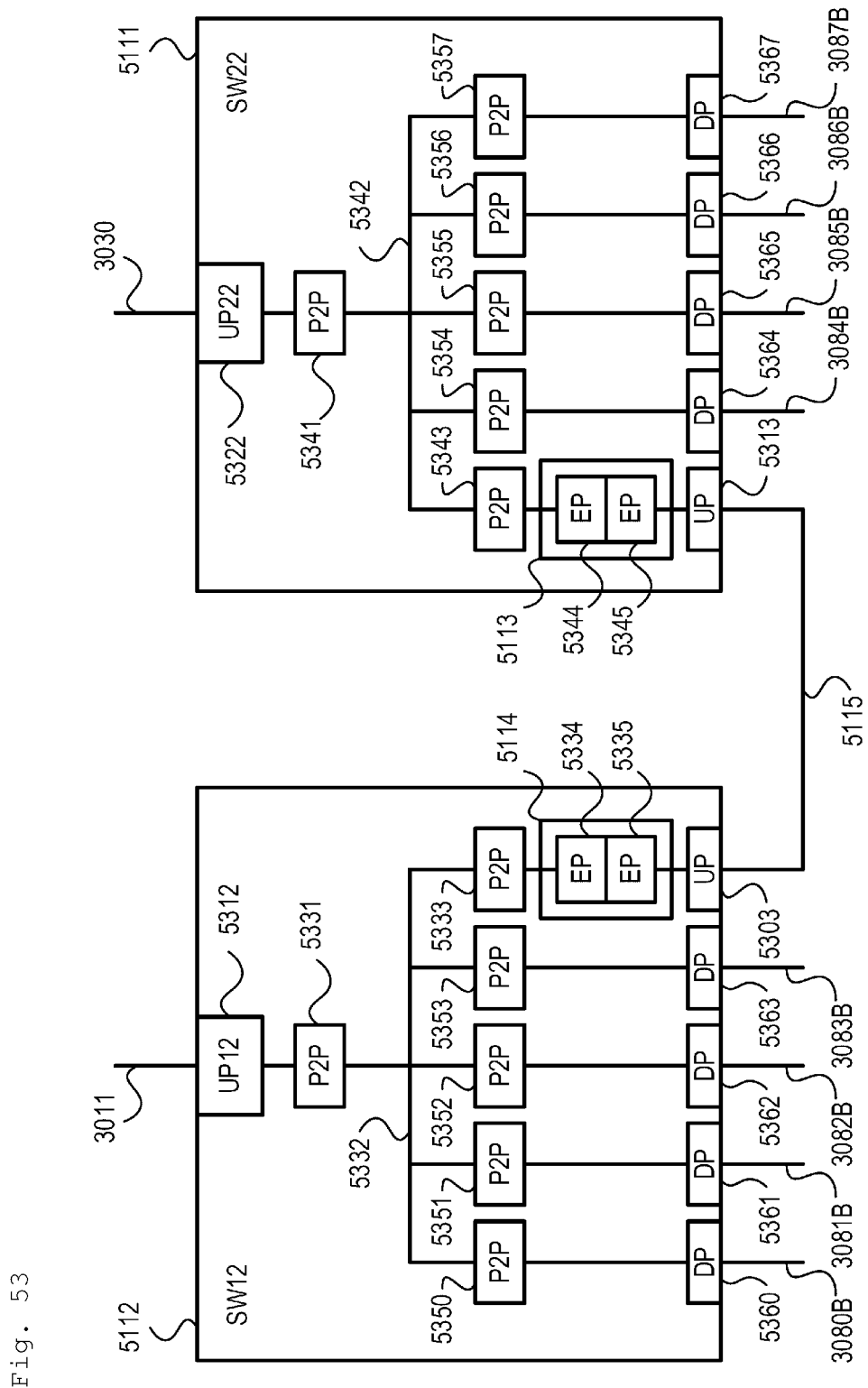
FIG. 53 illustrates still another configuration example of the backend switch.

FIG. 53 illustrates internal configuration examples of the PCIe switches 5111 and 5112. The PCIe switch 5111 is configured to include an Upstream Port 5322 connected to the link 3030, and Downstream Ports 5364 to 5367 connected to the links 3084B to 3087B. The Upstream Port 5322 is connected to a P2P Bridge 5341, and the Downstream Ports 5364 to 5367 are respectively connected to P2P Bridges 5354 to 5357. The P2P Bridges 5341, 5343 and 5354 to 5357 are connected to an internal bus 5342.

An NTB 5113 includes two Endpoints 5344 and 5345. The Endpoint 5344 is connected to the P2P Bridge 5343, and is set to be accessed from the processor 3023 via the link 3030. The Endpoint 5345 is connected to the Upstream Port 5313, and is set to be accessed from the processor 3003 via a link 5115, a PCIe switch 5112, and the link 3011. The Endpoints 5344 and 5345 are set and connected to each other such that a PCIe packet of which a destination is within a predetermined address range can pass in a bidirectional manner.

The PCIe switch 5112 is configured to include an Upstream Port 5312 connected to the link 3011, and Downstream Ports 5360 to 5363 connected to the links 3080B to 3083B. The Upstream Port 5312 is connected to a P2P Bridge 5331, and the Downstream Ports 5360 to 5363 are respectively connected to P2P Bridges 5350 to 5353. The P2P Bridges 5331, 5333, and 5350 to 5353 are connected to an internal bus 5332.

An NTB 5114 includes two Endpoints 5334 and 5335. The Endpoint 5334 is connected to the P2P Bridge 5333, and is set to be accessed from the processor 3003 via the link 3011. The Endpoint 5335 is connected to the Upstream Port 5303, and is set to be accessed from the processor 3023 via the link 5115, the PCIe switch 5111, and the link 3030. The Endpoints 5334 and 5335 are set and connected to each other such that a PCIe packet of which a destination is within a predetermined address range can pass in a bidirectional manner.

Features of the storage system according to Example 17 are summarized as follows. The storage system according to Example 17 includes the two storage controllers 3001 and 3021, and the drive enclosure 5140 in which the storage devices 3090 to 3097 each including two PCIe Ports are installed. The two storage controllers 3001 and 3021 and the drive enclosure 5140 are connected to each other via the links 3010, 3011, 3030 and 3031.

The drive enclosure 5140 includes the PCIe switches 5101, 5102, 5111 and 5112. The PCIe switches 5101 and 5102 are connected to each other via the NTBs 5103 and 5104 and the link 5105. Each of the NTBs 5103 and 5104 is an address translation unit, and a combination thereof is also an address translation unit.

The PCIe switches 5111 and 5112 are connected to each other via the NTBs 5113 and 5114 and the link 5115. In the PCIe switches 5101 and 5102, one of the two Upstream Ports is connected to the storage controller 3001, and the other thereof is connected to the storage controller 3021. Each of the NTBs 5113 and 5114 is an address translation unit, and a combination thereof is also an address translation unit.

In the PCIe switches 5101 and 5102, or the PCIe switches 5111 and 5112, one of the two Upstream Ports is connected to the storage controller 3001, and the other thereof is connected to the storage controller 3021. The storage devices 3090 to 3097 are connected to any of the Downstream Ports of the four PCIe switches so as to be accessed from the two storage controllers 3001 and 3021 without using the NTBs 5101 and 5102 and the NTBs 5111 and 5112.

According to the storage system according to Example 17, even in a case where the PCIe switch not having a virtual switch capability is applied to a backend switch, it is possible to implement the storage system with high availability in the same manner as the storage system according to Examples 13 to 16.

Example 18

Figure 54:
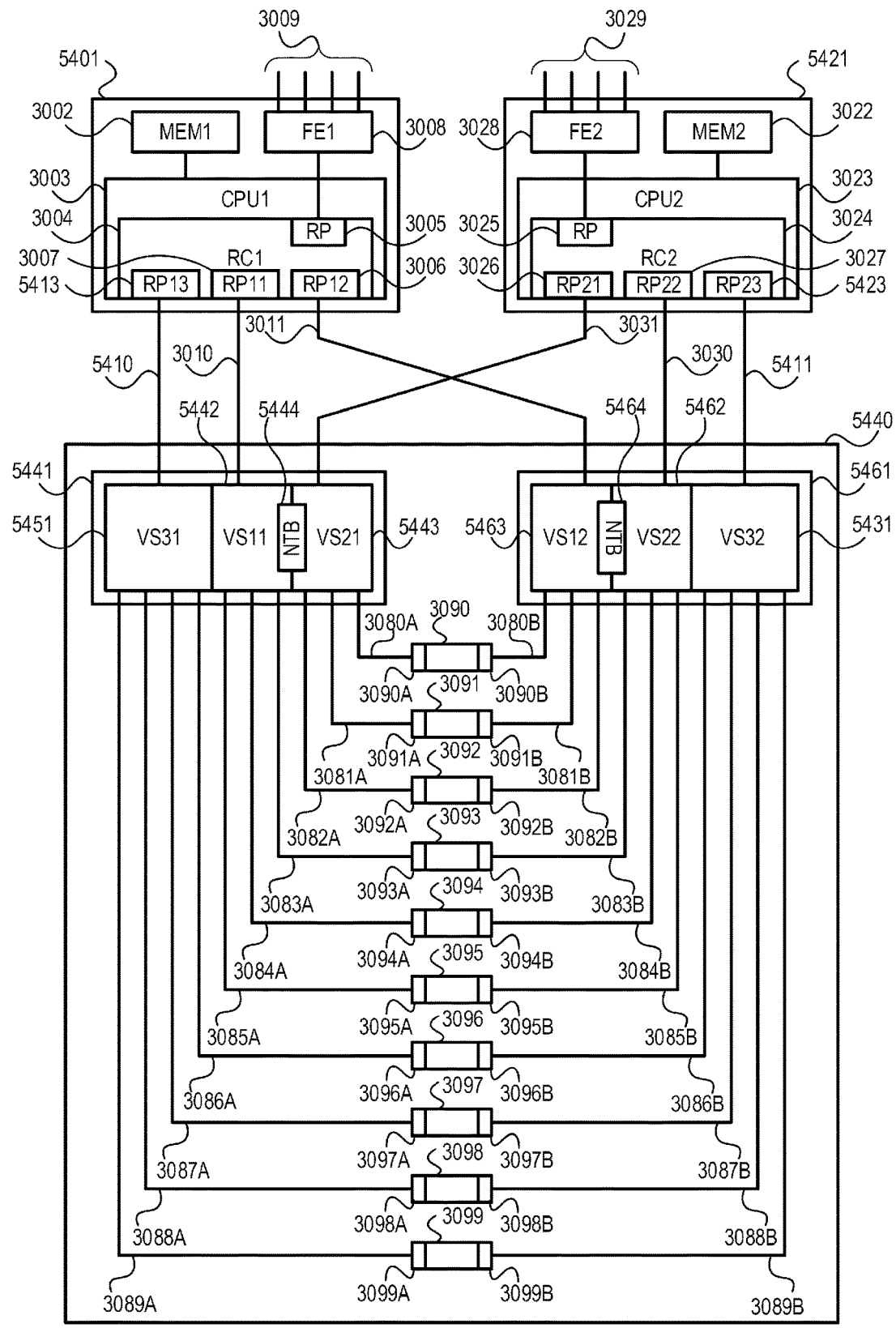
FIG. 54 illustrates still another configuration example of the storage system.

Example 18 will be described with reference to FIGS. 54 to 56. FIG. 54 illustrates a configuration example of a configuration of a storage system according to Example 18. The storage system according to Example 18 is different the storage systems according to Examples 13 to 17 in terms of configuration of backend switches 5441 and 5461, connection between storage controllers 5401 and 5421 and a drive enclosure 5440, and connection between the backend switches 5441 and 5461 and storage devices 3090 to 3099. FIG. 54 illustrates ten storage devices 3090 to 3099, but any number of storage devices may be used.

Figure 55:
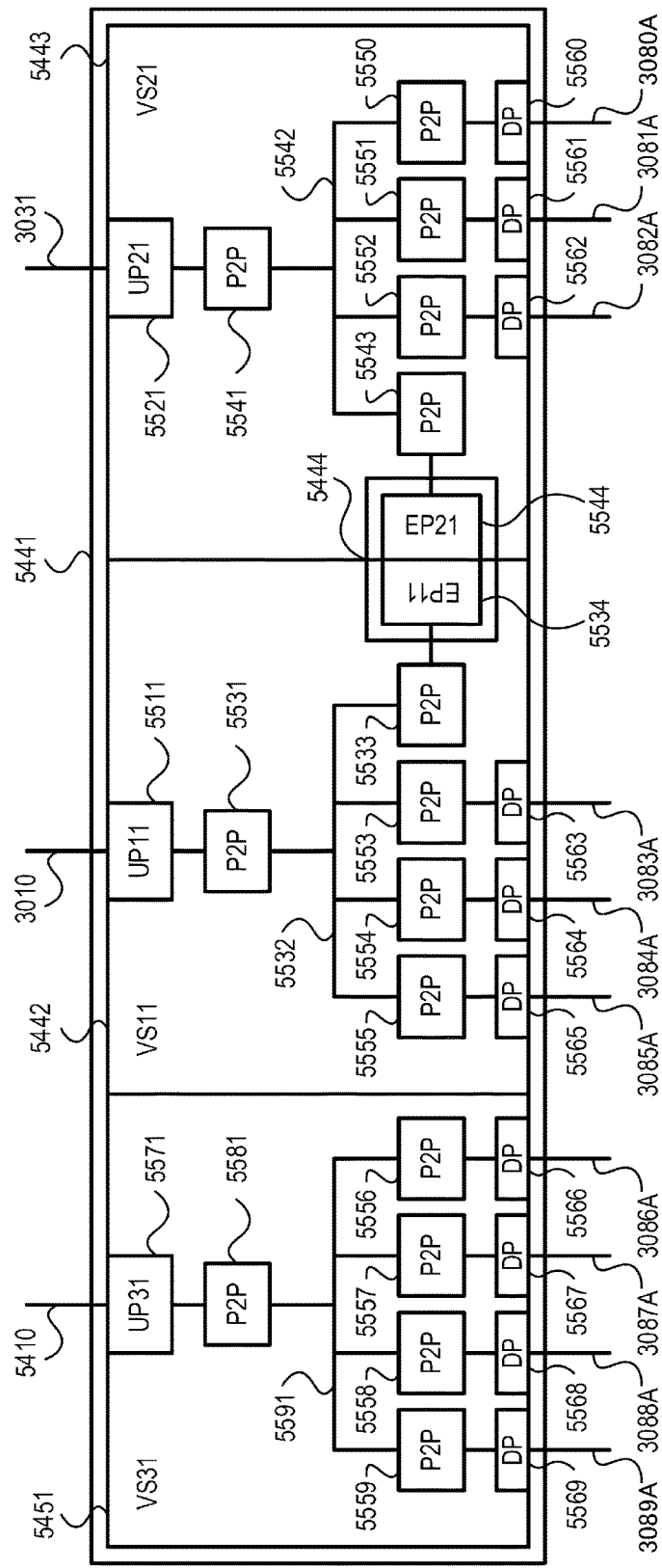
FIG. 55 illustrates still another configuration example of the backend switch.

FIG. 55 illustrates an internal configuration example of the backend switch 5441. A virtual switch 5442 is configured to include an Upstream Port 5511 connected to the link 3010, and Downstream Ports 5563 to 5565 connected to the links 3083A to 3085A. The Upstream Port 5511 is connected to a P2P Bridge 5531, and the Downstream Ports 5563 to 5565 are respectively connected to P2P Bridges 5553 to 5555. The P2P Bridges 5531, 5533 and 5553 to 5555 are connected to an internal bus 5532.

A virtual switch 5443 is configured to include an Upstream Port 5521 connected to the link 3031, and Downstream Ports 5560 to 5562 connected to the links 3080A to 3082A. The Upstream Port 5521 is connected to a P2P Bridge 5541, and the Downstream Ports 5560 to 5562 are respectively connected to P2P Bridges 5550 to 5552. The P2P Bridges 5541, 5543, and 5550 to 5552 are connected to an internal bus 5542.

An NTB 5444 includes two Endpoints 5534 and 5544. The Endpoint 5534 is connected to the P2P Bridge 5533, and is set to be accessed from the processor 3003 via the link 3010. The Endpoint 5544 is connected to the P2P Bridge 5543, and is set to be accessed from the processor 3023 via the link 3031. The Endpoints 5534 and 5544 are set and connected to each other such that a PCIe packet of which a destination is within a predetermined address range can pass in a bidirectional manner.

A virtual switch 5451 is configured to include an Upstream Port 5571 connected to a Root Port 5413 of the processor 3003 via a link 5410, and Downstream Ports 5566 to 5569 connected to the links 3086A to 3089A. The Upstream Port 5571 is connected to a P2P Bridge 5581, and the Downstream Ports 5566 to 5569 are respectively connected to P2P Bridges 5556 to 5559. The P2P Bridges 5581, and 5556 to 5559 are connected to an internal bus 5591.

Figure 56:
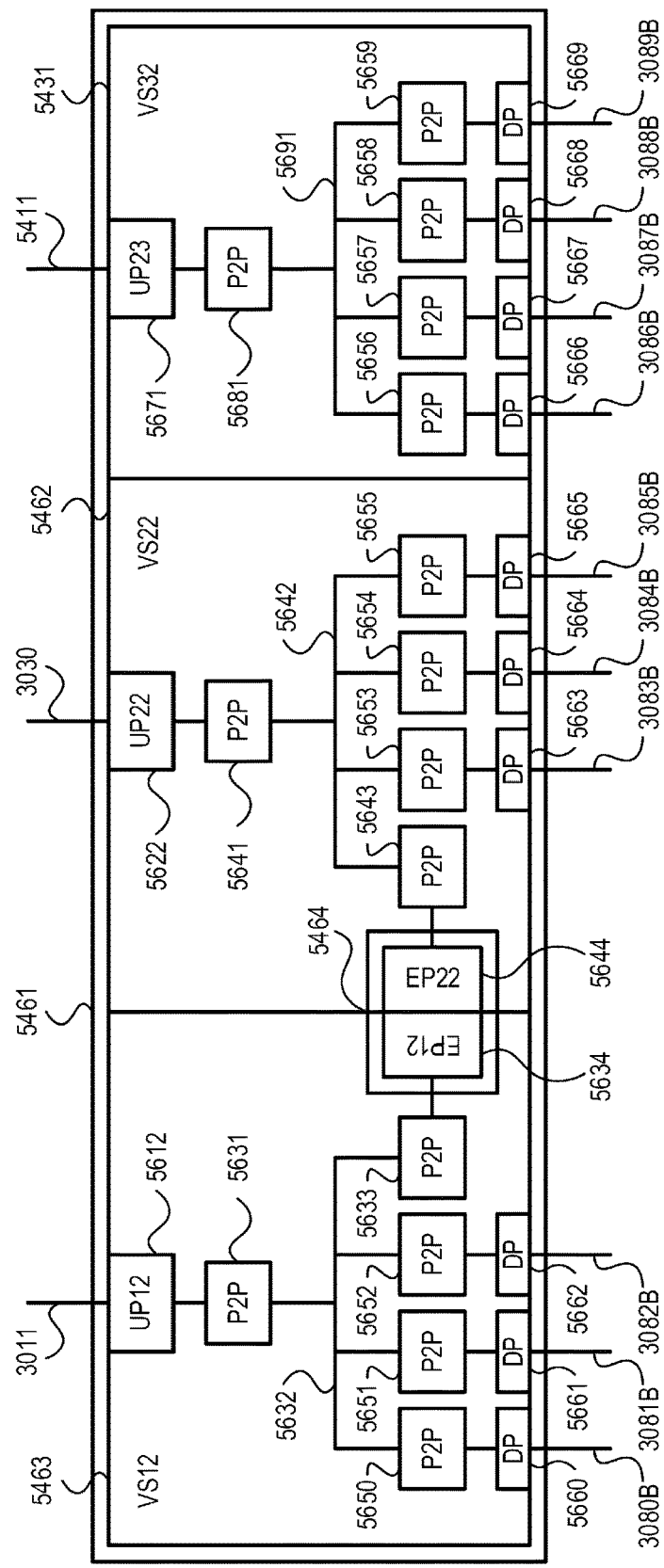
FIG. 56 illustrates still another configuration example of the backend switch.

FIG. 56 illustrates an internal configuration example of the backend switch 5461. A virtual switch 5462 is configured to include an Upstream Port 5622 connected to the link 3030, and Downstream Ports 5663 to 5665 connected to the links 3083B to 3085B. The Upstream Port 5622 is connected to a P2P Bridge 5641, and the Downstream Ports 5663 to 5665 are respectively connected to P2P Bridges 5653 to 5655. The P2P Bridges 5641, 5643 and 5653 to 5655 are connected to an internal bus 5642.

A virtual switch 5463 is configured to include an Upstream Port 5612 connected to the link 3011, and Downstream Ports 5660 to 5662 connected to the links 3080B to 3082B. The Upstream Port 5612 is connected to a P2P Bridge 5631, and the Downstream Ports 5660 to 5662 are respectively connected to P2P Bridges 5650 to 5652. The P2P Bridges 5631, 5633, and 5650 to 5652 are connected to an internal bus 5632.

An NTB 5464 includes two Endpoints 5634 and 5644. The Endpoint 5634 is connected to the P2P Bridge 5633, and is set to be accessed from the processor 3003 via the link 3011. The Endpoint 5644 is connected to the P2P Bridge 5643, and is set to be accessed from the processor 3023 via the link 3030. The Endpoints 5634 and 5644 are set and connected to each other such that a PCIe packet of which a destination is within a predetermined address range can pass in a bidirectional manner.

A virtual switch 5431 is configured to include an Upstream Port 5671 connected to a Root Port 5423 of the processor 3023 via a link 5411, and Downstream Ports 5666 to 5669 connected to the links 3086B to 3089B. The Upstream Port 5671 is connected to a P2P Bridge 5681, and the Downstream Ports 5666 to 5669 are respectively connected to P2P Bridges 5656 to 5659. The P2P Bridges 5681, and 5656 to 5659 are connected to an internal bus 5691.

Features of the storage system according to Example 18 are summarized as follows. The storage system according to Example 18 includes the two storage controllers 5401 and 5421, and the drive enclosure 5440 in which the storage devices 3090 to 3099 each including two PCIe Ports are installed.

The two storage controllers 5401 and 5421 and the drive enclosure 5440 are connected to each other via the links 3010, 3011, 3030, 3031, 5410 and 5411. The drive enclosure 5440 includes the backend switch 5441 in which the virtual switches 5442 and 5443 are connected to each other via the NTB 5444, and the backend switch 5461 in which the virtual switches 5462 and 5463 are connected to each other via the NTB 5464.

In each of the backend switches 5441 and 5461, one of the two Upstream Ports is connected to the storage controller 5401, and the other thereof is connected to the storage controller 5421. The backend switch 5441 includes the virtual switch 5451 in which the Upstream Port is connected to the storage controller 5401.

The backend switch 5461 includes the virtual switch 5431 in which the Upstream Port is connected to the storage controller 5421. The storage devices 3090 to 3099 are connected to the Downstream Ports of the two backend switches so as to be accessed from the two storage controllers 5401 and 5421 without using the NTBs 5444 and 5464.

In the storage system according to each of Examples 13 to 17, data transfer between the storage controller and the storage device and data transfer between the two storage controllers are performed by sharing a bandwidth of the link between the storage controller and the backend switch. In a case where a plurality of storage devices are simultaneously accessed, there is concern that the bandwidth of the link may cause a bottleneck in performance.

In the storage system according to Example 18, the virtual switch which is independent from the data transfer path between the storage controllers is provided in the backend switch. Since the storage controller is connected to the storage device via the virtual switch, in the storage system according to Example 18, more storage devices can be connected, and the shared link bandwidth can be reduced.

Example 19

Figure 57:
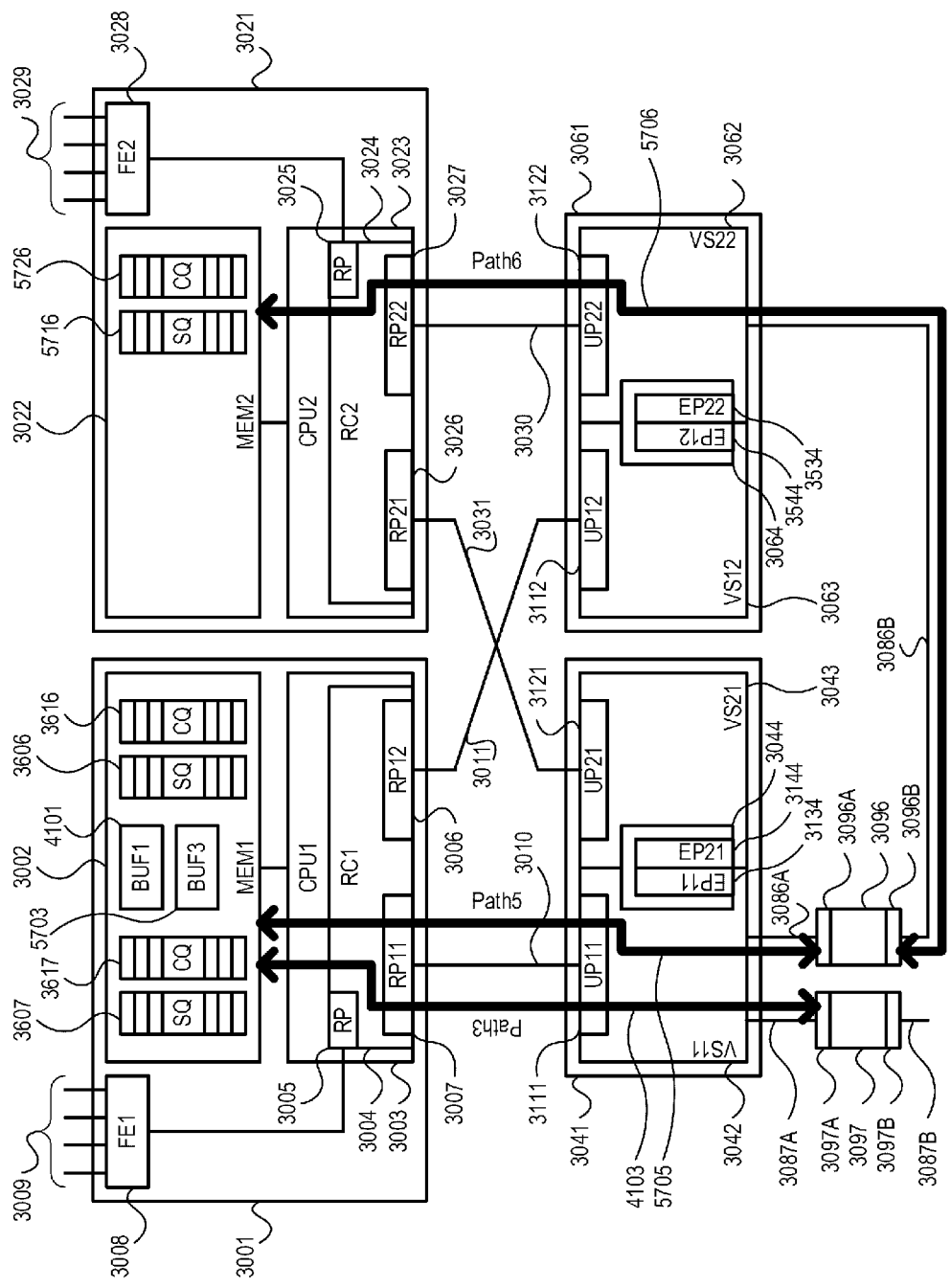
FIG. 57 is a diagram illustrating still another example of a data read path from the storage device.
Figure 58:
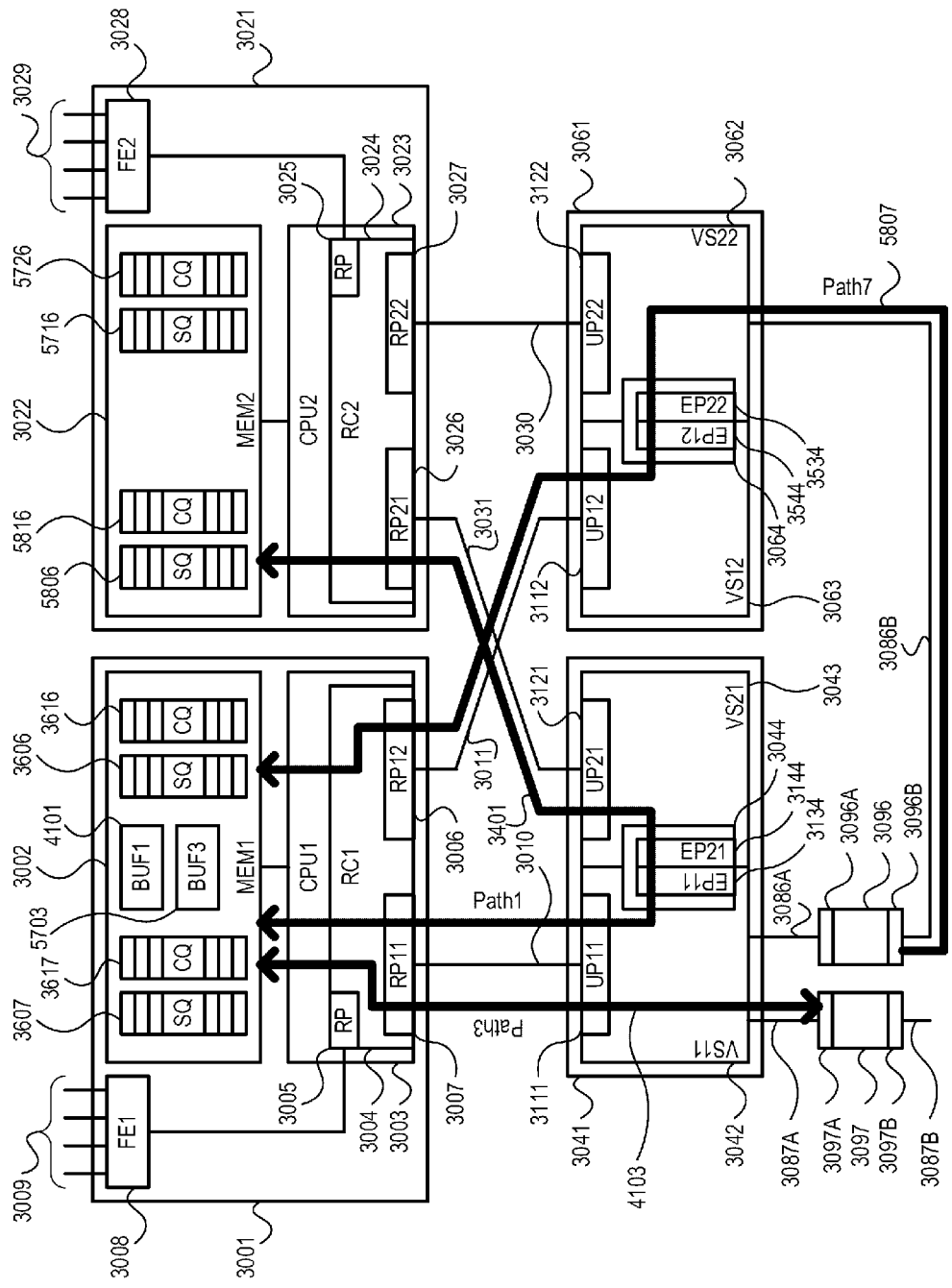
FIG. 58 is a diagram illustrating still another example of a data read path from the storage device.
Figure 59:
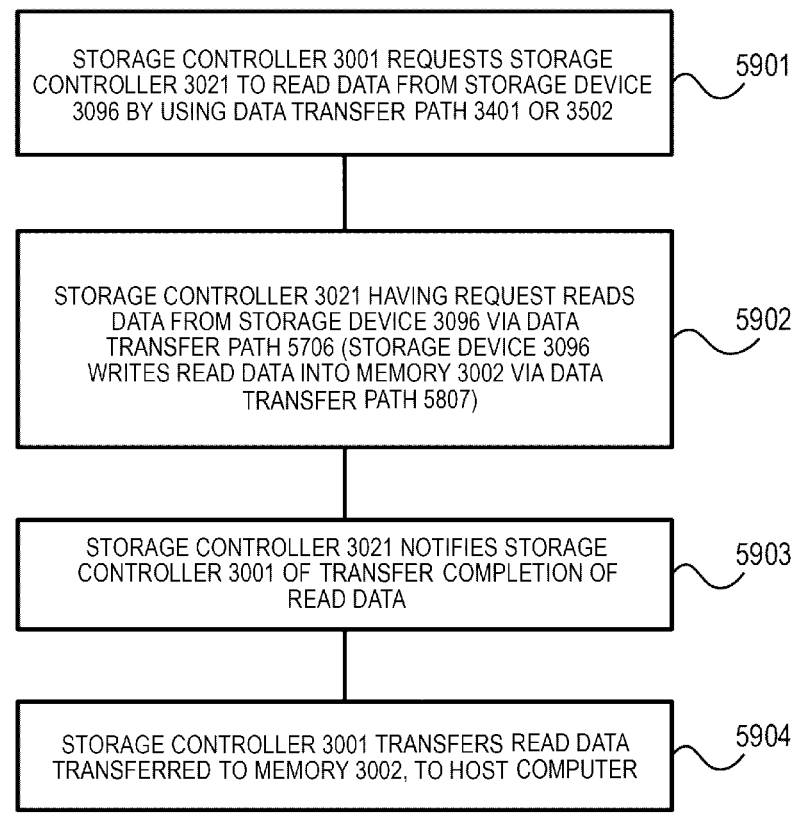
FIG. 59 is a flowchart illustrating examples of procedures of reading data from the storage device during a load balancing operation.

With reference to FIGS. 57 to 59, a storage system according to Example 19 will be described. A configuration of the storage system according to Example 19 is the same as that of the storage system according to Example 13.

Reading and writing for storage devices included in the same PCIe tree, that is, the same port group (refer to FIG. 37) are performed by sharing a link bandwidth between the storage controller and the backend switch. In a case where ports of a plurality of storage devices included in the same port group are accessed in a concentration manner, the link bandwidth between the storage controller and the backend switch may cause a bottleneck in the performance of the storage system.

In the storage system according to Example 19, reading and writing for ports of a plurality of storage devices included in a single port group are performed by using a plurality of links between the storage controller and the backend switch. In other words, a load balance is made to a plurality of links. The storage controller monitors a usage bandwidth of each link between the storage controller and the backend switch. For example, the storage controller may compare a usage bandwidth value of each link with a predefined value, so as to determine insufficiency of a bandwidth of each link. Another storage controller may share information regarding a usage bandwidth of a link.

With reference to FIG. 57, a description will be made of an example of a data transfer path in reading for the storage device in a case where load balance is not performed in the storage system according to Example 19. Hereinafter, reading for the storage device will be described, but this is also the same for writing.

The storage controller 3001 includes the Submission Queues 3607 and the Completion Queues 3617 for controlling the storage device 3097 in the memory 3002. The storage controller 3001 performed data transfer between the storage device 3097 and the memory 3002 by using the data transfer path 4103. The data transfer path 4103 reaches the port 3097A of the storage device 3097 through the Root Port 3007 of the processor 3003, the link 3010, the virtual switch 3042, and the link 3087A. The storage controller 3001 stores the data read from the storage device 3097 in a buffer 4101 of the memory 3002.

The storage controller 3001 includes Submission Queues 3606 and Completion Queues 3616 for controlling the storage device 3096 in the memory 3002. The storage controller 3001 performed data transfer between the storage device 3096 and the memory 3002 by using a data transfer path 5705. The data transfer path 5705 reaches the port 3096A of the storage device 3096 through the Root Port 3007 of the processor 3003, the link 3010, the virtual switch 3042, and the link 3086A. The storage controller 3001 stores data read from the storage device 3096 in a buffer 5703 of the memory 3002.

The same applies to read data transfer paths from ports of other storage devices included in the port group Gr11 (refer to FIG. 37). Reading for the ports of the storage devices included in the port group Gr11 is performed by sharing a bandwidth of the link 3010.

The storage controller 3021 includes Submission Queues 5716 and Completion Queues 5726 for controlling the storage device 3096 in the memory 3022. The storage controller 3021 performed data transfer between the storage device 3096 and the memory 3022 by using a data transfer path 5706. The data transfer path 5706 reaches the port 3096B of the storage device 3096 through the Root Port 3027 of the processor 3023, the link 3030, the virtual switch 3062, and the link 3086B.

The same applies to read data transfer paths from ports of other storage devices included in the port group Gr22 (refer to FIG. 37). Reading for the ports of the storage devices included in the port group Gr22 is performed by sharing a bandwidth of the link 3030.

Similarly, reading for the ports of the storage devices included in the port group Gr12 is performed by sharing a band of the link 3011. Reading for the ports of the storage devices included in the port group Gr21 is performed by sharing a bandwidth of the link 3031.

With reference to FIG. 58, a description will be made of a load balance operation in the storage system according to Example 19. A state is assumed in which reading for the ports of a plurality of storage devices included in the port group Gr11 is simultaneously performed, and thus the bandwidth of the link 3010 is insufficient. In contrast, it is assumed that reading and writing for the ports of a plurality of storage devices included in the port group Gr12 are scarcely performed, and thus there is a margin in the bandwidth of the link 3011.

In a case where the bandwidth of the link 3010 is insufficient, the storage controller 3001 performs reading for some of the storage devices included in the port group Gr11 by using the link 3011. As an example, a description will be made of an operation of the storage system according to Example 19 in a case where reading performed for the port 3096A of the storage device 3096 by using the link 3010 is performed for the port 3096B by using the link 3011.

The storage controller 3021 includes Submission Queues 5806 and Completion Queues 5816 for controlling the storage device 3096 in the memory 3022. The Submission Queues 5806 and the Completion Queues 5816 are queues used for an alternative process requested from the storage controller 3001.

The storage device 3096 transfers data read as a result of executing a command included in an Entry in the Submission Queues 5806, by using a data transfer path 5807. The data transfer path 5807 passes through the link 3086B, the virtual switch 3062, the NTB 3064, the virtual switch 3063, the link 3011, and the Root Port 3006 of the processor 3003.

With reference to FIG. 59, a description will be made of a flowchart illustrating reading for a storage device during a load balance operation. In step 5901, the storage controller 3001 requests the storage controller 3021 to read data from the storage device 3096, via the data transfer path 3401 or the data transfer path 3502.

In step 5902, the storage controller 3021 having received the request reads data from the storage device 3096 via the data transfer path 5706. Specifically, the processor 3023 enqueues an Entry including a read command for the storage device 3096 to the Submission Queues 5806. A destination of read data is set to be the buffer 5703 of the memory 3002.

The storage device 3096 which fetches the read command from the Submission Queues 5806 transfers the requested data to the buffer 5703 via the data transfer path 5807. After transfer of the data to the buffer 5703 is completed, the storage device 3096 enqueues a Completion to the Completion Queues 5816.

The processor 3003 may directly enqueue an Entry including a read command for the storage device 3096 to the Submission Queues 5806 via the data transfer path 3401 or the data transfer path 3502.

In step 5903, the storage controller 3021 having checked the Completion notifies the storage controller 3001 of transfer completion of the read data. In step 5904, the storage controller 3001 transfers the read data transferred to the buffer 5703 of the memory 3002, to the host computer.

As described above, the storage system according to Example 19 can balance loads of reading and writing for ports of a plurality of storage devices included in the same port group to a plurality of links between the storage controller and the backend switch.

The present invention is not limited to the above Examples, and includes a plurality of modification examples. The above Examples have been described in detail for better understanding of the present invention, and thus are not necessarily limited to including all of the above-described configurations. Some configurations of a certain Example may be replaced with some configurations of another Example, and some configurations or all configurations of another Example may be added to configurations of a certain Example. The configurations of other Examples may be added to, deleted from, and replaced with some of the configurations of each Example.

Some or all of the above-described respective configurations, functions, processing units, and the like may be designed as, for example, integrated circuits so as to be realized in hardware. The above-described respective configurations and functions may be realized in software by a processor interpreting and executing a program for realizing each function. Information regarding a program, a table, a file, and the like for realizing each function may be stored in a recording device such as a memory, a hard disk, or a solid state drive (SSD), or a recording medium such as an IC card or an SD card.

A control line or an information line which is necessary for description is illustrated, and all control lines or information lines on a product may not necessarily be illustrated. It may be considered that almost all of the configurations are connected to each other.

The invention claimed is:

1. A storage system comprising:
a first storage controller that includes a first processor and a first memory;
a second storage controller that includes a second processor and a second memory;
one or more storage devices; and
one or more backend switches that connect the first processor, the second processor, and the one or more storage devices to each other,
wherein each of the one or more backend switches:
receives a data transfer command including a fourth address for specifying a first location on the first memory in an address space of the first processor, a fifth address for specifying a second location on the second memory in the address space of the first processor, and a length of data to be transferred, from the first processor,
translates the fifth address into a sixth address for specifying the second location on the second memory in an address space of the second processor, and
transfers first data with the data length between the first location on the first memory and the second location on the second memory,
wherein the data transfer command further includes a designation regarding whether a data transfer direction is a direction from the first memory to the second memory or a direction from the second memory to the first memory, and
wherein, in a case where the data transfer direction is designated as the direction from the first memory to the second memory, a respective backend switch reads the first data from the first location on the first memory, and stores the first data in the second location on the second memory, and
wherein, in a case where the data transfer direction is designated as the direction from the second memory to the first memory, a respective backend switch reads the first data from the second location on the second memory, and stores the first data in the first location on the first memory.

2. The storage system according to claim 1,
wherein, in a case where the data transfer direction is designated as the direction from the first memory to the second memory, the respective backend switch notifies the second processor that the first data has been stored in the second location on the second memory, and
wherein, in a case where the data transfer direction is designated as the direction from the second memory to the first memory, the respective backend switch notifies the first processor that the first data has been stored in the first location on the first memory.

3. The storage system according to claim 1,
wherein the data transfer command further includes a data check code,
wherein, in a case where the data transfer direction is designated as the direction from the first memory to the second memory, the respective backend switch
checks whether or not there is an error in the first data read from the first memory according to the data check code,
notifies the first processor of an check result, and stores the first data in the second location on the second memory in a case where the check result shows that there is no error, and wherein, in a case where the data transfer direction is designated as the direction from the second memory to the first memory, the respective backend switch:

checks whether or not there is an error in the first data read from the second memory according to the data check code, notifies the first processor of an examination result, and stores the first data in the first location on the first memory in a case where the check result shows that there is no error.

4. A storage system comprising:

a first storage controller that includes a first processor and a first memory;

a second storage controller that includes a second processor and a second memory;

one or more storage devices; and one or more backend switches that connect the first processor, the second processor, and the one or more storage devices to each other, wherein each of the one or more backend switches:

receives a data transfer command including a fourth address for specifying a first location on the first memory in an address space of the first processor, a fifth address for specifying a second location on the second memory in the address space of the first processor, and a length of data to be transferred, from the first processor, translates the fifth address into a sixth address for specifying the second location on the second memory in an address space of the second processor, transfers first data with the data length between the first location on the first memory and the second location on the second memory, stores the first data read from the first memory in the second memory, and then reads at least part of the first data from the second memory, and notifies the first processor that the at least part of the first data has been read from the second memory.

5. The storage system according to claim 4, wherein the first storage controller receives host data to be written to the one or more storage devices from a host computer, and stores the host data in the first location on the first memory before the host data is written to one or more storage devices as the first data, and wherein the first processor:

transfers the data transfer command to a respective backend switch after the host data is stored in the first location on the first memory, and notifies the host computer that writing of the first data is completed in a case where the respective backend switch notifies the first processor that the whole or part of the first data has been read from the second memory.

6. A storage system comprising:

a first storage controller that includes a first processor and a first memory;

a second storage controller that includes a second processor and a second memory;

one or more storage devices; and one or more backend switches that connect the first processor, the second processor, and the one or more storage devices to each other, wherein each of the one or more backend switches:

identifies a destination of a frame by referring to the frame received from the first processor, translates a first address, included in the frame, for specifying a location on the second memory in an address space of the first processor, into a second address for specifying the location on the second memory in an address space of the second processor, in a case where the destination of the frame is the second processor, transfers the frame including the second address to the second storage controller, and transfers the frame to a first storage device of the one or more storage devices without translating a third address, included in the frame, for specifying the first storage device in the address space of the first processor, in a case where the destination of the frame is the first storage device, wherein the one or more backend switches include:

a first backend switch that is provided with a first switch, a second switch, and a first address translation unit which connects the first switch to the second switch, and a second backend switch that is provided with a third switch, a fourth switch, and a second address translation unit which connects the third switch to the fourth switch, wherein each of the one or more storage devices includes two or more ports, wherein the first storage controller is connected to an upstream port of each of the first switch and the third switch, wherein the second storage controller is connected to an upstream port of each of the second switch and the fourth switch, wherein each of the first address translation unit and the second address translation unit performs address translation between the address space of the first processor and the address space of the second processor, wherein a first port of each of the one or more storage devices is connected to a downstream port of one of the first switch and the second switch, and wherein a second port of each of the one or more storage devices is connected to a downstream port of one of the third switch and the fourth switch.

7. The storage system according to claim 6, wherein, in a case where the frame is used to transfer data from the first storage controller to the second storage controller, the frame includes first data transferred from the first storage controller to the second storage controller, and the first address, and the second processor stores the first data in the location specified by the second address on the second memory.

8. The storage system according to claim 7, wherein a respective backend switch notifies the second processor of transfer of the first data.

9. The storage system according to claim 7, wherein the first storage controller:

receives host data to be written to the one or more storage devices from a host computer, and stores the host data in the first memory before the host data is written to one or more storage devices, and wherein the first processor:

reads the host data from the first memory after the host data is stored in the first memory, generates the frame with the host data as the first data, transfers the frame to a respective backend switch, and transfers, to the respective backend switch, a second frame, including the first address, for requesting at least part of the first data stored in the second memory to be read, wherein the respective backend switch translates the first address included in the second frame into the second address, and transfers the second frame to the second processor, wherein the second processor reads the at least part of the first data stored in the second memory in response to the request in the second frame, and returns the at least part of the first data to the respective backend switch, wherein the respective backend switch returns the at least part of the first data returned by the second processor, to the first processor, and wherein the first processor receives the at least part of the first data from the respective backend switch, and then notifies the host computer that writing of the host data is completed.

10. The storage system according to claim 7,
wherein the first storage controller:
receives host data to be written to the one or more storage devices from a host computer, and
stores the host data in the first memory before the host data is written to one or more storage devices,
wherein the first processor:
reads the host data from the first memory after the host data is stored in the first memory,
generates the frame with the host data as the first data,
transfers the frame to a respective backend switch, and
notifies the second processor that the first data has been transferred,
wherein, in a case where the first processor notifies the second processor that the first data has been transferred, the second processor:
reads the first data stored in the second memory,
determines whether or not there is an error in the first data, and
notifies the first processor of a determination result, and
wherein the first processor notifies the host computer whether or not there is an error in the first data stored in the second memory on the basis of the determination result.

11. The storage system according to claim 7,
wherein a respective backend switch transfers the frame including the first data to the second storage controller, and then transfers a request for reading at least part of the first data to the second processor,
wherein the second processor reads the at least part of the first data from the second memory in response to the request, and returns the at least part of the first data to the respective backend switch, and
wherein the respective backend switch notifies the first processor that the at least part of the first data read from the second memory has been returned from the second processor.

12. The storage system according to claim 6, further comprising:
a drive enclosure in which the first backend switch, the second backend switch, and the one or more storage devices are installed,
wherein the first to fourth switches are virtual switches.

13. The storage system according to claim 6,
wherein, in a case where a failure occurs in the second backend switch,
the second storage controller requests the first storage controller to read the first data from a second storage device of the one or more storage devices, via the first backend switch,
the first storage controller instructs the second storage device to transfer the first data to the second storage controller in response to the request, and
the second storage device transfers the first data to the second storage controller via the first backend switch in response to the instruction, and transfers a completion response to the instruction to the first storage controller.

* * * * *